(12) United States Patent
Huang et al.

(10) Patent No.: US 12,715,794 B2
(45) **Date of Patent: *Aug. 25, 2026**

(54) METHODS AND SYSTEMS FOR ELECTROCHEMICAL OXIDATION OF POLYFLUOROALKYL AND PERFLUOROALKYL CONTAMINANTS

(71) Applicant: University of Georgia Research Foundation, Inc., Athens, GA (US)

(72) Inventors: Qingguo Huang, Fayetteville, GA (US); Hui Lin, Griffin, GA (US); Junfeng Niu, Griffin, GA (US)

(73) Assignee: University of Georgia Research Foundation, Inc., Athens, GA (US)

( * ) Notice: Subject to any disclaimer, the term of this patent is extended or adjusted under 35 U.S.C. 154(b) by 622 days.

This patent is subject to a terminal disclaimer.

(21) Appl. No.: 17/989,080

(22) Filed: Nov. 17, 2022

(65) Prior Publication Data

US 2023/0322589 A1 Oct. 12, 2023

Related U.S. Application Data

(62) Division of application No. 16/326,300, filed as application No. PCT/US2017/047641 on Aug. 18, 2017, now Pat. No. 11,512,011.

(Continued)

(51) Int. Cl.
*C02F 1/46* (2023.01)
*C02F 1/461* (2023.01)
(Continued)

(52) U.S. Cl.
CPC ........ *C02F 1/4672* (2013.01); *C02F 1/46114* (2013.01); *C02F 1/463* (2013.01);
(Continued)

(58) Field of Classification Search
CPC .. C25B 11/031; C02F 1/4672; C02F 1/46114; C02F 1/463
See application file for complete search history.

(56) References Cited

U.S. PATENT DOCUMENTS 4,429,917 A 2/1984 Diffrient
5,281,496 A 1/1994 Clarke
(Continued)

FOREIGN PATENT DOCUMENTS

CN 104591342 * 5/2015 .............. C02F 1/461
EP 1518828 3/2005
WO 2013007847 A1 1/2013

OTHER PUBLICATIONS

You et al., “Monolithic Porous Magneli-phase Ti4O7 for Electro-oxidation Treatment of Industrial Wastewater,” Electrochimica Acta, 214, (2016) p. 326-335.

(Continued)

*Primary Examiner* — Zulmariam Mendez
(74) *Attorney, Agent, or Firm* — Thomas | Horstemeyer, LLP

(57) ABSTRACT

The present disclosure provides methods, electrodes, and systems for electrochemical oxidation of polyfluoroalkyl and perfluroalkyl (PFAS) contaminants using Magnéli phase titanium suboxide ceramic electrodes/membranes. Magnéli phase titanium suboxide ceramic electrodes/membranes can be porous and can be included in reactive electrochemical membrane filtration systems for filtration, concentration, and oxidation of PFASs and other contaminants.

22 Claims, 28 Drawing Sheets

Related U.S. Application Data

(60) Provisional application No. 62/377,120, filed on Aug. 19, 2016.

(51) Int. Cl.
*C02F 1/463* (2023.01)
*C02F 1/467* (2023.01)
*C25B 11/031* (2021.01)
*H01M 4/04* (2006.01)
*H01M 4/66* (2006.01)
*C02F 1/44* (2023.01)
*C02F 101/14* (2006.01)
*C02F 101/36* (2006.01)
*C02F 103/00* (2006.01)
*C02F 103/06* (2006.01)
*C02F 103/36* (2006.01)

(52) U.S. Cl.
CPC ......... *C25B 11/031* (2021.01); *H01M 4/0433* (2013.01); *H01M 4/664* (2013.01); *C02F 1/444* (2013.01); *C02F 2001/46133* (2013.01); *C02F 2001/46138* (2013.01); *C02F 2001/46161* (2013.01); *C02F 2001/46171* (2013.01); *C02F 2101/14* (2013.01); *C02F 2101/36* (2013.01); *C02F 2103/001* (2013.01); *C02F 2103/06* (2013.01); *C02F 2103/36* (2013.01)

(56) References Cited

U.S. PATENT DOCUMENTS

| | | | | |
|---|---|---|---|---|
| 5,584,977 | A | 12/1996 | Bachot | |
| 6,171,460 | B1 | 1/2001 | Bill | |
| 6,328,875 | B1 | 12/2001 | Zappi | |
| 2009/0107915 | A1 * | 4/2009 | Skinner | C02F 9/00 210/150 |

OTHER PUBLICATIONS

Zaky et al., "Supporting Information for: Porous Sub-stoichiometric TiO2 Anodes as Reactive Electrochemical Membranes for Water Treatment", Environmental Science and Technology, 2013, 18 pages.
European Office Action dated Sep. 9, 2021 in copending EP Application No. 17 842 224.2.
Trautmann, et al (2015) "Electrochemical Degradation of Perfluoroalkyl and Polyfluoroalkyl Substances (PFASs) in Groundwater", Water Science & Technology, p. 1569-1575.
Tsai, et al (2010) "Treatment of Perfluorinated Chemicals by Electro-Microfiltration", Environ. Sci. Technol, 44, p. 7914-7920.
Vecitis, et al (2010) "Sonochemical Degradation of Perfluorooctanesulfonate in Aqueous Film-Forming Foams", Environ. Sci. Technol, 44, p. 432-438.
Vecitis, et al (2009) "Treatment Technologies for Aqueous Perfluorooctanesulfonate (PFOS) and Perfluorooctanoate (PFOA)", Front. Environ. Sci. Engin, 3(2): p. 129-151.
Walsh, et al (2010) "The Continuing Development of Magnéli Phase Titanium Sub-Oxides and Ebonex® Electrodes", Electrochimica Acta, p. 1-10.
Wang, et al (2014) "Global Emission Inventories for C4-C14 Perfluoroalkyl Carboxylic Acid (PFCA) Homologues from 1951 to 2030, Part I: Production and Emissions from Quantifiable Sources", Environment International, 70, p. 62-75.
Xiao, et al (2011) "Hydrothermally Enhanced Electrochemical Oxidation of High Concentration Refractory Perfluorooctanoic Acid", J. Phys. Chem. A, 115, p. 13836-13841.
Yao, et al (2012) "Fiber-Like Nanostructured Ti4O7 Used as Durable Fuel Cell Catalyst Support in Oxygen Reduction Catalysis", J. Mater. Chem., 22, p. 16560-16565.
Yasuoka, et al (2011) "An Energy-Efficient Process for Decomposing Perfluorooctanoic and Perfluorooctane Sulfonic Acids Using DC Plasmas Generated Within Gas Bubbles", Plasma Sources Sci. Technol., 20, 034009, p. 1-7.
Zaky, et al (2013) "Porous Substoichiometric TiO2 Anodes as Reactive Electrochemical Membranes for Water Treatment", Environ. Sci. Technol, 47, p. 6554-6563.
Zaky; et al (2014) "Mechanism of p-Substituted Phenol Oxidation at a Ti4O7 Reactive Electrochemical Membrane", Environ. Sci. Technol., 48, p. 5857-5867.
Zhuo, et al (2011) "Efficient Electrochemical Oxidation of Perfluorooctanoate Using a Ti/SnO2—Sb—Bi Anode", Environ. Sci. Technol., 45, p. 2973-2979.
Zhuo; et al (2012) "Degradation of Perfluorinated Compounds on a Boron-Doped Diamond Electrode", Electrochimica Acta, 77, p. 17-22.
Ardizzone, et al (1990) ""Inner" and "Outer" Active Surface of RuO2 Electrodes", Electrochimica Acta, vol. 35, No. 1, p. 263-267.
Asim, et al (2015) "Controlled Fabrication of Hierarchically Porous Ti/Sb—SnO2 Anode From Honeycomb to Network Structure with High Electrocatalytic Activity", RSC Adv., 5, p. 28803-28813.
Bockris, et al (1984) "The Electrocatalysis of Oxygen Evolution on Perovskites", J. Electrochem. Soc.: Electrochemical Science and Technology, vol. 131, No. 2, p. 290-302.
Bunce, et al (2014) "Pollutants in Water—Electrochemical Remediation Using Ebonex Electrodes", Polyelectrolytes, Films-Specific Ion Effects in Thin Films, p. 1629-1633.
Carter, et al (2008) "Oxidative Destruction of Perfluorooctane Sulfonate Using Boron-Doped Diamond Film Electrodes", Environ. Sci. Technol., 42, p. 6111-6115.
B. Chaplin (2014) "Critical Review of Electrochemical Advanced Oxidation Processes for Water Treatment Applications", Environ. Sci.: Processes Impacts, 16, p. 1182-1203.
Chen, et al (1999) "Electrolytic Oxidation of Trichloroethylene Using a Ceramic Anode", Journal of Applied Electrochemistry, 29, p. 961-970.
G. Chen (2004) "Electrochemical Technologies in Wastewater Treatment", Separation and Purification Technology, 38, p. 11-41.
Chen, et al (2007) "Photodegradation of Perfluorooctanoic Acid by 185 nm Vacuum Ultraviolet Light", Journal of Environmental Sciences, 19, p. 387-390.
Davis, et al (2007) "Transport of Ammonium Perfluorooctanoate in Environmental Media Near a Fluoropolymer Manufacturing Facility", Chemosphere, 67, p. 2011-2019.
Donaghue, et al (2013) "Effect of Select Organic Compounds on Perchlorate Formation at Boron-doped Diamond Film Anodes", Environ. Sci. Technol., 47, p. 12391-12399.
Fujii, et al (2007) "New POPs in the Water Environment: Distribution, Bioaccumulation and Treatment of Perfluorinated Compounds"—A Review Paper, Journal of Water Supply: Research and Technology—AQUA, p. 313-326.
Gatto, et al (2015) "Surface Fluorination on TiO2catalyst Induced by Photodegradation of Perfluorooctanoic Acid", Catalysis Today, 241, p. 8-14.
Geng, et al.(2015) "Highly-Ordered Magnéli Ti4O7 Nanotube Arrays as Effective Anodic Material for Electro- Oxidation", Electrochimica Acta, 153, p. 316-324.
Geng, et al (2016) "Magnéli Ti4O7 modified Ceramic Membrane for Electrically-Assisted Filtration with Antifouling Property", Journal of Membrane Science, 498, p. 302-314.
Guo, et al (2016) "Development and Characterization of Ultrafiltration TiO2 Magne'li Phase Reactive Electrochemical Membranes", Environ. Sci. Technol., 50, p. 1428-1436.
Hori, et al (2004) "Decomposition of Environmentally Persistent Perfluorooctanoic Acid in Water by Photochemical Approaches", Environ. Sci. Technol., 38, p. 6118-6124.
Hori, et al (2005) "Efficient Decomposition of Environmentally Persistent Perfluorocarboxylic Acids by Use of Persulfate as a Photochemical Oxidant", Environ. Sci. Technol., 39, p. 2383-2388.
Hori, et al (2006) "Efficient Decomposition of Environmentally Persistent Perfluorooctanesulfonate and Related Fluorochemicals Using Zerovalent Iron in Subcritical Water", Environ. Sci. Technol., 40, p. 1049-1054.

(56) References Cited

OTHER PUBLICATIONS

Hua, et al (2016) "Effects of Anodic Oxidation of a Substoichiometric Titanium Dioxide Reactive Electrochemical Membrane on Algal Cell Destabilization and Lipid Extraction", Bioresource Technology, 203, p. 112-117.
Huang, et al (2013) "Remediation of Perfluoroalkyl Contaminated Aquifers Using an In-situ Two-layer Barrier: Laboratory Batch and Column Study", SERDP, p. 1-27.
Kapalka, et al (2009) "The Importance of Electrode Material in Environmental Electrochemistry Formation and Reactivity of Free Hydroxyl Radicals on Boron-Doped Diamond Electrodes", Electrochimica Acta, 54, p. 2018-2023.
Kasian, et al (2013) "Electrochemical Properties of Thermally Treated Platinized Ebonex® with Low Content of Pt", Electrochimica Acta, 109, p. 630-637.
Kearney, et al (2012) "The Use of Ebonex Electrodes for the Electrochemical Removal of Nitrate Ion from Water", Can. J. Chem., 90: p. 666-674.
Lee, et al (2009) "Efficient Decomposition of Perfluorocarboxylic Acids in Aqueous Solution Using Microwave-Induced Persulfate", Water Research, 43, p. 2811-2816.
Li, et al (2011) "Enhanced Adsorption of PFOA and PFOS on Multiwalled Carbon Nanotubes under Electrochemical Assistance", Environ. Sci. Technol, 45, p. 8498-8505.
Lin, et al (2012) "Electrochemical Degradation of Perfluorooctanoic Acid (PFOA) by Ti/SnO2eSb, Ti/SnO2eSb/PbO2 and Ti/SnO2eSb/MnO2 Anodes", Water Research, 46, p. 2281-2289.
Lin, et al (2013) "Highly Efficient and Mild Electrochemical Mineralization of Long-Chain Perfluorocarboxylic Acids (C9-C10) by Ti/SnO2—Sb—Ce, Ti/ SnO2—Sb/Ce—PbO2, and Ti/BDD Electrodes", Environ. Sci. Technol., 47, p. 13039-13046.
Lin, et al (2013) "Electrochemical Mineralization of Sulfamethoxazole by Ti/SnO2—Sb/Ce—PbO2 Anode: Kinetics, Reaction Pathways, and Energy Cost Evolution", Electrochimica Acta, 97, p. 167-174.
Luo, et al (2015) "Laccase-Catalyzed Degradation of Perfluorooctanoic Acid", Environ. Sci. Technol. Lett., 2, p. 198-203.
Lutze, et al (2012) "Treatment Options for the Removal and Degradation of Polyfluorinated Chemicals", Hdb. Env. Chem., 17: p. 103-125.
Moriwaki, et al (2005) "Sonochemical Decomposition of Perfluorooctane Sulfonate and Perfluorooctanoic Acid", Environ. Sci. Technol., 39, p. 3388-3392.
Moroi, et al (2001) "Determination of Acidity Constants of Perfluoroalkanoic Acids", Bull. Chem. Soc. Jpn., 74, p. 667-672.
Nehe, et al (2015) "Solution Precursor Plasma Spray (SPPS) Technique of Catalyst Coating for Hydrogen Production in a Single Channel with Cavities Plate Type Methanol Based Microreformer", Chemical Engineering Journal, 277, p. 168-175.
Australian Office Action for Australian Patent Application No. 2023203869 mailed Sep. 13, 2024.
Canadian Office Action for Canadian Patent Application No. 3033532 mailed Sep. 19, 2024.
New Zealand Office Action for Zew Zealand Patent Application No. 750,478 mailed Jul. 31, 2024.
Niu, et al (2012) "Electrochemical Mineralization of Perfluorocarboxylic Acids (PFCAs) by Ce-Doped Modified Porous Nanocrystalline PbO2 Film Electrode", Environ. Sci. Technol, 46, p. 10191-10198.
Niu, et al (2013)Theoretical and Experimental Insights into the Electrochemical Mineralization Mechanism of Perfluorooctanoic Acid, Environ. Sci. Technol., 47, p. 14341-14349.
Panizza, et al (2009) "Direct And Mediated Anodic Oxidation of Organic Pollutants", Chem. Rev, 109, p. 6541-6569.
Paul, et al (2009) "A First Global Production, Emission, And Environmental Inventory For Perfluorooctane Sulfonate", Environ. Sci. Technol., 43, p. 386-392.
Park, et al (2009) "Reductive Defluorination of Aqueous Perfluorinated Alkyl Surfactants: Effects of Ionic Headgroup and Chain Length", J. Phys. Chem. A, 113, p. 690-696.
Prevedouros, et al (2006) "Sources, Fate and Transport of Perfluorocarboxylates", Environmental Science & Technology, vol. 40, No. 1, p. 32-44.
Porada, et al (2013) "Review on the Science and Technology of Water Desalination by Capacitive Deionization", Progress in Materials Science, 58, p. 1388-1442.
Qu, et al (2010) "Photo-Reductive Defluorination of Perfluorooctanoic Acid in Water", Water Research, 44, p. 2939-2947.
Rajeshwar, et al (1997) "Fundamentals and Applications in Pollution Abatement", Environmental Electrochemistry, p. 1-23.
Ras, et al (1999) "Electrodeposition of PbO2 and Bi±PbO2 on Ebonex", Journal of Applied Electrochemistry, 29, p. 313-319.
Santos, et al (2016) "Highly Porous Ti4O7 Reactive Electrochemical Water Filtration Membranes Fabricated via Electrospinning/Electrospraying", AIChE Journal, vol. 62, No. 2, p. 508-524.
Schaefer, et al (2015) "Electrochemical Treatment of Perfluorooctanoic Acid (PFOA) and Perfluorooctane Sulfonic Acid (PFOS) in Groundwater Impacted by Aqueous Film Forming Foams (AFFFs)", Journal of Hazardous Materials, 295, p. 170-175.
Tang, et al (2012) "Efficient Degradation of Perfluorooctanoic Acid by UV-Fenton Process", Chemical Engineering Journal, 184, p. 156-162.
Toyoda, et al (2009) "Preparation of Carbon-Coated Magneli Phases TinO2n-1 and Their Photocatalytic Activity Under Visible Light", Applied Catalysis B: Environmental, 88, p. 160-164.
Guo et al., "Development and Characterization of Ultrafiltration TiO2 Magneli Phase 31-34 Reactive Electrochemical Membranes", Environ. Sci. Technol., 2016, 50 (3), p. 1428-1436, Publication Date (Web): Jan. 20, 2016 (Jan. 20, 2016) (retrieved from internet URL: <http://pubs.acs.org/doi/abs/ 10 .1 021 /acs.est.5b04366?src=recsys &journa1Code=esthag>) abstract.
ISR and Written Opinion dated Nov. 3, 2017 in co-pending PCT Application No. PCT/US2017/47641.
Bowen et al, "Manufacture of Porous Electrically Conductive Ceramics", Proceedings of the International Conference on Mining, Material and Metallurgical Engineering, Prague, Czech Republic, Aug. 11-12, 2014.
Canadian Office Action for Canadian Patent Application No. 3,033,532 mailed Aug. 23, 2023.

* cited by examiner

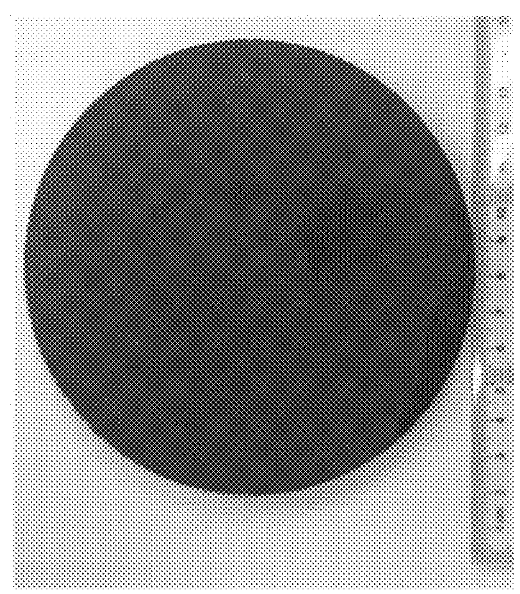
Fig. 4B
Fig. 4D
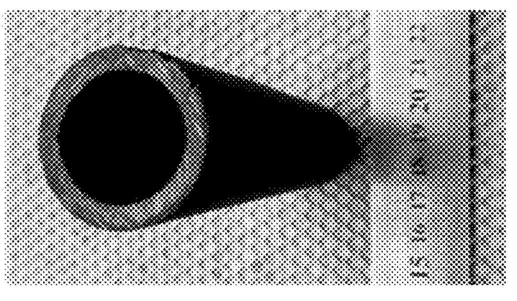
Fig. 4A
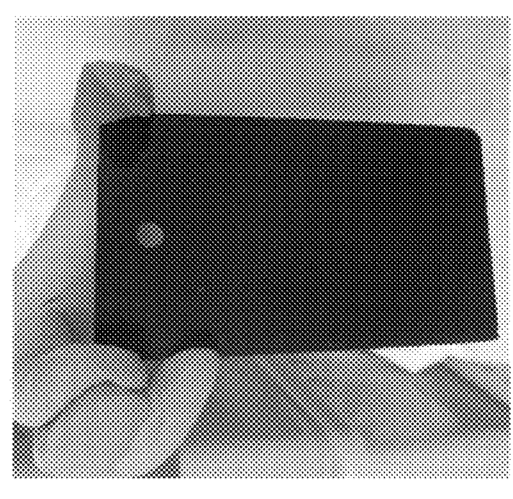
Fig. 4C

METHODS AND SYSTEMS FOR ELECTROCHEMICAL OXIDATION OF POLYFLUOROALKYL AND PERFLUOROALKYL CONTAMINANTS

CROSS-REFERENCE TO RELATED APPLICATIONS

This application is a divisional of and claims priority to U.S. patent application entitled "METHODS AND SYSTEMS FOR ELECTROCHEMICAL OXIDATION OF POLYFLUOROALKYL AND PERFLUROALKYL CONTAMINANTS," having Ser. No. 16/326,300 filed on Feb. 18, 2019, which claims priority to PCT application having serial number PCT/US2017/047641, filed on Aug. 18, 2017, which in turn claims priority to U.S. provisional application entitled "METHODS AND SYSTEMS FOR ELECTROCHEMICAL OXIDATION OF POLYFLUOROALKYL AND PERFLUROALKYL CONTAMINANTS," having Ser. No. 62/377,120 filed on Aug. 19, 2016. Each of the foregoing applications are entirely incorporated herein by reference.

STATEMENT REGARDING FEDERALLY SPONSORED RESEARCH OR DEVELOPMENT

This invention was made with government support under R01 GM363971 awarded by the National Institutes of Health. The government has certain rights in the invention.

BACKGROUND

Perfluoroalkyl and polyfluoroalkyl substances, also known as PFASs, are a group of highly fluorinated aliphatic substances that contain the perfluoroalkyl moiety $C_nF_{2n+1}$. PFASs, highly persistent chemicals designed for a wide variety of special applications, have been used since the 1950s as fire-fighting agents, fabric and carpet coating, non-stick cookware and packaging, electronic device manufacturing and various other industrial and commercial applications. The extremely strong and stable C—F bond in PFASs provides chemical and thermal stability to the perfluoroalkyl moiety and surfactants and polymers into which it is incorporated. The high stability of PFASs and their hydrophobic and lipophobic nature leads to highly useful and enduring properties as well as resistance to abiotic and biotic degradation. This makes treatment of wastewater and other contaminated substances containing these chemicals very challenging.

The occurrence of these perfluorinated compounds (PFCs), such as perfluorooctanoate ($C_7F_{15}COOH$, PFOA) and perfluorooctane sulfonate ($C_8F_{17}SO_3H$, PFOS), in the environment has thus become a crucial environmental issue. Although PFCs have been extensively used in a wide range of industrial, medical and domestic applications, due to the particular physicochemical characteristics and resistance to degradation, evidence of PFOS/PFOA toxicity has accumulated and become a major public concern. In 2009, PFOS, its salts and perfluorooctane sulfonyl fluoride (PFOS-F) were added to the Persistent Organic Pollutants (POPs) list of the Stockholm Convention. The U.S. Environmental Protection Agency (EPA) has classified PFOA as a "likely carcinogen", and its use was restricted. Potential toxic health effects of PFAS's include cancer, kidney and liver disease, heart attack, stroke, and thyroid disease. However, PFOA/PFOS and other PFCs are still used in some industries, such as semiconductor and fluoropolymer manufacturing. Historically, effluents from production and the points of use of PFOA/PFOS were neither impounded nor pretreated prior to discharge, resulting in serious contamination in these areas, including groundwater, sediment and soil. For example, Wang and co-works (8) estimated an emission of 2610-21400 tons of perfluorocarboxylic acid (PFCAs, $C_4$-$C_{14}$) during 1951 to 2015, and projected 20-6420 tons to be emitted from 2016 to 2030.

Remediation and treatment of PFOA/PFOS contaminated water are extremely challenging, because the extreme chemical stability of PFOA/PFOS renders them highly resistant to conventional treatment technologies or advanced oxidation processes (AOPs). AOPs rely primarily on hydroxyl radicals (·OH) to destruct organic contaminants, but the relatively slow reaction rates between PFOA/PFOS and aqueous ·OH limit their applicability. Some technologies including photochemical oxidation, ultrasonic irradiation, plasma oxidation, and zerovalent iron reduction under sub-critical water conditions have shown limited success in degrading perfluoroalkyl acids (PFAAs) in laboratory-scale studies. However, application of these technologies is limited by their requirement of high energy input and/or special equipment.

Thus, a feasible and economical technology for effectively degrading these chemicals in water or other aqueous solutions has not been accomplished.

SUMMARY

The present disclosure provides methods, electrodes, and systems for electrochemically oxidizing polyfluoroalkyl and perfluoroalkyl substances (PFASs), and methods of making the electrodes. Embodiments of the methods for electrochemically oxidizing PFASs according to the present disclosure include contacting an aqueous composition contaminated with one or more types of PFASs with a Magnéli phase titanium oxide ceramic electrode and supplying electric current to a Magnéli phase titanium oxide ceramic electrode in an electrochemical cell, whereby the electrode electrochemically oxidizes the PFASs to oxidatively degrade the PFASs into mineral and/or inorganic components.

Embodiments of the present disclosure also include a porous Magnéli phase titanium oxide ceramic electrode including a ceramic material comprising $Ti_4O_7$, $Ti_5O_9$, or a combination thereof, and having a plurality of micropores in the material, the pores having an average diameter of about 1 μm to 5 μm, where the electrode has a porosity of about 5-75%.

The present disclosure also provides methods of making porous Magnéli phase $Ti_4O_7$ ceramic electrodes of the present disclosure. In embodiments, the methods of making include: reducing $TiO_2$ at a temperature of about 500° C. or above under $H_2$ to produce a $Ti_4O_7$ nanopowder; mixing the $Ti_4O_7$ nanopowder with a binder and a porogen to form a slurry; drying the slurry to form ceramic granulates; pressing the ceramic granulates in a mold to produce a $Ti_4O_7$ preform; and drying and sintering the $Ti_4O_7$ preform at a temperature of about 1000° C., or greater, for about 3-12 hours to produce the porous Magnéli phase $Ti_4O_7$ ceramic electrode.

Systems for electrochemical oxidation of polyfluoroalkyl and perfluoroalkyl substances (PFASs) are also provided in the present disclosure. In embodiments, such systems include a reservoir for containing an aqueous solution contaminated with PFASs and a first Magnéli phase titanium oxide ceramic electrode comprising $Ti_4O_7$, $Ti_5O_9$, or a combination thereof, where the Magnéli phase titanium oxide ceramic electrode is configured to be in electrochemical communication with the aqueous solution in the reservoir such that the electrode oxidatively degrades the PFASs to mineral and/or inorganic components.

Methods of the present disclosure further include methods for electrochemically oxidizing polyfluoroalkyl and perfluoroalkyl substances (PFASs) and trichloroethylene (TCE) in an aqueous composition. In embodiments, such methods include contacting an aqueous composition contaminated with one or more types of PFASs and TCE with at least two porous Magnéli phase titanium oxide ceramic membrane electrodes having at least a portion of the membrane coated with activated carbon fiber (ACF). The methods further include supplying electric current to one of the Magnéli phase titanium oxide ceramic membrane electrodes in an electrochemical cell, such that one electrode serves as the anode and electrochemically oxidizes the PFASs to oxidatively degrade the PFASs into mineral and/or inorganic components and where the other electrode serves as the cathode and reduces chlorate to $Cl^-$.

Other methods, compositions, features, and advantages of the present disclosure will be or become apparent to one with skill in the art upon examination of the following drawings and detailed description. It is intended that all such additional compositions, methods, features, and advantages be included within this description, and be within the scope of the present disclosure.

BRIEF DESCRIPTION OF THE DRAWINGS

Further aspects of the present disclosure will be more readily appreciated upon review of the detailed description of its various embodiments, described below, when taken in conjunction with the accompanying drawings. The components in the drawings are not necessarily to scale, emphasis instead being placed upon clearly illustrating the principles of the present disclosure. Moreover, in the drawings, like reference numerals designate corresponding parts throughout the several views.

FIGS. 4A-4D illustrate digital images of embodiments of fabricated Magnéli phase $Ti_4O_7$ porous ceramic materials in different shapes: cylindrical (4A), circular disk (4B), rectangular (4C and 4D).

DESCRIPTION

Figure 1:
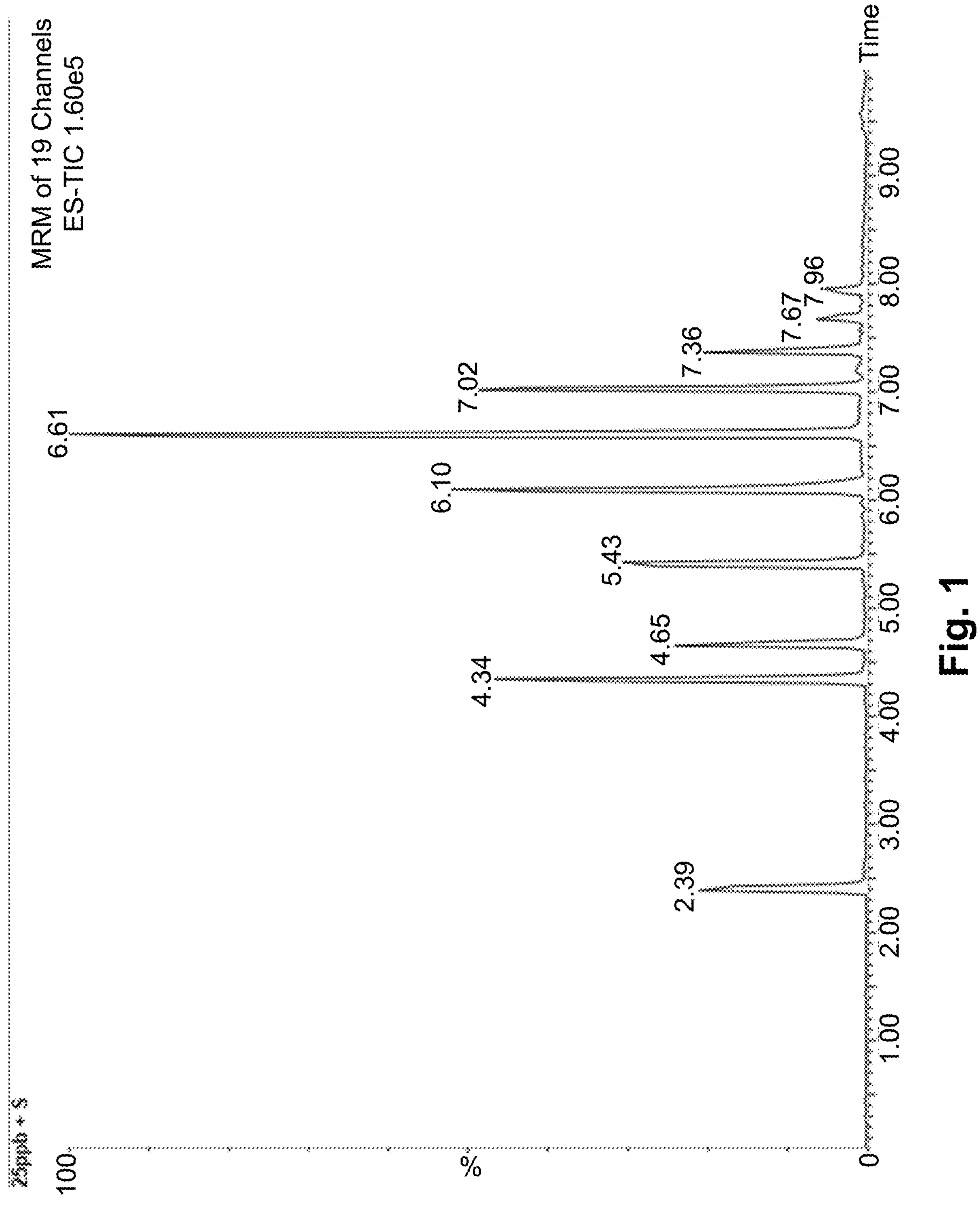
FIG. 1 illustrates a UPLC-MS chromatogram of standard PFCs (every PFCA concentration was 25 ppb).

The details of some embodiments of the present disclosure are set forth in the description below. Other features, objects, and advantages of the present disclosure will be apparent to one of skill in the art upon examination of the following description, drawings, examples and claims. It is intended that all such additional systems, methods, features, and advantages be included within this description, be within the scope of the present disclosure, and be protected by the accompanying claims Before the present disclosure is described in greater detail, it is to be understood that this disclosure is not limited to particular embodiments described, and as such may, of course, vary. It is also to be understood that the terminology used herein is for the purpose of describing particular embodiments only, and is not intended to be limiting, since the scope of the present disclosure will be limited only by the appended claims.

Where a range of values is provided, it is understood that each intervening value, to the tenth of the unit of the lower limit unless the context clearly dictates otherwise, between the upper and lower limit of that range and any other stated or intervening value in that stated range, is encompassed within the disclosure. The upper and lower limits of these smaller ranges may independently be included in the smaller ranges and are also encompassed within the disclosure, subject to any specifically excluded limit in the stated range. Where the stated range includes one or both of the limits, ranges excluding either or both of those included limits are also included in the disclosure.

Unless defined otherwise, all technical and scientific terms used herein have the same meaning as commonly understood by one of ordinary skill in the art to which this disclosure belongs. Although any methods and materials similar or equivalent to those described herein can also be used in the practice or testing of the present disclosure, the preferred methods and materials are now described.

All publications and patents cited in this specification that are incorporated by reference are incorporated as if each individual publication or patent were specifically and individually indicated to be incorporated by reference and are incorporated herein by reference to disclose and describe the methods and/or materials in connection with which the publications are cited. The citation of any publication is for its disclosure prior to the filing date and should not be construed as an admission that the present disclosure is not entitled to antedate such publication by virtue of prior disclosure. Further, the dates of publication provided could be different from the actual publication dates that may need to be independently confirmed.

As will be apparent to those of skill in the art upon reading this disclosure, each of the individual embodiments described and illustrated herein has discrete components and features which may be readily separated from or combined with the features of any of the other several embodiments without departing from the scope or spirit of the present disclosure. Any recited method can be carried out in the order of events recited or in any other order that is logically possible.

Embodiments of the present disclosure will employ, unless otherwise indicated, techniques of molecular biology, microbiology, organic and inorganic chemistry, electrochemistry and the like, which are within the skill of the art. Such techniques are explained fully in the literature.

It must be noted that, as used in the specification and the appended claims, the singular forms "a," "an," and "the" include plural referents unless the context clearly dictates otherwise. Thus, for example, reference to "a support" includes a plurality of supports. In this specification and in the claims that follow, reference will be made to a number of terms that shall be defined to have the following meanings unless a contrary intention is apparent.

As used herein, the following terms have the meanings ascribed to them unless specified otherwise. In this disclosure, "comprises," "comprising," "containing" and "having" and the like can have the meaning ascribed to them in U.S. Patent law and can mean "includes," "including," and the like; "consisting essentially of" or"consists essentially" or the like, when applied to methods and compositions encompassed by the present disclosure refers to compositions like those disclosed herein, but which may contain additional structural groups, composition components or method steps. Such additional structural groups, composition components or method steps, etc., however, do not materially affect the basic and novel characteristic(s) of the compositions or methods, compared to those of the corresponding compositions or methods disclosed herein. "Consisting essentially of" or "consists essentially" or the like, when applied to methods and compositions encompassed by the present disclosure have the meaning ascribed in U.S. Patent law and the term is open-ended, allowing for the presence of more than that which is recited so long as basic or novel characteristics of that which is recited is not changed by the presence of more than that which is recited, but excludes prior art embodiments.

Prior to describing the various embodiments, the following definitions are provided and should be used unless otherwise indicated.

Definitions

In describing and claiming the disclosed subject matter, the following terminology will be used in accordance with the definitions set forth below.

As used herein, "Magnéli phase" indicates a class of certain transition metal sub-oxides, such as titanium, that have a distinct graphite-like crystalline structure featuring shear planes in the crystalline structure, which provides improved electrical conductivity to the material. For titanium, Magnéli phase titanium sub-oxides have the formula $Ti_nO_{2n-1}$, where n is any integer between 3 and 10.

"Poly- and perfluoroalkyl substances" (PFASs) refers to a class of highly fluorinated aliphatic compounds having multiple or all hydrogens replaced by fluorine atoms. Perfluorinated compounds (PFCs) are PFASs that contain the perfluoroalkyl moiety $C_nF_{2n+1}$, where n is an integer typically between 3 and 10, where all hydrogens have been replaced by fluorine atoms, whereas polyfluorinated compounds may have only some of the hydrogens replaced by fluorines. Some common perfluorinated PFASs include perfluoroalkyl acids (PFAAs), which are typically more difficult to degrade than other PFASs.

Some classes of PFAAs include perfluorocarboxylic acids (PFCAs) and perfluorosulfonates (PFSAs), with perfluorooctanoate (PFOA) being an example of a common PFCA contaminant and perfluorooctane sulfonate (PFOS) being an example of a common PFSA contaminant. All PFAAs, and particularly PFOS are known to be difficult to degrade.

As used herein, the term "mineralization" refers to the process of breaking down an organic substance, such as perfluoroalkyl and polyfluoralkyl substances, into mineral and/or inorganic components.

As used in the present disclosure, two materials are in "electrochemical communication" when electrons generated by a chemical reaction of one material can be transferred to and/or accepted by the other material.

Description

Embodiments of the present disclosure include methods and systems for electrochemically oxidizing PFASs. Embodiments of the methods include contacting the PFASs, or a composition containing PFASs, with a Magnéli phase $Ti_4O_7$ ceramic electrode to oxidatively mineralize the PFASs for decontamination of compositions containing PFASs. Embodiments of the present disclosure also include methods of making porous Magnéli phase $Ti_4O_7$ ceramic electrodes for using the methods and systems of the present disclosure.

Mineralization of some types of PFCs has been achieved by electrooxidation on "non-active" anodes, including boron-doped diamond (BDD), $PbO_2$, $SnO_2$—Sb, and Ti/$RuO_2$ under room temperature and atmospheric pressure at fast rates (half-lives: tens to hundreds minutes) and relatively low energy consumption, presumably by hydroxyl free radicals generated on the electrodes by electrolysis. An electrooxidation system with a BDD anode has also been used to effectively degrade $C_4$~$C_8$ PFCAs and perfluorosulfonates (PFSAs, $C_4$~$C_8$) and 6:2 fluorotelomer sulfonate in polluted groundwater in the presence of a high dissolved organic carbon (DOC) background (DOC/PFCs ratio up to 50). PFAAs are typically more difficult to degrade than some other PFASs. First, perfluorinated compounds are more difficult to degrade than polyfluorinated compounds, because the C—F bond is the strongest covalent bond, and perfluorinated compounds have all C—H bonds replaced with the stronger C—F bonds. Second, as described in more detail in the Examples below and FIGS. 12C-12D due to the presence of the fluorine atom, the structure of PFAAs has a twisted conformation which protects the covalent bonds in compound from attack by oxidative species. While, as discussed above, some inert electrodes have been shown to degrade PFASs by generating hydroxyl free radicals, PFAAs have shown to be resistant to degradation by hydroxyl free radicals, such as those generated by inert electrodes (see Vecitis, C. D., et al., Treatment of technologies for aqueous perfluorooctane sulfonate (PFOS and perfluorooctanoate (PFOA) 2009). In some studies, electrooxidation with BDD electrodes was shown to degrade PFAAs in water or AFFF-impacted groundwater, and the main degradation products were $F^-$ and $CO_2$. PFOS has been shown to be highly resistant to degradation by most inert electrodes, with only one report of degradation by any type of electrode other than BDD, and which has not been replicated (see Schaefer, et al., Electrochemical treatment of perfluorooctanoic acid (PFOA) and perfluorooctane sulfonic acid (PFOS) in groundwater impacted by aqueous film forming foams (AFFFs). *J. Hazard. Mater.* 2015, 295, 170-175). However, even results with BDD electrodes have been variable and unreliable, depending on the source of the BDD. Thus, a feasible method for effectively using electrochemical oxidation on a large scale for treatment of PFAAs in groundwater or industrial wastewater has not previously been accomplished.

The anode material is an important factor of anodic oxidation, and the electrode materials reported to date for PFOA or PFOS degradation have serious limitations. BDD electrode is extremely costly and difficult to produce in large size for scaled up applications. $SnO_2$-based hybrid electrodes, such as Ti/$SnO_2$—Sb, are inexpensive but suffer from relative short service lives, and, in addition, Sb is considered toxic. Possible release of toxic Pb ions is the main drawback for $PbO_2$ electrode applications. Ti/$RuO_2$ is also expensive, and ruthenium is highly toxic and carcinogenic. In addition, as discussed above, it is known that inert electrodes work by generating hydroxyl free radicals, and it was generally believed that hydroxyl free radicals are not very effective at degrading PFAAs, particularly PFOS.

Magnéli phase titanium sub-oxides have recently been explored as promising candidates for electrochemical applications because of their high conductivity, chemical inertness, and low cost of production. Some of these materials, commercially known as Ebonex® (Atraverda Ltd., United Kingdom), include a series of distinct compounds having the generic formula $Ti_nO_{2n+1}$, where n is an integer between 3 and 10. $Ti_4O_7$ and $Ti_5O_9$ have the greatest electric conductivity, comparable to graphite. Ebonex® (mix of $T_4O_7$ and $Ti_5O_9$) or $Ti_4O_7$ alone can work as an ideal electrode in electrochemical wastewater treatment. It enables a wide potential window for effective electrolysis, with water decomposition under high anodic (>2.0 V vs SCE) and low cathodic (~−1.4 V vs SCE) polarizations. Unlike the BDD electrode, which tends to degraded at high pH, Ebonex® is robust in aggressive solution media.

The primary application of Ebonex® to date has focused on cathodic protection and serving as a support material to coat other materials, such as noble metals, carbon and $PbO_2$. Studies relating to Ebonex® as an electrode material for electrooxidation of pollutants are very limited. Recently, a pure Magnéli phase $Ti_4O_7$ nanotube array (NTA) electrode was fabricated and displayed better performance than BDD electrode in oxidizing phenol. $Ti_4O_7$ electrode has also been applied in oxidative degradation of p-methoxyphenol, oxalic acid, and trichloroethylene or lipid extraction, as well as used as a cathode exhibiting great effectiveness towards the reduction of nitrate. However, no studies are known that use Ebonex or other Magnéli phase titanium suboxide (TSO) electrode to degrade PFASs, which are more resistant to degradation than the other compounds discussed above and many of which are known, as discussed above, to be more resistant to degradation by hydroxyl free radicals such as produced by inert electrodes.

In the methods and systems of the present disclosure Magnéli phase TSO compounds (e.g., $Ti_4O_7$ or mixed Magnéli phase titanium oxides (e.g., Ebonex®)) are used as electrodes for electrooxidation of PFASs (including PFAAs such as, but not limited to, PFOA and PFOS) to degrade these pollutants to their mineral components.

Methods for Electrochemical Oxidation of PFASs

In embodiments, methods of electrochemically oxidizing PFASs of the present disclosure include treating a composition, such as an aqueous composition (e.g., contaminated wastewater) containing one or more types of PFAS contaminants by contacting the contaminated composition with a Magnéli phase titanium suboxide (TSO) ceramic electrode. Then, in an electrochemical cell (e.g., three electrode cell), with the Magnéli phase TSO ceramic electrode as the working electrode (e.g., anode), the method further includes supplying an electric current (e.g., via a power source) to the Magnéli phase titanium oxide ceramic electrode, such that the electrode electrochemically oxidizes the PFASs to oxidatively degrade the PFASs into mineral components. This system presents many advantages over previous electrooxidation techniques involving extremely expensive, inefficient, or potentially toxic materials. The Magnéli phase TSO ceramic materials for the electrode are relatively inexpensive and easy to make, and the method quickly and effectively mineralizes the PFASs.

In embodiments, the Magnéli phase TSO ceramic material includes titanium oxide materials with the general formula: $Ti_nO_{2n-1}$, where n is any integer between 3 and 10. In embodiments, the Magnéli phase titanium oxide ceramic material includes $Ti_4O_7$, $Ti_5O_9$, or a combination of both, such as in Ebonex®. In embodiments the Magnéli phase titanium oxide ceramic material consists essentially of or consists of $Ti_4O_7$. In embodiments the Magnéli phase titanium oxide ceramic material consists essentially of or consists of a combination of $Ti_4O_7$ and $Ti_5O_9$.

In embodiments of the methods of electrochemically oxidizing PFASs, the contaminated aqueous composition is wastewater (e.g., manufacturing wastewater, runoff, etc.), contaminated groundwater, and the like. In embodiments the wastewater is pre-treated via electrocoagulation, membrane filtration or other methods to concentrate the PFSAs in the wastewater prior to electrooxidative decontamination to improve efficiency of PFAS mineralization. In embodiments, the pre-concentration of the wastewater is done by an electrocoagulation technique, such as described in U.S. Patent Publication No. 2015/0360975, which is hereby incorporated by reference herein. Briefly described, the electrocoagulation (EC) process produces amorphous hydrophobic zinc hydroxide flocs in situ that effectively sorb PFASs to purify the contaminated water. The sorbed PFASs are then released to a concentrated solution via appropriate treatments. The concentrated PFASs are subsequently degraded via electrooxidation with porous TSO electrodes of the present disclosure operated in reactive electrochemical membrane (REM) filtration mode for enhanced efficiency and reduced energy consumption. This is described in greater detail in Example 2 below which describes an embodiment of coupling electrocoagulation with electrooxidation.

In embodiments, the Magnéli phase TSO ceramic material of the electrode is a porous material, such as a porous disk or membrane. The porosity increases the surface area of the Magnéli phase TSO ceramic material as well as allowing the material/electrode to function as a filter. The use of the porous Magnéli phase TSO ceramic material also provides advantages when treating water that has not been pre-concentrated. In embodiments, the porous Magnéli phase TSO ceramic electrode is made of $Ti_4O_7$, $Ti_5O_9$, or a combination of both. In embodiments the pores of the Magnéli phase TSO ceramic electrode includes a plurality of micropores. In an embodiment, one or more pores may extend through the Magnéli phase TSO ceramic electrode. In an embodiment, one or more pores may extend into but not through the Magnéli phase TSO ceramic electrode, for example the pores may extend 1 nm to 10 cm into the Magnéli phase TSO ceramic electrode. In an embodiment, one or more pores may be interconnected. In embodiments, the micropores can have diameters from about 0.1 μm (100 nm) to 10 μm. In embodiments, depending on the materials to be passed over the electrode/membrane, the pore size can be tailored to the application. In embodiments, the micropores have diameters from about 280 nm to 8 μm. In embodiments, the micropores have an average pore diameter of about 1.0 to 5.0 μm. In yet other embodiments, the micropores have an average diameter of about 2.0 to 3.6 μm, as well as intervening ranges to those specifically disclosed. In an embodiment, the average pore size is about 2.6 μm.

The porosity of the Magnéli phase TSO ceramic electrode can also be controlled and tailored to the application. In embodiments, the porosity can be about 5-75%, about 10-50%, about 15-30%, and other intervening ranges. In some embodiments, the Magnéli phase TSO ceramic electrode has a porosity of about 21.6%. In some embodiment, at least a portion of the plurality of micropores are interconnected. Interconnected micropores provides advantages if using the electrodes as filters as well, such as in a reactive electrochemical membrane (REM) filtration unit, to improve water filtration through the electrode membrane at low applied pressures. Additional details about the porous Magnéli phase TSO ceramic electrodes and methods of making the porous electrodes will be described in greater detail in the discussion and examples below.

Various PFASs can be electrooxidatively mineralized using the methods of the present disclosure. In embodiments, the PFASs include compounds such as, but not limited to, perfluoroalkyl acids (PFAAs), including, but not limited to, perfluorooctanoate (PFOA), perfluorooctanesulfonate (PFOS), or combinations of PFOA and PFOS. Other contaminants that may be electrooxidatively mineralized with the TSO electrodes of the present disclosure include, but are not limited to, substituted phenols, tetracycline, and trichloroethylene.

Porous Magnéli Phase TSO Electrode/Membrane, Systems, and REM Systems

The present disclosure also includes embodiments of a porous Magnéli phase titanium suboxide (TSO) ceramic electrode made of a ceramic material comprising $Ti_4O_7$, $Ti_5O_9$, or a combination of both and having a plurality of micropores in the material. In embodiments, the pores have diameters in the ranges set forth above (e.g., about 100 nm to 10 μm, about 280 nm to 8 μm, etc.). In embodiments, the pores of the Magnéli phase titanium oxide ceramic electrode have an average pore diameter as disclosed above (e.g., about 1.0 to 5.0 μm, about 2.0 to 3.6 μm, and so on). In embodiments, the Magnéli phase TSO ceramic electrode has a porosity of about 5-75%, about 10-50%, about 15-30%, or the like. The electrodes of the present disclosure can be used in methods of electrochemical oxidation of PFASs as described above. Additional details about embodiments of electrodes of the present disclosure are provided in the Examples below.

The present disclosure also includes systems including the Magnéli phase TSO ceramic electrode(s) of the present disclosure to electrochemically oxidize PFASs (including, but not limited to PFAAs, such as PFOA and PFOS). In embodiments, systems of the present disclosure include a reservoir for containing an aqueous solution or other substance contaminated with PFASs and a Magnéli phase TSO ceramic electrode in electrochemical communication with the aqueous solution in the reservoir. The system can also include components of an electrochemical cell such that an electric current is supplied to the Magnéli phase TSO ceramic electrode, and the electrode oxidatively degrades the PFASs to mineral components. In embodiments, the Magnéli phase TSO ceramic electrode serves as the anode/working electrode and the system further includes a cathode/counter electrode, and a power source (e.g., a DC regulated power source). In some embodiments, a reference electrode may be included. The cathode can be made from various suitable materials, including, but not limited to, stainless steel, platinum, aluminum, graphite and Magnéli phase TSO ceramic, etc. The reference electrode can be made from various materials, including, but not limited to, saturated calomel electrode (SCE), standard hydrogen electrode, silver chloride electrode, and the like.

As described above, in embodiments, the Magnéli phase TSO ceramic electrode includes a plurality of micropores. The porous Magnéli phase TSO ceramic electrode can be as described above. In embodiments the porous Magnéli phase TSO ceramic electrode can function as a filter/membrane through which the aqueous solution passes. In embodiments, the porous Magnéli phase TSO ceramic electrode can be made thin enough to be a membrane-like filter. In embodiments, two filter-like porous Magnéli phase TSO ceramic electrodes can be used in the system, such that one functions as anode and the other as cathode, and the aqueous composition flows through both electrodes during treatment.

In embodiments, the system also includes a pump for moving the aqueous composition into and out of the reservoir through the system. In embodiments, the system may circulate the composition through the reservoir more than once for multiple treatments, as appropriate. In embodiments the pump moves the aqueous composition through a porous Magnéli phase TSO ceramic electrode acting as a filter, or multiple porous electrodes acting as both anode and cathode in filtration mode. In embodiments, the aqueous composition contaminated with PFASs is wastewater (e.g., industrial wastewater). In embodiments the system can be used to decontaminate wastewater or other compositions contaminated with PFASs.

In embodiments, electrochemical oxidation can be incorporated with membrane filtration in a system in which the electrode serves as both an anode and a membrane, also called a reactive electrochemical membrane (REM) filtration system. Thus, in embodiments, the porous Magnéli phase TSO ceramic electrodes of the present disclosure can be used as a ceramic filtration membrane and an electrode to enable a reactive electrochemical membrane (REM) operation. Such a REM operation mode can further significantly increase electrooxidation efficiency because the porous electrode offers a larger electro-active surface area than the conventional plate electrodes, and the filtration mode supports advection-enhanced mass transfer, which is faster than conventional flow-by or batch operation mode. Such REM systems employing the porous Magnéli phase TSO ceramic electrodes of the present disclosure provide a potentially transformative technology offering a wide range of opportunities in wastewater treatment and recycling.

Embodiments of REM systems employing the porous Magnéli phase TSO ceramic electrodes of the present disclosure can be used in either a dead-end filtration or cross-flow filtration mode. In embodiments of a dead-end or cross-flow REM filtration unit, the system can include a flow-through reactor with at least one porous Magnéli phase TSO membrane as the anode, configured such that the concentrated PFAS-contaminated solution will be pumped through the reactor in a manner to allow the solution filtered through the TSO membrane in a cross-flow or dead-end filtration mode. In embodiments, the reactor will be designed such that, for a typical run, the concentrated PFAS solution will be pumped through the reactor at a constant flow rate with a supporting electrolyte, while the TSO membrane anode is operated galvanostatically.

In embodiments of such REM units, more than one porous Magnéli phase TSO ceramic electrode of the present disclosure can be employed, such that each can serve as the anode and cathode, respectively. In an embodiment, described in greater detail in the examples below, a dead-end filtration or cross-flow filtration REM unit includes two circular porous TSO plate electrodes as anode and cathode respectively. A solution containing PFAS (e.g., PFOA and/or PFOS) in a supporting electrolyte (e.g., 10 mM $Na_2SO_4$) was pumped through the REM cell at a constant flow rate with reactive electrochemical membrane (REM) treatment over a range of applied currents (e.g., 0.5~5 mA $cm^{-2}$).

In some embodiments, REM filtration systems of the present disclosure can be modified to treat mixed contaminants of concern (COCs), such as, but not limited to PFASs and trichloroethylene (TCE). Embodiments of such a modified REM system of the present disclosure includes a porous Magnéli phase TSO ceramic electrode membrane as described above or a hybrid membrane made by coating activated carbon fiber (ACF) on at least a portion of the TSO membrane. The ACF helps to adsorb and concentrate PFASs on the anode for better performance. In embodiments, a hybrid TSO/ACF membrane can serve various functions in the system depending on the applied voltage. For instance, Magnéli phase TSO ceramic electrode or ACF-modified TSO membrane can reject PFASs in feed water, and reduce chlorate to $Cl^-$ when serving as the cathode, and can adsorb and mineralize PFASs and TCE when serving as the anode.

Further, since both ACF and $Ti_4O_7$ are highly porous and conductive materials, the TSO and ACF-modified TSO porous membranes can have strong sorption and filtration capacities. In addition to the electrochemical redox reactions described above, an electrochemical system may also be used to remove/filter contaminants by electrostatic interactions, for instance, as part of a treatment process or a pre-treatment measure to concentrate contaminants. For example, contaminants with charges may be adsorbed to a porous 3-D electrode of the present disclosure that is oppositely polarized, or retained between electrodes as capacitors. The adsorbed contaminants can be further mineralized by anodic oxidation as described above, or be released into a concentrated solution by reversing or canceling the electrode polarization.

Thus, embodiments of REM systems of the present disclosure can be operated in different modes and combinations that couple filtration, sorption, and electrochemical reactions in a synergistic manner to achieve efficient and cost-effective removal and degradation of mixed COCs. In embodiments, multiple electrode/membranes of the present disclosure can be employed, and can serve multiple purposes. In embodiments, a first Magnéli phase TSO or ACF-modified TSO electrode/membrane may be used in an embodiment of a REM system of the present disclosure to electrostatically filter contaminants as described above, to concentrate them. After passing this first filter, the concentrated composition can proceed to a second Magnéli phase TSO or ACF-modified TSO electrode/membrane acting as an anode to adsorb and mineralize PFASs. After this filter, the composition can proceed to a third Magnéli phase TSO or ACF-modified TSO electrode/membrane as a cathode, or the applied voltage of the second electrode can be changed to serve as cathode and reduce TCE present in the composition. Embodiments of such systems are described in greater detail in Example 3.

Figure 24:
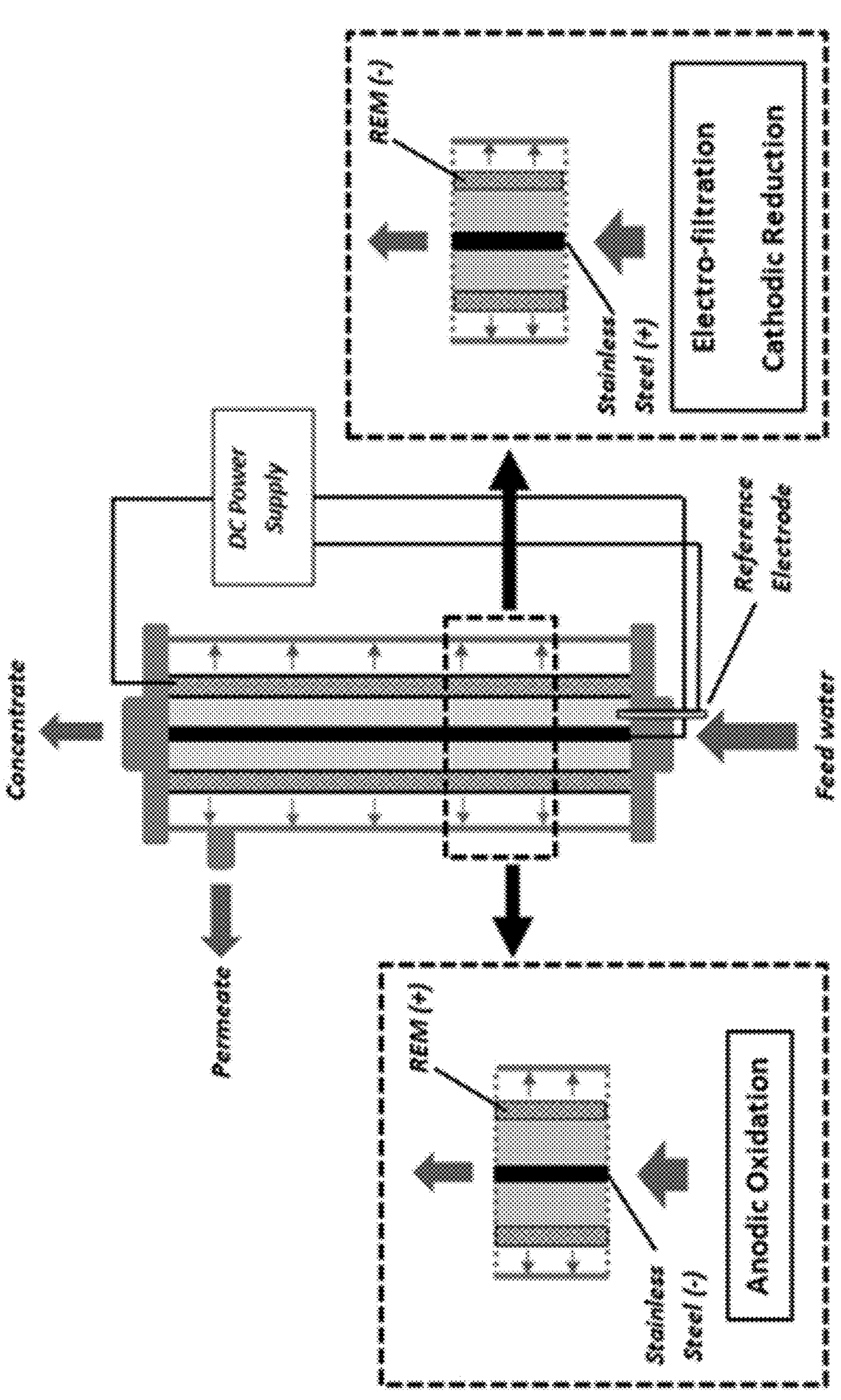
FIG. 24 is another illustration of the REM unit in cross-flow filtration mode as in FIG. 23, with a detailed view of the tubular electrode showing anodic oxidation and cathodic reduction, depending on the applied voltage.
Figure 25:
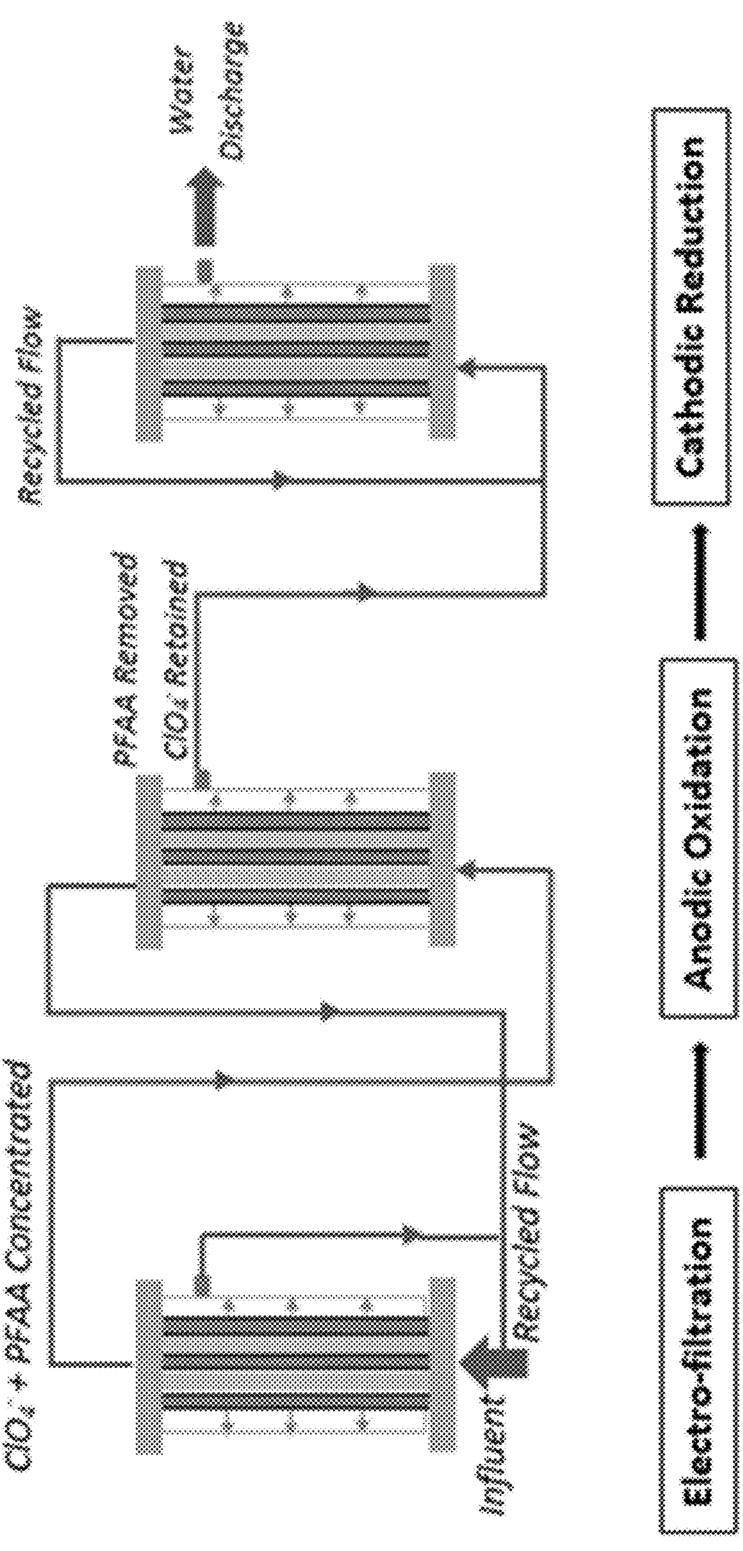
FIG. 25 is a schematic illustration of the setup of an embodiment of an REM unit operated in a sequential cross-flow filtration mode.

In embodiments of a cross-flow REM system of the present disclosure, such as illustrated in FIG. 24 and described in Example 3, below, the systems include one or more tubular shaped Magnéli phase TSO or ACF-modified TSO membrane to be used as the working electrode. A stainless steel (or other appropriate material) rod can be used as the counter electrode (e.g., placed longitudinally in the tubular working electrode). The electrode can serve as anode or cathode depending on applied potential, as described above, to either oxidize PFASs or reduce TCE. In other embodiments of cross-flow REM systems, multiple tubular electrodes as described above can be set up in series, such as illustrated in FIG. 25 and described in greater detail in Example 3, below. In such systems, a first electrode can be used for electro-filtration to concentrate PFASs and TCEs, a second electrode for anodic oxidation to remove PFASs and retain TCEs, and a third electrode for cathodic reduction to remove TCE. Compositions can be recirculated through the system as needed for decontamination.

Figure 26:
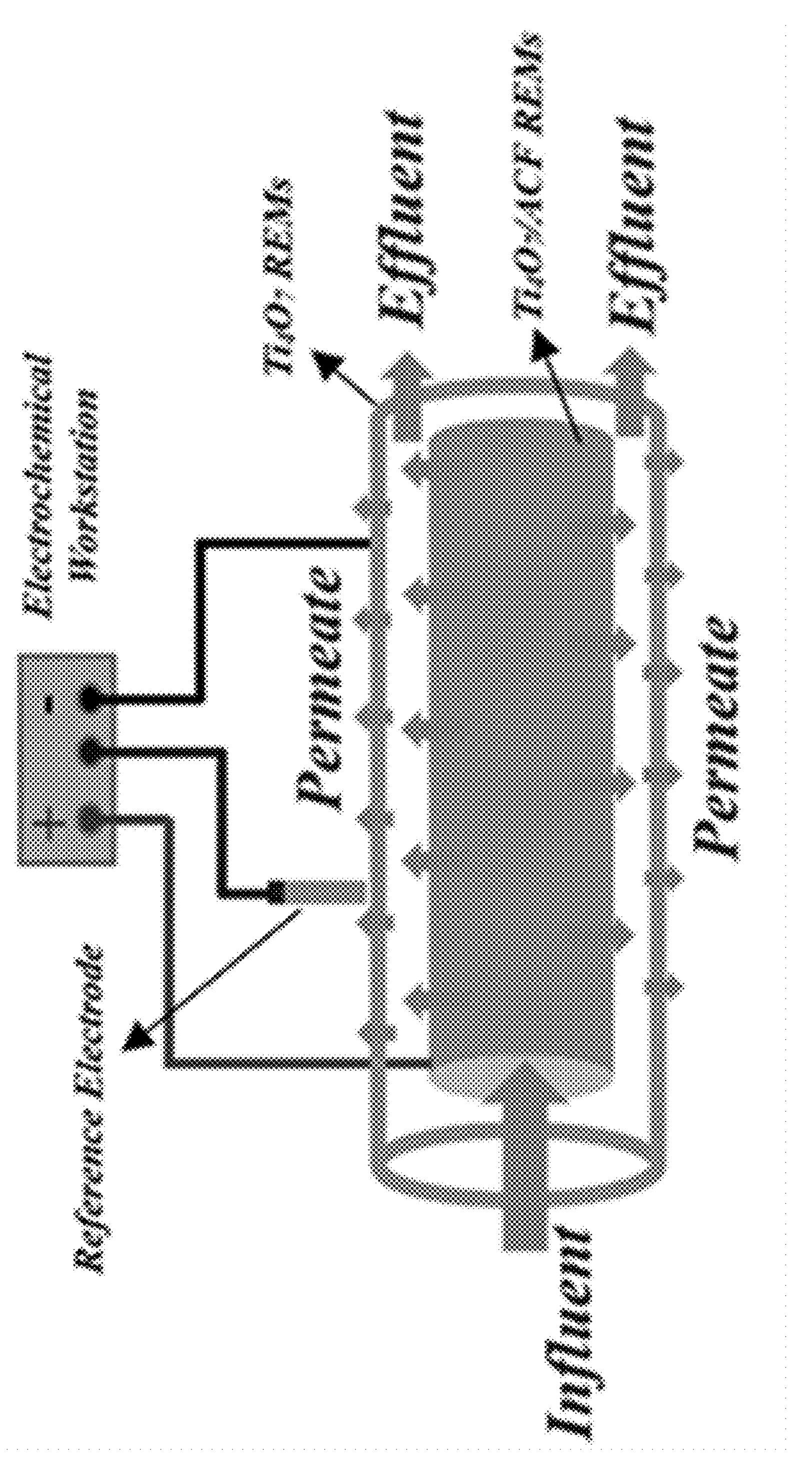
FIG. 26 illustrates an embodiment of a combined REM system with concentric tubular electrodes.

In yet another embodiment, a combined REM system can be prepared such as described in FIG. 26, with concentric tubular Magnéli phase TSO or ACF-modified TSO membranes of the present disclosure. In embodiments the inner membrane serves as the anodic membrane for oxidation of PFASs and TCE, and the outer membrane cathodic membrane rejects or reduces chlorate depending on applied potentials. Additional systems with other configurations of the Magnéli phase TSO or ACF-modified TSO membranes of the present disclosure can be contemplated within the scope of the present disclosure.

Methods of Making Porous Magnéli Phase TSO Ceramic Electrode/Membranes

In embodiments, the present disclosure, also provides methods of making a porous Magnéli phase TSO (e.g., $Ti_4O_7$ or $Ti_4O_7/Ti_5O_9$) ceramic electrode of the present disclosure described above. In embodiments, methods of making the electrodes includes providing $TiO_2$ and reducing the $TiO_2$ at a temperature of about 500° C. or above. In embodiments, the $TiO_2$ is reduced at a temperature of about 500 to 1000° C. or above. In embodiments, $TiO_2$ is reduced at a temperature of about 950° C. In embodiments, the $TiO_2$ is reduced at the above temperatures under $H_2$ atmosphere or vacuum to produce a $Ti_4O_7$ (or $T_4O_7/Ti_5O_9$) nanopowder. Then the nanopowder is mixed with an optional binder and optional porogen to form a slurry. Examples of optional porogens include, but are not limited to, graphite powder and NaCl. The slurry is then dried to form ceramic granulates. In embodiments, the slurry is dried via spray drying, to produce ceramic granulates of about 40-80 mesh having about 5% moisture content. The dried granulates can then be pressed to produce a $Ti_4O_7$ material, such as a preform for a membrane or electrode. After pressing, the $Ti_4O_7$ (or $Ti_4O_7/Ti_5O_9$) material is dried and sintered at high heat for sufficient time to produce the porous Magnéli phase $Ti_4O_7$ or $T_4O_7/Ti_5O_9$ (e.g., Ebonex®) ceramic electrode. In embodiments, the pressed titanium oxide material is dried/sintered at a temperature of about 1000° C. or above for a time of about 3 hours or more. In embodiments, the material is dried/sintered for about 3-12 hours. In embodiments, the temperature is about 1350° C. for about 11 hours. The methods described produce a porous Magnéli phase $Ti_4O_7$ or $Ti_4O_7/Ti_5O_9$ ceramic electrode having a plurality of pores. The pores can have dimensions as described above, and the material can have a porosity as described above as well. In embodiments, at least a portion of the pores are interconnected.

In embodiments of making the porous Magnéli phase $Ti_4O_7$ or $Ti_4O_7/Ti_5O_9$ ceramic electrodes, the porosity and dimensions of the pores can be controlled by manipulating various aspects of the process, such as, but not limited to: using precursor nano powders of different sizes, using different formulas in the pulping process, maintaining the material at different moisture content during the granulating process, and using a different pressure in the forming process. The thickness, shape, and dimensions of the electrodes of the present disclosure can also be adjusted using different molds during the forming process.

In embodiments, the porous Magnéli phase $Ti_4O_7$ or $Ti_4O_7/Ti_5SO_9$ ceramic electrode can be made in various shapes depending on the intended application. For instance, as shown in FIGS. 4A-4D and described in greater detail in Example 1, below, the electrodes can be made into a cylindrical shape, disk shape, rectangular shape, and the like. Additional details about embodiments of making the porous Magnéli phase $Ti_4O_7$ or $Ti_4O_7/Ti_5O_9$ ceramic electrodes of the present disclosure are described in the Examples, below.

The electrochemical properties of the porous Magnéli phase $Ti_4O_7$ or $Ti_4O_7/Ti_5O_9$ ceramic electrodes of the present disclosure can also be modulated by processes such as doping (e.g., adding transition metal oxides, such as, but not limited to $SnO_2$, $CeO_2$, $La_2O_3$, $V_2O_5$, $Nd_2O_3$ to the $Ti_4O_7$ or $Ti_4O_7/Ti_5O_9$ powders before sintering.

The present disclosure also includes additional embodiments of methods of making porous Magnéli phase $Ti_4O_7$ or $T_4O_7/Ti_5O_9$ of the present disclosure. In an embodiment, high temperature reduction of preformed $TiO_2$ membranes under $H_2$ atmosphere or vacuum can be used to form the porous electrodes. In another embodiment, $Ti_4O_7$ can be used to modify the surfaces of commercially available ultrafiltration and microfiltration ceramic membranes. In yet another embodiment, polyurethane foam can be used as a template to produce Magnéli phase $Ti_4O_7$ or $T_4O_7/Ti_5O_9$ foam electrodes. The porosity of the product from high temperature reduction of preformed $TiO_2$ membranes could be greater than those in the precursor membranes due to successive phase changes and the removal of water vapor. There are many commercially available ultrafiltration and microfiltration ceramic membranes having proven hydrodynamic performances. Surface modification of such membranes, e.g., Ti, $Al_2O_3$ or $ZrO_2$, with $Ti_4O_7$ is a viable way to obtain the membrane electrodes of the present disclosure. In embodiments, the precursor ceramic membrane can be dip-coated with a layer of $Ti_4O_7$ or $TiO_2$, and then sintered at high temperature under vacuum or $H_2$ atmosphere to reduce $TiO_2$ to $Ti_4O_7$. The production of Magnéli phase $Ti_4O_7$ or $Ti_4O_7/Ti_5O_9$ foam electrodes will follow a similar procedure as the high temperature sintering process, except that the $Ti_4O_7$ nano powder slurry is coated to a polyurethane foam template before sintering instead of the granulating and forming steps.

Now having described the embodiments of the present disclosure, in general, the Examples, below, describe some additional embodiments of the present disclosure. While embodiments of the present disclosure are described in connection with the Examples and the corresponding text and figures, there is no intent to limit embodiments of the present disclosure to these descriptions. On the contrary, the intent is to cover all alternatives, modifications, and equivalents included within the spirit and scope of embodiments of the present disclosure.

EXAMPLES

Example 1

The present example describes fabrication and testing of an embodiment of a Magnéli phase $Ti_4O_7$ ceramic microfiltration material having extensive interconnecting micropores with an average pore size of 2.6 μm and a porosity of 21.6%. The electrodes were fabricated using a high-temperature sintering method and then tested as an anode in a batch mode for electrooxidative mineralization of environmentally persistent PFAAs: perfluorooctanoate (PFOA) and perfluorooctane sulfonate (PFOS).

The porous $Ti_4O_7$ ceramic electrode exhibited superior electrooxidation capability, leading to greater PFOA/PFOS degradation rates than boron-doped diamond and Ce-doped $PbO_2$ electrodes. Over 95% defluorination and total organic carbon (TOC) removal were achieved in a solution initially containing 0.5 mmols $L^{-1}$ PFOA, at an energy cost of 76 Wh $g^{-1}$ PFOA. Only trace amounts of perfluorocarboxylic acid (PFCAs) with shortened chain lengths were observed as intermediates during PFOA mineralization. $SO_4^{2-}$ and $F^-$ were recovered as the mineralization products of PFOS electrooxidation, while no organofluorine compounds, such as shorter-chain PFCAs, were identified in the solution by high-resolution mass spectrometry (HRMS). The results illustrate the effective use and superior performance of Magnéli phase $Ti_4O_7$ ceramic electrode for electrochemical treatment of PFOA/PFOS in water.

In this example, Magnéli phase $Ti_4O_7$ ceramic microfiltration membrane materials were fabricated and used as an anode, for the first time, to mineralize aqueous PFOA/PFOS operated in a batch mode. The objective was to investigate the performance of the $Ti_4O_7$-based electrooxidation system towards PFOA/PFOS degradation and explore reaction mechanisms. Tests with other "non-active" electrodes including $Ti/SnO_2$—Sb/Ce—$PbO_2$ and Ti/BDD electrode were also conducted for comparison. High-resolution mass spectrometry (HRMS) was employed to identify possible intermediate byproducts.

Experimental Section

Preparation of Macroporous Magnéli Phase $Ti_4O_7$ Ceramic Membrane Materials. Macroporous Magnéli phase $Ti_4O_7$ ceramic materials were prepared by a high-temperature sintering method. In brief, Magnéli phase $Ti_4O_7$ nano powders were first synthesized by reducing $TiO_2$ nano powders at 950° C. under a $H_2$ atmosphere. Subsequently, the preformed $Ti_4O_7$ nano powders were mixed with a binder (e.g., polyacrylamide and polyvinyl alcohol) to form a slurry. The nano powders can also be mixed with a porogen to assist in pore formation, but pores are also formed naturally during the drying/sintering process described below. The slurry was spray-dried to small ceramic granulates (40~80 mesh, 5% moisture content). The ceramic granulates were loaded into a mold, vibrated, and then pressed using an isostatic press at 60 MPa for 5 min to make a ceramic preform. The ceramic preform was then dried and finally sintered at 1350° C. in a vacuum for 11 h.

Characterization. The surface morphology of the prepared Magnéli phase $Ti_4O_7$ ceramic materials was observed by scanning electron microscopy (SEM; S4800, Hitachi, Japan). The conductivity of the $Ti_4O_7$ powders was measured by a Four Point Probes testing system (FZ-2010, Yiyu, China). The crystalline phases of the synthesized $Ti_4O_7$ powders were identified using an X' Pert Pro MPD (Panalytical Co., Holland) X-ray diffractometer (XRD) with Cu Kα radiation at 40 KV/40 mA. The pore size distributions and porosity of the $Ti_4O_7$ ceramic materials were measured by mercury porosimetry (AutoPore IV 9500, Micromeritics). The linear sweep voltammetry (LSV) and cyclic voltammetry (CV) were carried out in conventional three-electrode electrochemical cells driven by CHI 660e (Shanghai Chenhua, China) electrochemical workstation. The $Ti_4O_7$ porous ceramic served as the work electrode (1 cm×1 cm), while a platinum foil (2 cm×2 cm) and saturated calomel electrode (SCE) served as the counter electrode and the reference electrode, respectively.

Materials. All chemicals used in the experiments were reagent grade or higher and used as received. Perfluoropropanoic acid (PFPrA, 98%), perfluorobutanoic acid (PFBA, 98%), perfluopentanoic acid (PFPeA, 98%), perfluorohexanoic acid (PFHxA, 98%), perfluoheptanoic acid (PFHpA, 98%), and PFOA (98%) were from Sigma-Aldrich Chemical Co., Ltd. (St. Louis, MO, USA). PFOS (98%) was provided by J&K Scientific (Beijing, China). $^{13}C_4$-PFOA and $^{13}C_8$-PFOS were obtained from Wellington Laboratories (Guelph, ON, Canada) and used as internal standards. Perchloric sodium ($NaClO_4$) and ammonium acetate ($CH_3COONH_4$) were obtained from Sinopharm (Beijing, China). Milli-Q (deionized, DI) water with conductance of 18.2 MΩ cm at 25±1° C. was prepared by a Millipore water system and used in all experiments.

Electrolytic Cell Construction and Experiments. Electrooxidation of PFOA/PFOS experiments were conducted in a 250-mL glass breaker in a batch mode. The porous $Ti_4O_7$ ceramic, $Ti/SnO_2$—Sb/Ce—$PbO_2$ (Ce—$PbO_2$), or Ti/BDD (BDD) electrode was used as the anode. Although anodic polarization during electrooxidation with high current density might gradually passivate electrode surfaces and decrease the activity of Magnéli phase $Ti_4O_7$ ceramic electrode, in this study, no obvious change of oxidation rates was observed for duplicate experiments after 24 h or longer polarization under a current density less than 10 mA $cm^{-2}$, indicating that passivation did not occur.

Ce—$PbO_2$ electrode was prepared as described in Lin et al., *Environ. Sci. Technol.* 2013, (which is hereby incorporated by reference herein). The BDD electrode, synthesized by the hot-filament chemical vapor deposition technique (HF CVD), was obtained from CONDIAS GmbH (Germany). All the anodes were rectangular in shape with a dimension of 10 cm×5 cm.

The electrolytic cell contained one anode and two cathodes (304 stainless steel sheets) that were 10 cm long and 5 cm wide, and the anode was situated between the two cathodes with an interelectrode gap of 1.5 cm. In each run, an aqueous solution (200 mL, deionized water) of 0.5 mM PFOA or 0.1 mM PFOS, with 20 mM $NaClO_4$ as electrolytes, was added into the cell and stirred continuously using a magnetic stirrer (IKA-RCT, Germany) at a rate of 800 r $min^{-1}$. Subsequently, the electrolysis system was operated at a constant current density of 5 mA $cm^{-2}$. In all cases, a direct current was supplied by a DC regulated power source (Beijing Dahua Radio Instrument, China). Samples were taken at different time intervals, and, when sampling, the electrolysis was stopped and the solution was sufficiently stirred to ensure a homogeneous solution. All tests were triplicated and carried out at room temperature (25±1° C.).

Chemical Analysis. The concentrations of PFOS, PFOA and their decomposition intermediates were analyzed using an ultra-performance liquid chromatography coupled with a triple-stage quadrupole mass spectrometer (UPLC-MS/MS, Xevo TQ, Waters Corp., USA) equipped with Acquity UPLC BEH C18 column (2.1 mm×50 mm, 1.7 μm). The column oven was kept at 40° C. The mobile phase A was 5 mM ammonium acetate in 100% methanol, and the mobile phase B was 5 mM ammonium acetate in 100% $H_2O$. The flow rate and the gradient condition are listed in Table 1, below. The sample volume injected was 5 μL with an automatic sampler. The analysis was carried out in multiple reaction monitoring (MRM) mode. Electrospray ionization (ESI) was operated in a negative mode with the parameters set as capillary potential at −1.03 kV, source temperature at 150° C., and desolvation temperature at 450° C. The condition of mass spectrum was specified in Table 2. The chromatogram of pure standards and calibration condition are shown in FIG. 1 and Table 3, respectively. Each sample was spiked with 5 mM of $^{13}C_2$-PFOA or $^{13}C_8$-PFOS as the internal standard.

In addition, an Orbitrap Elite high-resolution mass spectrometer (HRMS, Thermo Scientific, San Jose, CA) was used to identify the possible degradation byproducts of PFOA/PFOS. Full scan and tandem mass fractionation (resolution R=250000, for m/z=100~1000) was performed in ESI negative mode. The identification of the byproducts was based on element compositions and product ion spectra (MS/MS). Before mass spectrometry analysis, samples were subjected to solid phase extraction (SPE) (Oasis HLB SPE cartridges, 3 cc, 60 mg, Waters, Milford, MA) as described in Luo, Q., et al., *Envrion Sci Technol. Lett.* 2015, 2, 198-203, which is hereby incorporated by reference).

The $F^-$ and $SO_4^{2-}$ concentrations in the reaction solutions were measured by an ion chromatography system (Dionex ICS-1100) as described previously (Lin, H., et al., *Environ. Sci. Technol.* 2013, and Lin, H. et al., *Elecrochim. Acta* 2013, both of which are incorporated by reference herein). Total organic carbon (TOC) concentrations were measured by a multi N/C UV TOC analyzer (Analytic Jena, Germany) using a catalytic combustion method at 800° C.

Results and Discussion

Figure 2C:
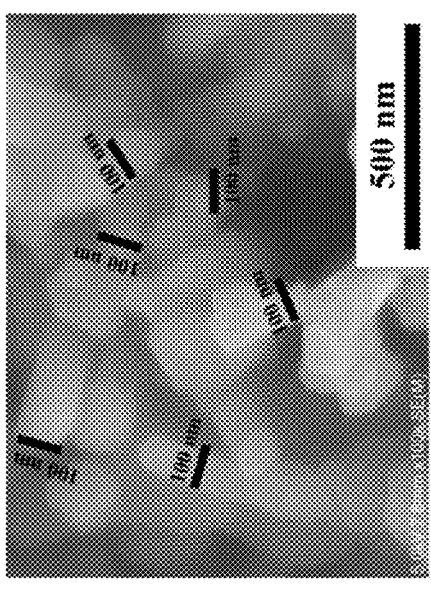
FIGS. 2A-2C illustrate digital (FIG. 2A) and SEM (FIGS. 2B-2C) images of an embodiment of synthesized $Ti_4O_7$ nano powders at different magnifications.
Figure 2B:
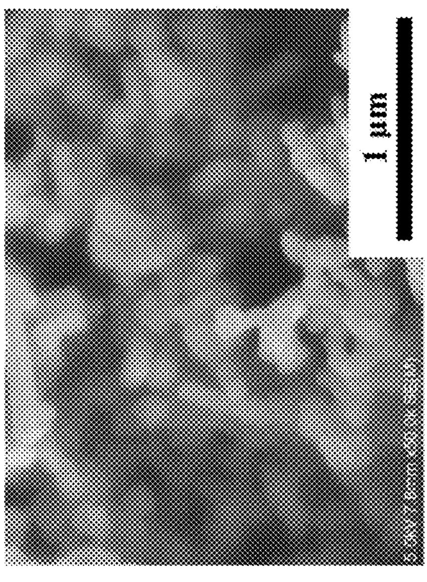
Figure 2A:
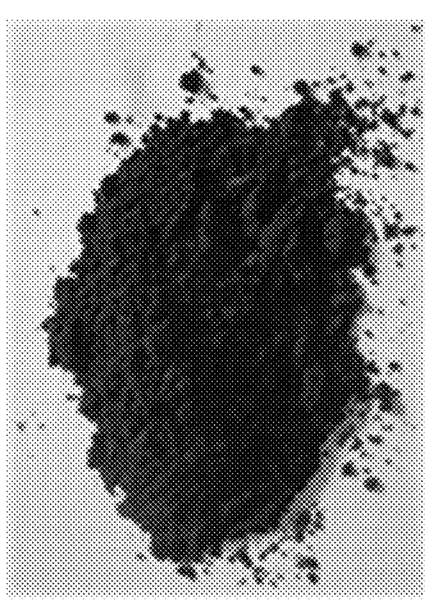
Figure 3:
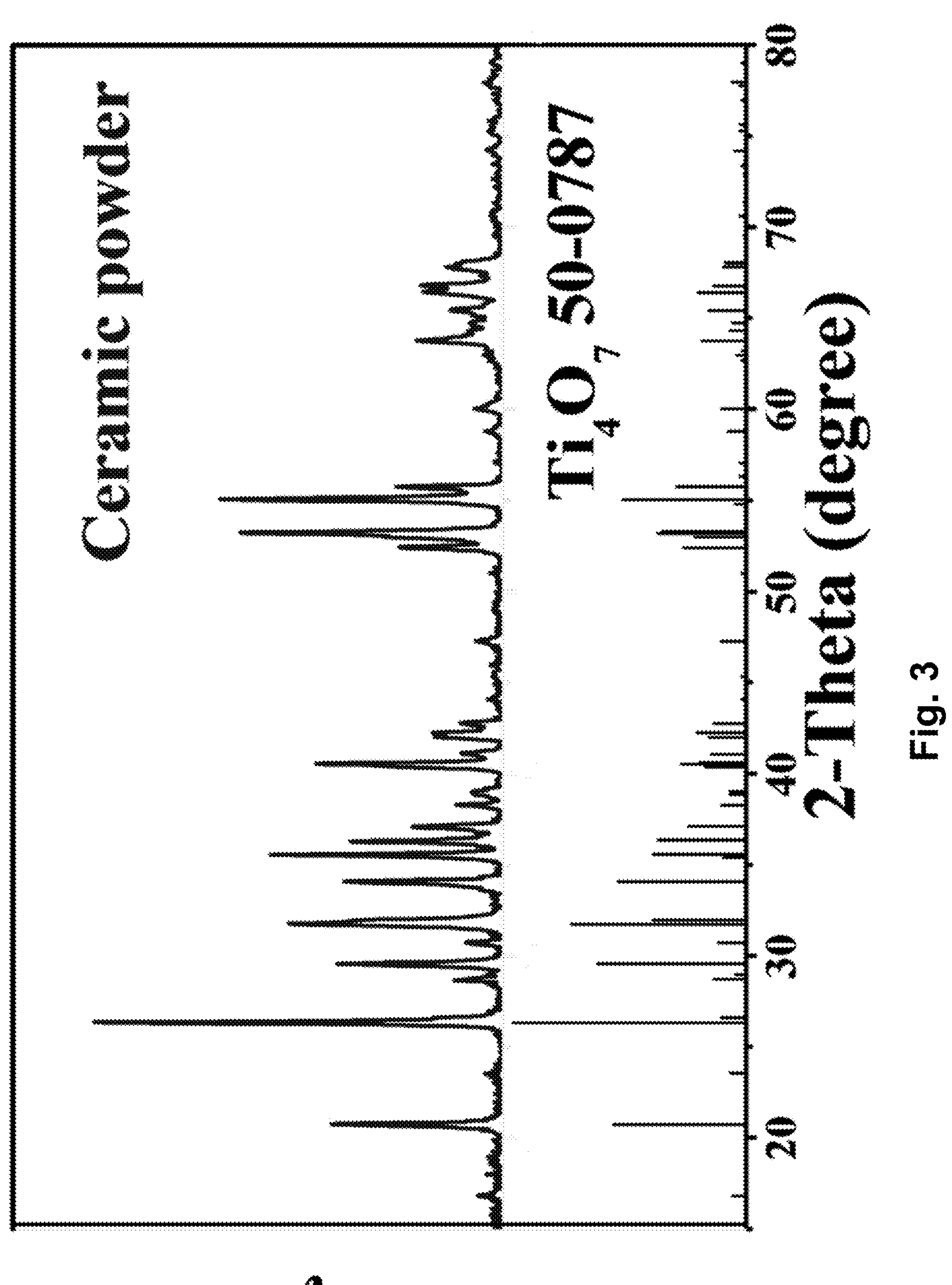
FIG. 3 illustrates the XRD spectrum of an embodiment of synthesized $Ti_4O_7$ nano powders.

Physical Characterization. FIGS. 2A-2C show a digital image and different magnification SEM images of the synthesized $Ti_4O_7$ nano ceramic powder. The raw $TiO_2$ powder material has a similar particle size to the $Ti_4O_7$ powder. It can be seen from FIG. 2C that the size distribution of the $Ti_4O_7$ powder is generally uniform with a diameter less than about 100 nm. A particle size and zeta potential analyzer (Zetasizer3000HS, VARIAN, USA) was used to determine the size distribution of the fabricated $Ti_4O_7$ nano powder (data not shown), and the results indicated the median diameter of the $Ti_4O_7$ nano powder was 203 nm based on number, significantly larger the value observed by SEM. This is likely due to the agglomeration behavior of the nano-particles, rendering it difficult to obtain a completely accurate size of nano-particles in aqueous solution Resistance test results show that this $Ti_4O_7$ ceramic powder has excellent conductivity, with an electric resistance of $2.4\times10^{-4}$ Ωcm. High purity $Ti_4O_7$ ceramic membrane materials were successfully fabricated by a high-temperature sintering method under vacuum conditions, as described above. An XRD spectrum of the porous $Ti_4O_7$ ceramic membrane materials of the present example (top) in comparison to that of a $Ti_4O_7$ standard (bottom) are illustrated in FIG. 3. Since $Ti_4O_7$ exhibits one of the highest electrical conductivities of the titanium oxides, impurities of titanium suboxides other than $Ti_4O_7$ could decrease the overall conductivity.

Figures 5A, 5B:
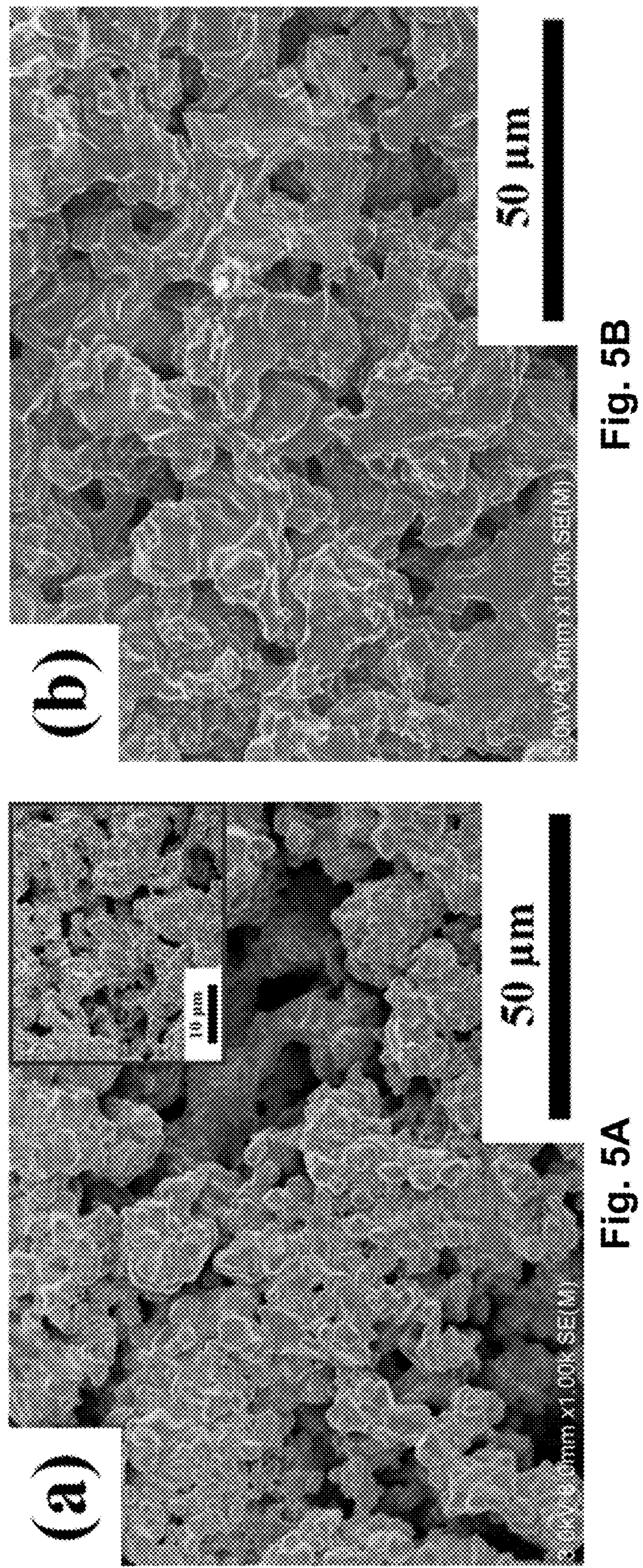
FIGS. 5A-5B are digital SEM images illustrating the surface (5A) and cross-section (5B) of embodiments of fabricated Magnéli phase $Ti_4O_7$ porous ceramic materials from Example 1.
Figures 5C, 5D:
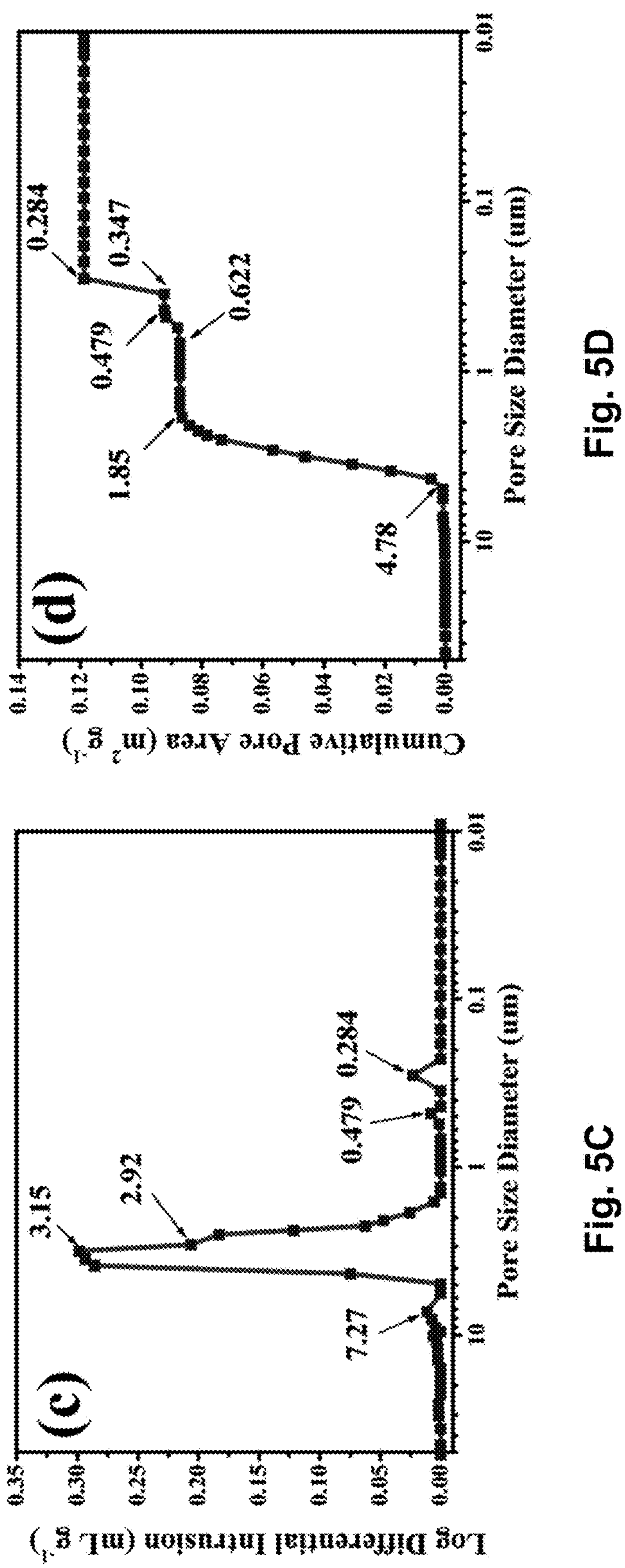
FIGS. 5C-5D are graphs illustrating results of Hg intrusion porosimetry analysis of pore size distribution of these materials.
Figure 20:
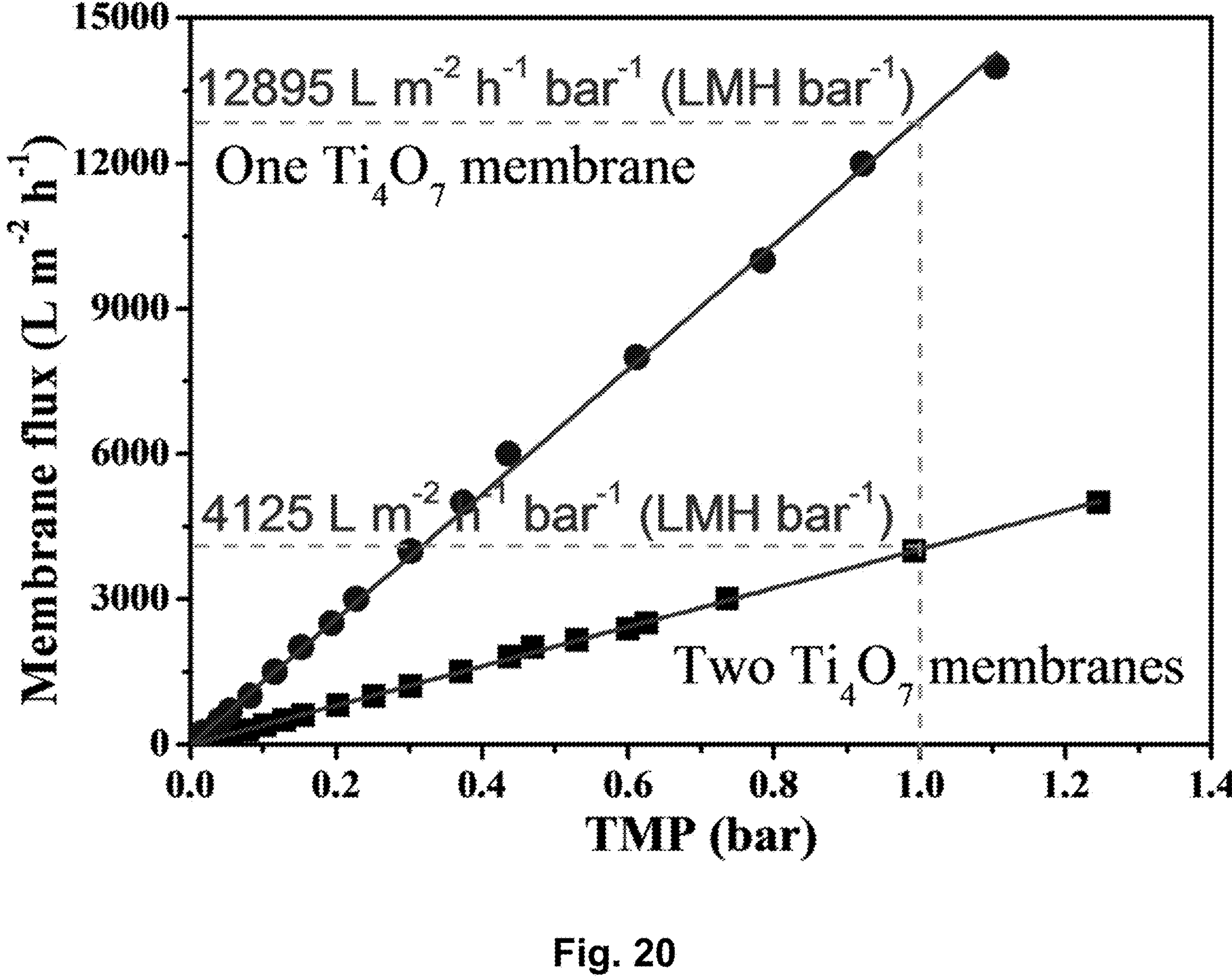
FIG. 20 is a graph illustrating the water permeability of an embodiment of a porous Magnéli phase $Ti_4O_7$ electrode/membrane of the present disclosure.

FIGS. 4A-4D show images of embodiments of fabricated Magnéli phase $Ti_4O_7$ ceramic membrane materials in different shapes (a tube (4A), a circular plate (4B), and rectangular plates (4C and 4D). Testing indicated strong water permissibility of the porous material (FIG. 20). The morphology of the $Ti_4O_7$ ceramic material surface was characterized using SEM (FIGS. 5A and 5B) in which extensive interconnecting micropores were evident with sizes ranging within approximately 1~8 μm. The pore structure and pore size distribution was characterized more thoroughly using Hg porosimetry (FIGS. 5C and 5D). The material exhibits a multimodal pore size distribution, with the majority of the intrusion pore volume attributed to the macropores of 1~5 μm diameter and only about 25% of the measured surface area associated with pores from 280 nm to 600 nm. Porosimetry measurement reveals a porosity of 21.6%, and a median pore diameter of 3.6 μm (based on volume) or 2.8 μm (based on area), and an average pore diameter of 2.6 μm. These results indicated that the fabricated $Ti_4O_7$ ceramic material has properties of a microfiltration membrane. The fact that micro-sized pores dominated the pore volume and surface area of the fabricated $Ti_4O_7$ ceramic membrane materials will facilitate water permeation, and thus yield low hydraulic resistance during the filtration process when it is operated as a membrane. The pure water permeability of the fabricated $Ti_4O_7$ ceramic microfiltration membrane was determined to be more than 12.9 $m^3\ m^{-2}\ h^{-1}\ bar^{-1}$ under a dead-end flow mode by the standard flux-step method (FIG. 20).

This study focused on the performance of the fabricated $Ti_4O_7$ ceramic material in rectangular plate shape (10 cm×5 cm×0.3 cm) as an anode for PFOA/PFOS mineralization operated in a batch mode. The specific surface area of the $Ti_4O_7$ ceramic material was 0.12 $m^2\ g^{-1}$, yielding a total macroporous surface area of about 6.5 $m^2$ of the selected plate electrode used in the subsequent PFOA/PFOS electrooxidation experiments, about 1302 times the nominal geometric area (50 $cm^2$). It should be noted, however, that not all micro/macroporous surface area in the porous $Ti_4O_7$ ceramic electrode is necessarily electro-active.

Figures 6A, 6B:
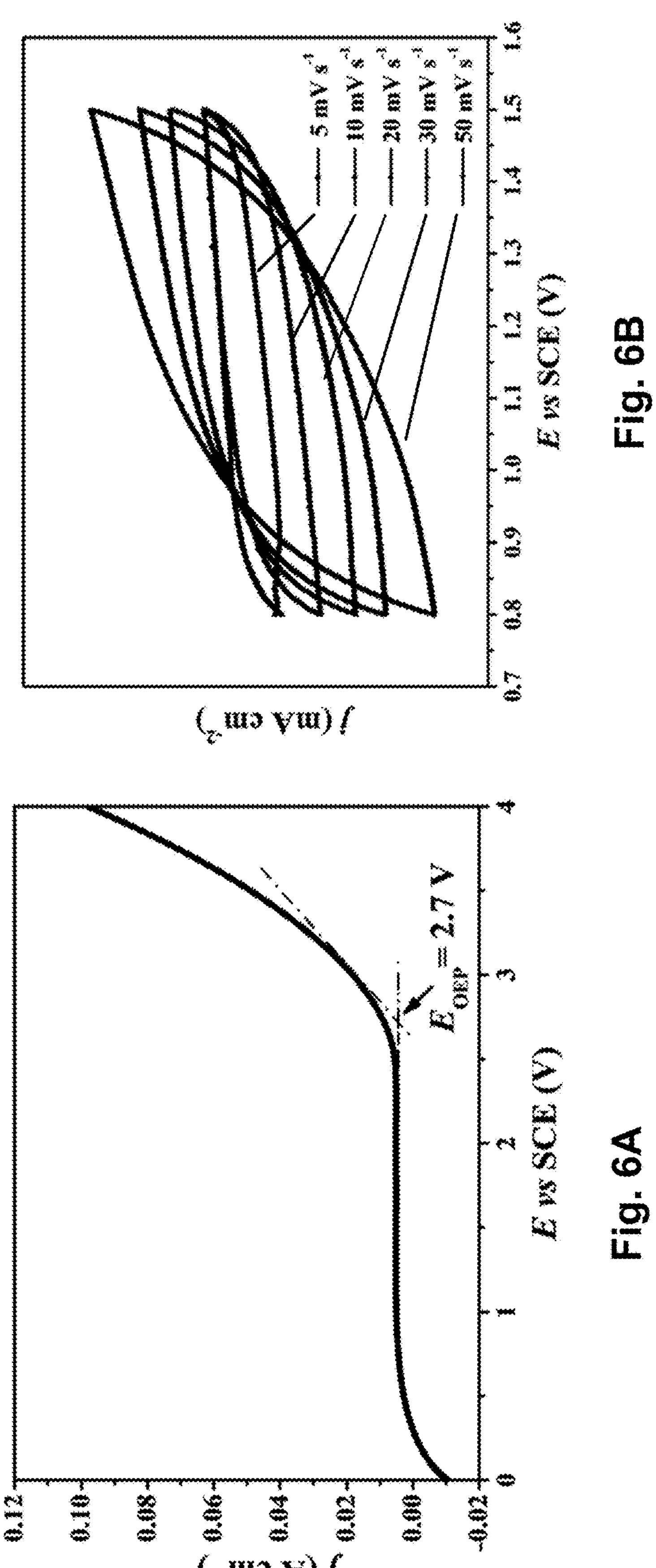
FIGS. 6A-6B are graphs showing linear polarization curves of $Ti_4O_7$ porous ceramic electrode in 0.5 M $H_2SO_4$ solution (6A), scan rate: 100 mV $s^{-1}$ and cyclic voltammograms of $Ti_4O_7$ porous ceramic electrode in 0.25 M $Na_2SO_4$ solution (6B) at a different scan rate.

Electrochemical Characterization. FIG. 6A displays the linear polarization curves of the $Ti_4O_7$ porous ceramic electrode in 0.5 M $H_2SO_4$ solution at a scan rate of 100 $mV\ s^{-1}$. The oxygen evolution potential (OEP) of the $Ti_4O_7$ porous ceramic electrode was exceptionally high, around 2.7 V vs SCE, much higher than the other "non-active" electrode materials. A high $O_2$ evolution over-potential would be beneficial for the efficiency of degrading organic pollutants during the electrocatalytic oxidation process.

Figure 7:
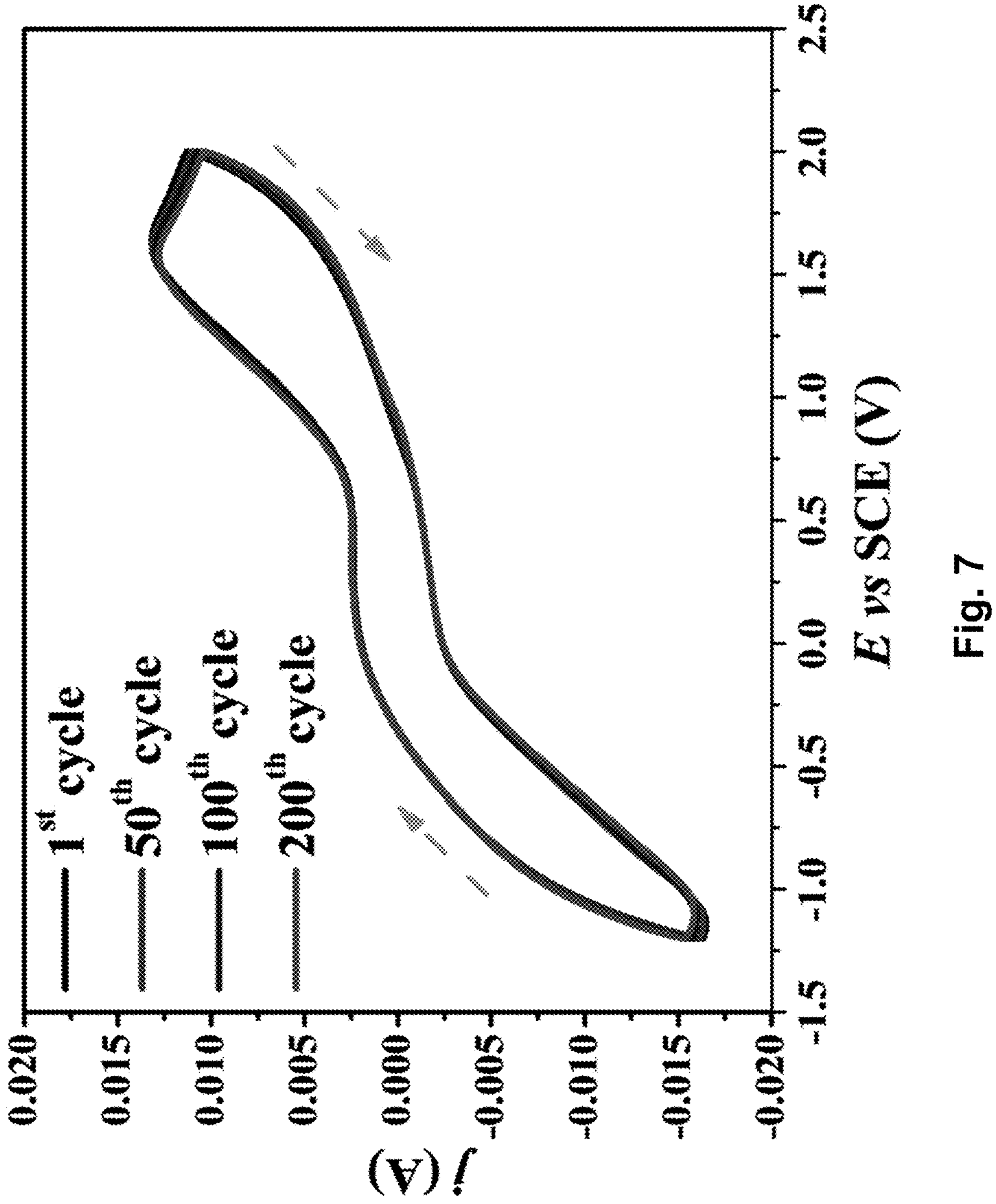
FIG. 7 illustrates cyclic voltammetry curves of $Ti_4O_7$ porous ceramic electrode in 10 mM $K_4Fe(CN)_6$+0.1 M $KNO_3$ solution.

In addition, the electrochemical stability of the $Ti_4O_7$ porous ceramic electrode was evaluated by CV (FIG. 6B) because the electron transfer of $Fe(CN)_6^{3-}/Fe(CN)_6^{4-}$ is extremely sensitive to surface properties of the electrodes. As shown in FIG. 7, besides the $Fe(CN)_6^{4-}$ oxidation peak, there are no other peaks observed attributed to reduction and/or re-oxidation of the Magnéli phase sub-stoichiometric $TiO_2$ during the potential region of −1.2 V vs SCE to 2.0 V vs SCE in 10 mM $Fe(CN)_6^{4-}$+0.1 $KNO_3$ solution. After running for 200 cycles, the $Ti_4O_7$ porous ceramic shows only slight change of electrochemical activity, indicating the Magnéli phase $Ti_4O_7$ did not change to other Magnéli phase sub-stoichiometric $TiO_2$ with lower electrocatalytic activity.

Electrochemically active surface area indicates that the active sites are accessible to electrolyte when electrochemical reaction occurs. It is known that voltammetric charge (q) is closely related to the real specific surface area and the amounts of electro-active sites of an electrode, especially for a porous electrode, which affects the electrocatalytic performance of an electrode (as described in Adrizzone, S., et al., *Elecrochim. Acta.*, 1990, and Asim, S., et al., IRSC Adv. 2005, which are hereby incorporated by reference herein). CV was performed to test the q* and electro-active sites of the $Ti_4O_7$ porous ceramic electrode within the potential region of 0.5 V vs SCE to 2.5 V vs SCE in 0.25 $Na_2SO_4$ solution at different sweep rate (5 $mV\ s^{-1}$ to 100 $mV\ s^{-1}$).

Total voltammetric charge ($q_T$*) is the entire electroactive surface of the electrode, which is obtained when scan rate (v) tends to be zero. The $q_T$* can be obtained through plotting the reciprocal of q* against the square root of the potential scan rate (eq (1)).

$$(q^*)^{-1} = (q_T^*)^{-1} + kv^{1/2} \quad (1)$$

The $q_T$* is composed of two fractions, outer voltametric charge ($q_O$*) and inner voltametric charge ($q_I$*), which represent the charge related to the outer geometric and inner unattainable electrode areas, respectively. Among them, the $q_O$* is related to the most accessible electroactive surface area, which is obtained according to the following equation:

$$q^* = q_O^* + kv^{-1/2} \quad (2)$$

Figure 8B:
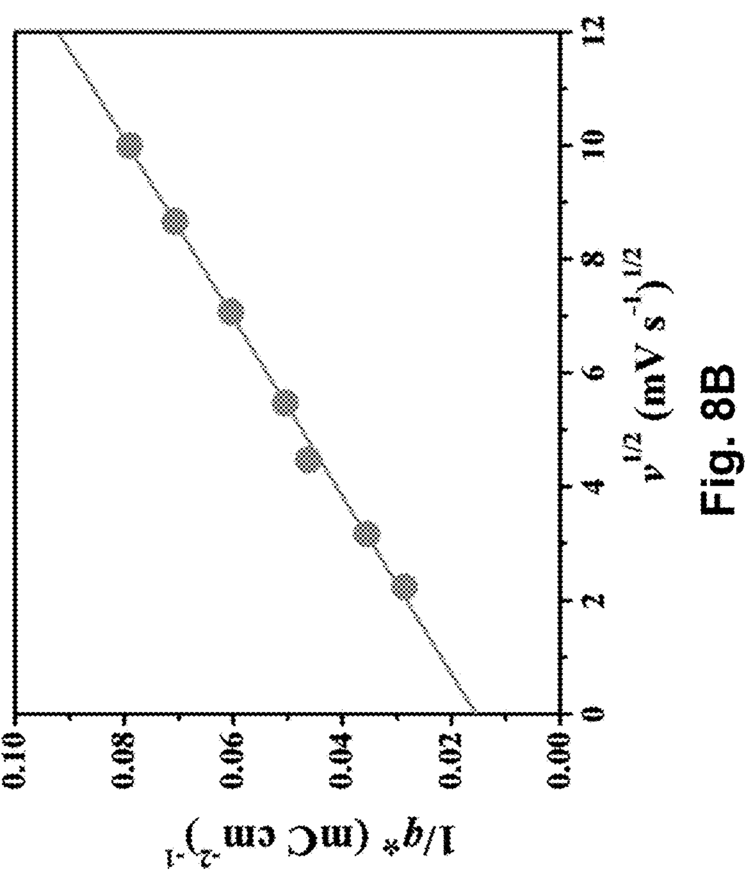
FIGS. 8A-8B illustrate voltammetric charge (q*) vs the reciprocal square root of scan rate ($v^{-1/2}$) (8A); and reciprocal voltammetric charge quantity (1/q*) vs square root of scan rate ($v^{-1/2}$) (8B). Data obtained from the cyclic voltammograms between 0.5 and 2.5 V vs. SCE at various scan rates in 0.25 M $Na_2SO_4$ solution.
Figure 8A:
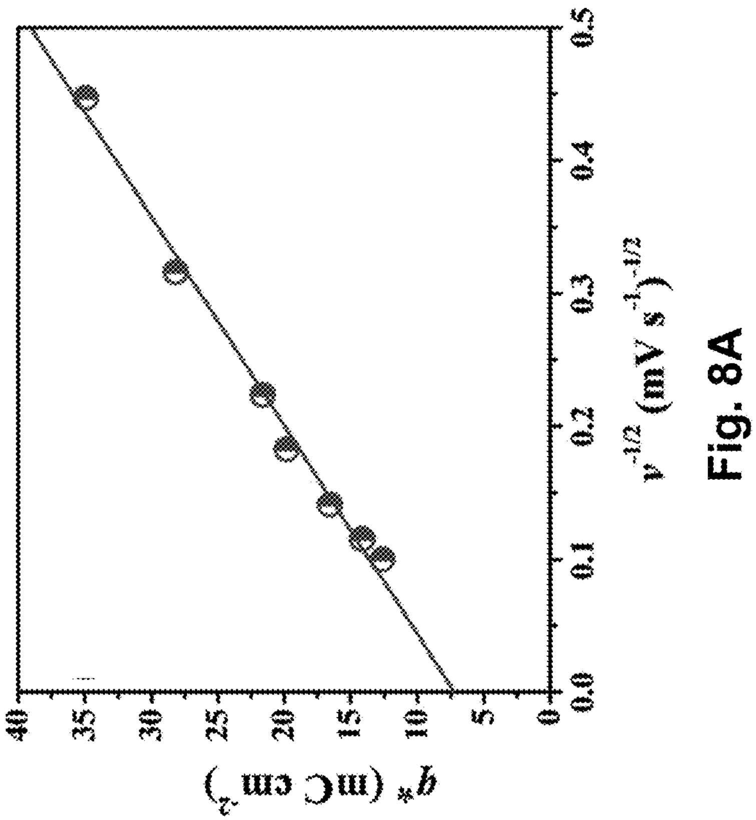
Figure 10:
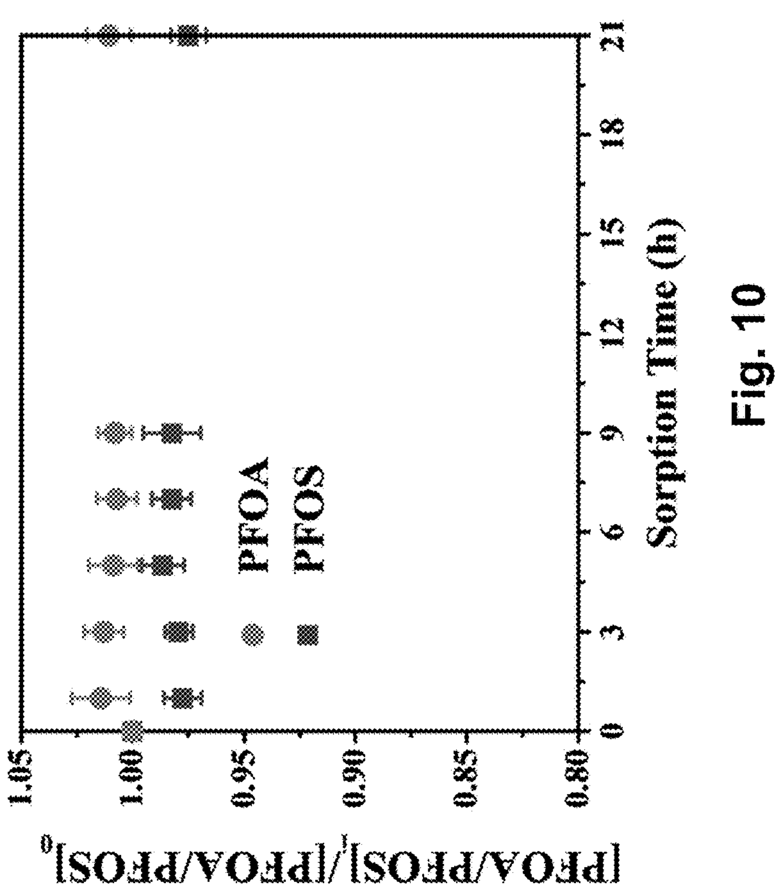
FIG. 10 is a graphic illustration of sorption of 0.25 mM PFOA/PFOS by $Ti_4O_7$ ceramic powder (1 g $L^{-1}$) at pH=3.

On the other hand, the $q_I$* is related to less accessible electroactive sites, which is calculated by subtracting the $q_T$* by $q_O$*. The relation $q_I$* and $q_T$* is defined as the electrochemical porosity, $q_I$*/$q_T$*. Additional details are provided in Table 4 and FIGS. 8A-8B.

Roughness factor ($R_f$) is the electrocatalytic-activity determining factor, which is the real electroactive area per geometrical area of the electrode. It can be calculated by comparing the determined capacitance of the electrode with the average double-layer capacitance of a smooth oxide surface (60 μm) as described in Bockris, J. O. and Otagawa, T., Electrochem Soc. 1984, which is hereby incorporated by reference herein. The calculated average roughness factor was 1075.5±66.8, indicating that the $Ti_4O_7$ porous ceramic electrode is essentially a three-dimensional electrode. Hence, the $Ti_4O_7$ porous ceramic electrode could provide more actual surface area and active sites for electrocatalytic oxidation.

Electrooxidation Capability. A large electro-active surface area may significantly enhance the electro-assisted sorption of PFOA/PFOS onto the porous $Ti_4O_7$ ceramic electrode surface, thus facilitating PFOA/PFOS electron transfer to the anode and subsequent attack by the ·OH radicals generated on the anode surface. Removal of some organic chemicals (e.g., phenols) by a combination of electro-assisted sorption and oxidative destruction on a porous Ebonex ceramic electrode (mix of $Ti_4O_7$ and $Ti_5O_9$) was discussed in Zaky, A. M., et al., *Environ. Sci. Technol.*, 2013).

Figure 9:
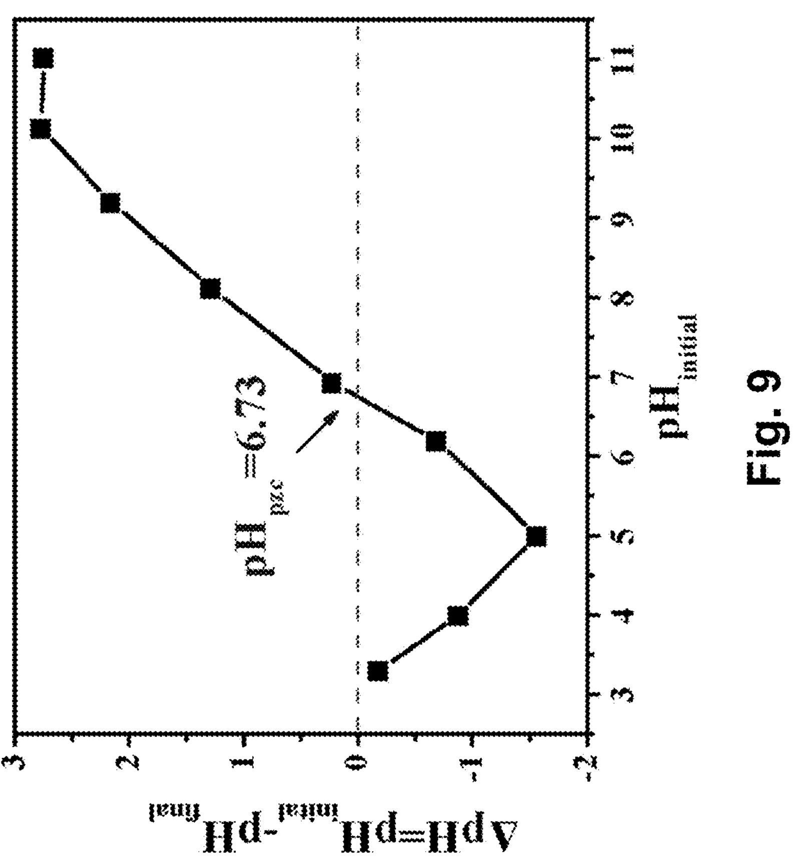
FIG. 9 illustrates point of zero charge ($pH_{pzc}$) of an embodiment of $Ti_4O_7$ porous ceramic material from Example 1.

$Ti_4O_7$ porous ceramic material was first pulverized to facilitate determination. Then, the determination of the point of zero charge ($pH_{pzx}$) for the $Ti_4O_7$ ceramic powder was carried out as described in Gaudet, J. et al, *Chem. Mater.*, 2005 and Faria, P., et al., *Water. Res.*, 2004, both of which are incorporated by reference herein): 50 mL of 0.01 M NaCl solution was placed into each conical flask, and the solution pH was adjusted from 3 to 11 with 0.01 HCl or NaOH solution. Thereafter, 0.05 g of $Ti_4O_7$ porous ceramic was added into each flask, and the flasks were sealed and shaken at 25±1° C. for 48 h. Finally, the equilibrium solution pH values were measured. The pH point where $pH_{initial}$=$pH_{final}$ was taken as the $pH_p$, of the $Ti_4O_7$ porous ceramic material. The obtained results were shown in FIG. 9 as follows. The isoelectric point of $T_4O_7$ porous ceramic material was 6.73, thus, the surface charge of the $Ti_4O_7$ porous ceramic material was positive in an acidic solution. In consideration of the anion property of the PFOA/PFOS due to their low pKa (−3.27 for PFOS, 0.74~2.58 for PFOA), PFOA/PFOS can be adsorbed on the surface of the $Ti_4O_7$ porous ceramic material through the electrostatic interaction.

Figures 11A, 11B:
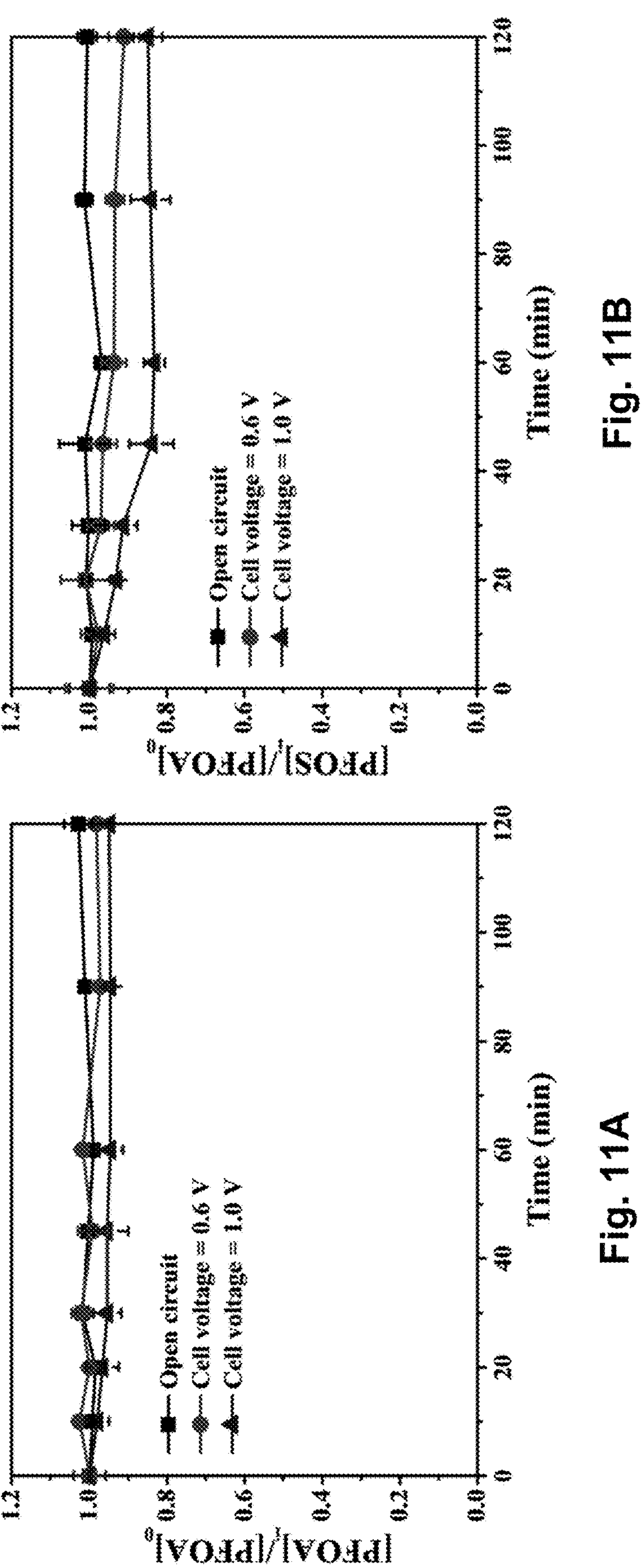
FIGS. 11A-11B are graphic illustrations of concentration of PFOA/PFOS (0.25 mM) vs time under different cell voltage.

Results from the sorption/electro-assisted sorption experiments (FIGS. 9, 10, 11A, and 11B) demonstrated that the $Ti_4O_7$ ceramic material, although having an isoelectric point of 6.73 (FIG. 9), had only a weak or no adsorption of PFOA/PFOS. This is probably because the $Ti_4O_7$ ceramic material is strongly hydrophilic, while PFOA/PFOS are hydrophobic. Interestingly, PFOS can be noticeably adsorbed by electro-assisted sorption. The electro-assisted sorption of PFOS (FIG. 11B) was greater than that of PFOA (FIG. 11A) because PFOS is a stronger acid ($pK_a$=−3.27) than PFOA ($pK_a$=0.74~2.58), which helps it to maintain its negative charge within the boundary layer on the anode surface that is acidic due to water oxidation, and thus facilitates its electro-sorption.

Figures 12A, 12B:
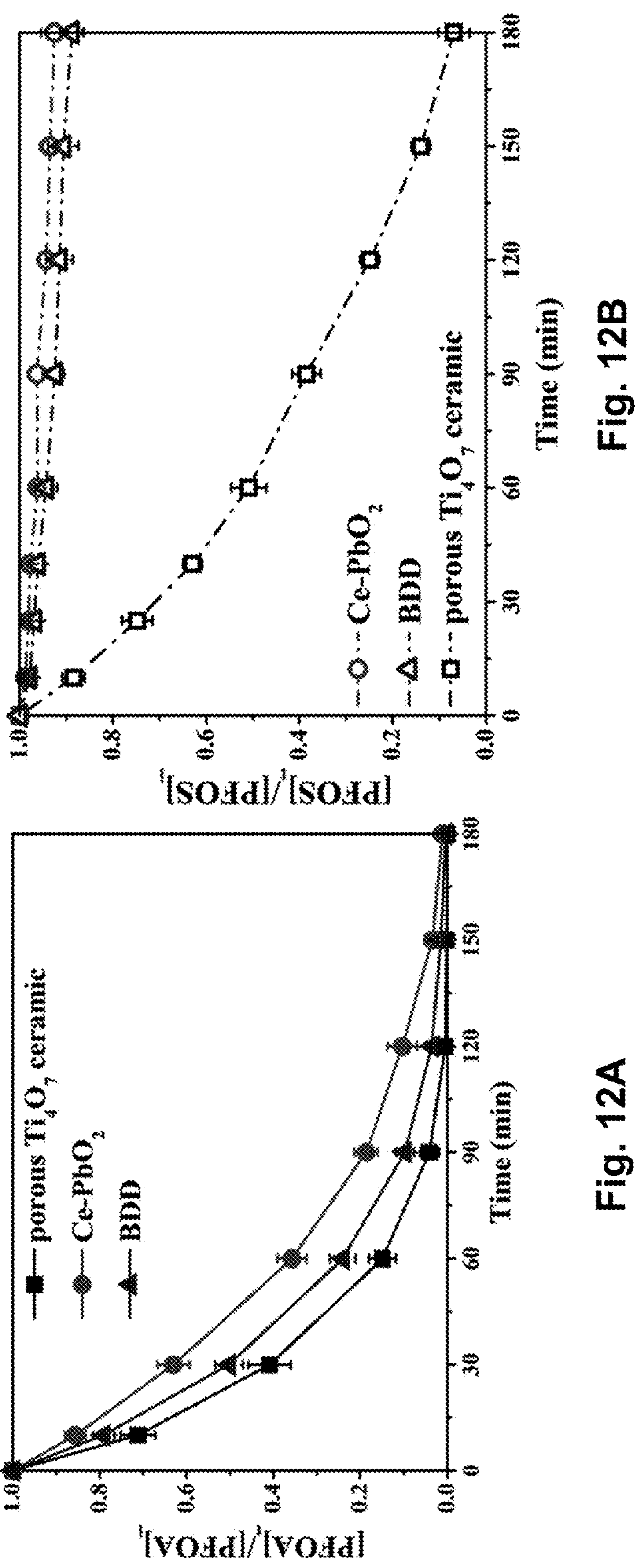
FIGS. 12A-12B are graphs illustrating concentrations change of 0.5 mM PFOA (12A) and 0.1 mM PFOS (12B) during electrooxidation process by different anodes.

FIGS. 12A-B compare PFOA (12A) and PFOS (12B) decay performances among anodes composed of Ce—$PbO_2$, BDD, and porous $Ti_4O_7$ ceramic electrodes at a constant current density of 5 mA $cm^{-2}$. As presented in FIG. 12A, $Ti_4O_7$ ceramic electrode demonstrated a much faster PFOA decay rate than the Ce—$PbO_2$ and BDD electrodes, well-known "non-active" anodes that have been proven effective for PFOA degradation.

According to the pseudo-first-order rate constant (k) values (See Table 5), the half-life ($t_{1/2}$) values were calculated as 34.65, 25.67, and 20.29 $min^{-1}$ for Ce—$PbO_2$, BDD, and the porous $Ti_4O_7$ ceramic electrode, respectively.

As seen in FIG. 12B, PFOS degradation was very little, if any, on TI/BDD (DiaChem®, Condias, Germany) and Ce—$PbO_2$ electrode used in the this example. However, continuously rapid decay of PFOS on the $Ti_4O_7$ ceramic electrode was observed with a $t_{1/2}$ of 52.62 min based on an estimate by pseudo-first-order kinetics (See Table 5). The decay rate of PFOS was much slower than that of PFOA, probably because of their different physical-chemical proprieties, in particular, the higher electrooxidation potential of PFOS than PFOA. A higher electrooxidation potential causes greater $O_2$ evolution on the anode that can compete with PFOS oxidation over electron transfer.

It should be noted that not all commercial and self-made BDD electrodes provide the same oxidation efficiency; therefore, the TI/BDD available by Condias used in this study may not necessarily reflect the highest oxidation capability of the BDD electrode family. A recent study evidenced PFOS degradation over Nb/BDD (DiaChem®, Condias, Germany) anode surface but at a very slow rate (see Trautmann, A. M., et al., *Water Sci. Technol.*, 2015), while an earlier study reported PFOS decomposition over a Si/BDD electrode (Technical Institute of Physics and Chemistry, Chinese Academy of Sciences; Adamant Technologies).

Figure 12D:
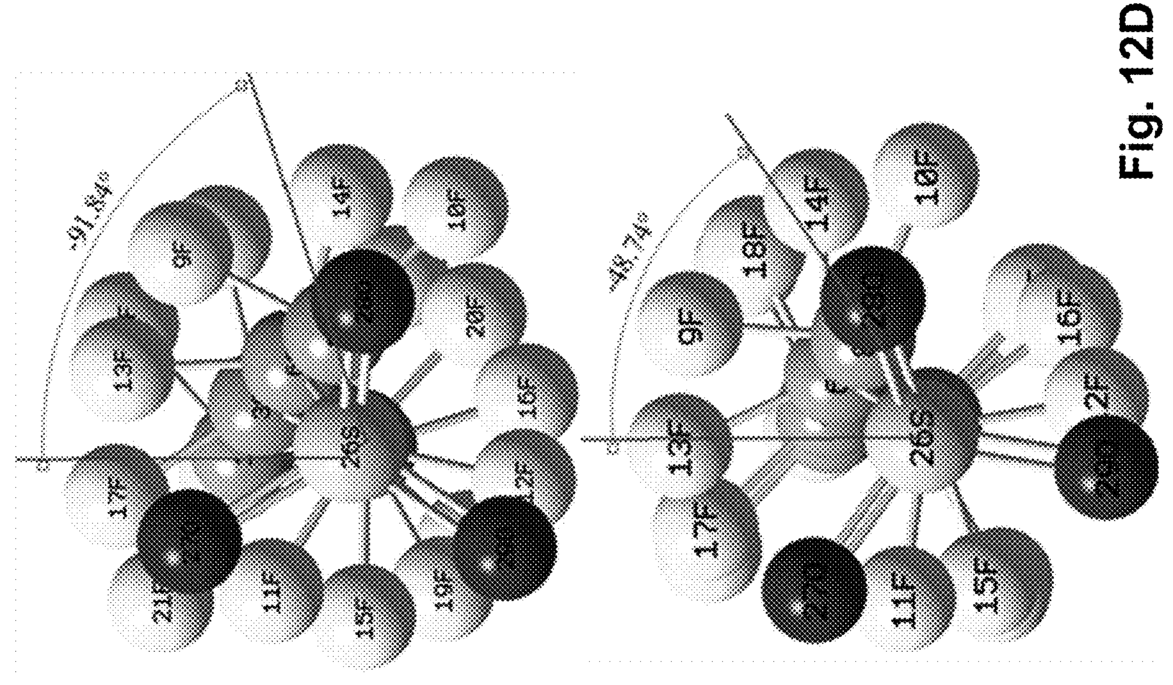
FIGS. 12C and 12D illustrate structural changes induced in PFOA anion (FIG. 12C) and PFOS anion (FIG. 12D) before (upper) and after (lower) losing one electron.
Figure 12C:
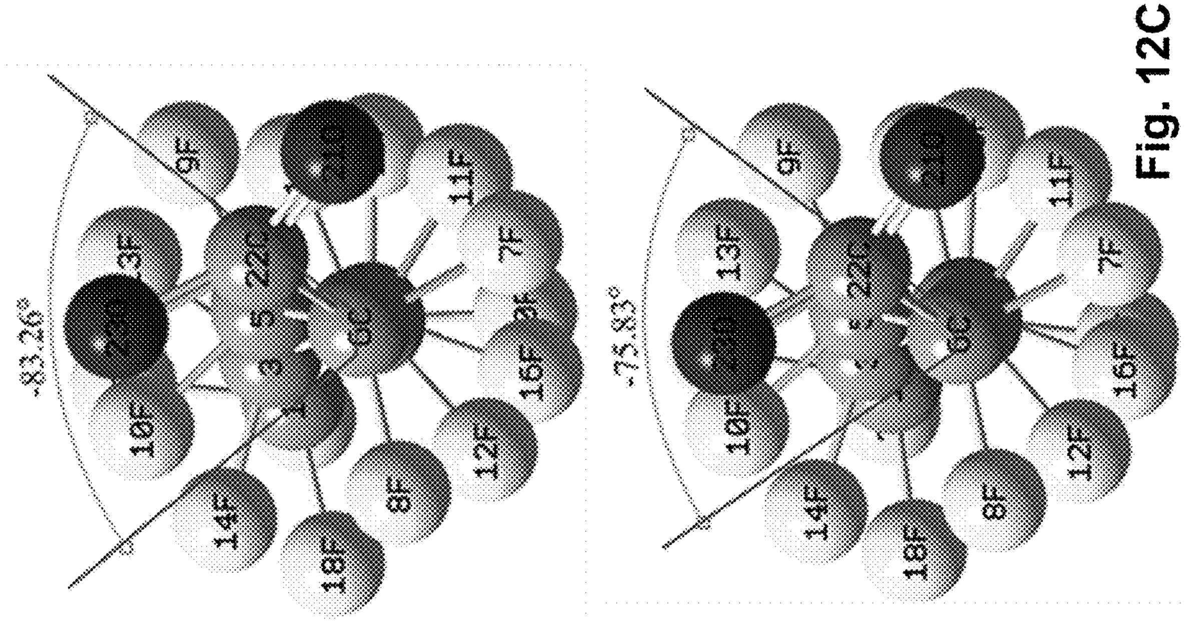

In addition, as discussed generally above, PFAAs have a twisted conformation due to the presence of multiple fluorine atoms, and this twisted structure prevents attack by oxidative species, rendering typical oxidation by hydroxyl free radicals, as produced by standard "inert electrodes" much slower (as for PFOA) or largely ineffective (as for PFOS). However, the above results suggest that the porous $Ti_4O_7$ ceramic electrode has superior electrooxidation capability for PFOA/PFOS than the other electrodes, possibly attributable to the following factors. First, not only can the $Ti_4O_7$ electrode function as typical "non-active" electrodes by producing free ·OH via water oxidation, it is also active for direct electron transfer reactions, particularly for PFAAs. This direct electron transfer capability results in the loss of an electron from the PFOA/PFOS, which untwists the structure exposing the carbon-carbon bonds for attack by the hydroxyl free radicals. This direct electron capability, in addition to the production of free radicals, appears to facilitate PFOA/PFOS degradation by the TSO electrodes. The structure of PFOA and PFOS before and after losing one electron, obtained by density function theory molecular modeling, is depicted in FIGS. 12 C and D, respectively, illustrating the change in conformation induced by the direct electron transfer. FIG. 12C illustrates PFOA before (above) and after (below) loss of a single electron, and FIG. 12D illustrates PFOS before (above) and after (below) loss of a single electron, showing the "untwisting" of the structures after electron loss. It is known that interphase mass transfer is often the step limiting chemical transformation in electrooxidation, while the $Ti_4O_7$ electrode, because of its porosity, has a much greater surface area than that of Ce—$PbO_2$ and BDD electrodes, thus promoting interphase mass transfer. In addition, a higher electro-active surface area leads to a smaller effective current density, which yields a better electrolysis effect when the same charge is delivered.

Figure 13:
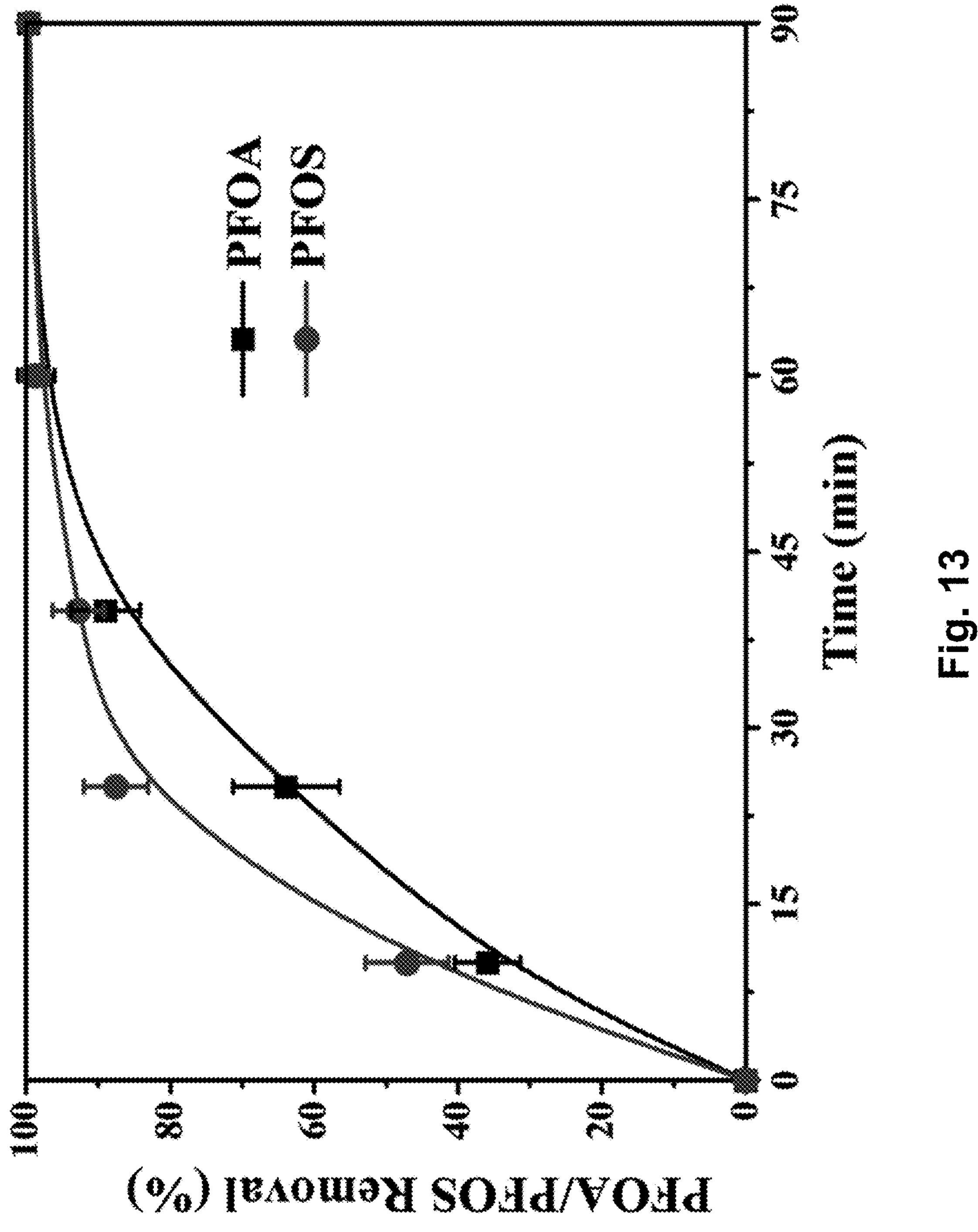
FIG. 13 illustrates removal of 2 μmol $L^{-1}$ PFOA/PFOS as a function of time during electrooxidation process.

FIG. 13 illustrates that the porous $Ti_4O_7$ electrode is effective to degrade PFOA/PFOS at relatively low concentrations (2 μmol $L^{-1}$) with $t_{1/2}$ values of 11.0 and 9.7 min for PFOA and PFOS, respectively, based on an estimate by pseudo-first-order kinetics, which may enable its potential use for remediation of PFOA/PFOS-contaminated groundwater. The decay rates of PFOA/PFOS at the initial concentration of 2 μmol $L^{-1}$ were 2- to 6-fold faster than those at much higher initial concentrations (0.5 mmol $L^{-1}$ for PFOA and 0.1 mmol $L^{-1}$ PFOS) (See Table 5). As discussed earlier, because PFOA/PFOS are negatively charged and large electro-active surface area in the porous $Ti_4O_7$ electrode, they would be electro-sorbed to the $Ti_4O_7$ anode surface, thus promoting mass transfer. This electro-sorption effect is more pronounced at lower substrate concentrations, thus leading to higher PFOA/PFOS degradation rate constants at the lower concentrations, e.g., 2 μmol $L^{-1}$. A greater enhancement of PFOS decay rate at low initial concentrations was observed because the electro-assisted sorption of PFOS is stronger than that of PFOA. In addition, the effects of common surface water chemical components, such as electrolytes and natural organic matter, on the degradation rate of PFOA were also investigated.

Figure 14B:
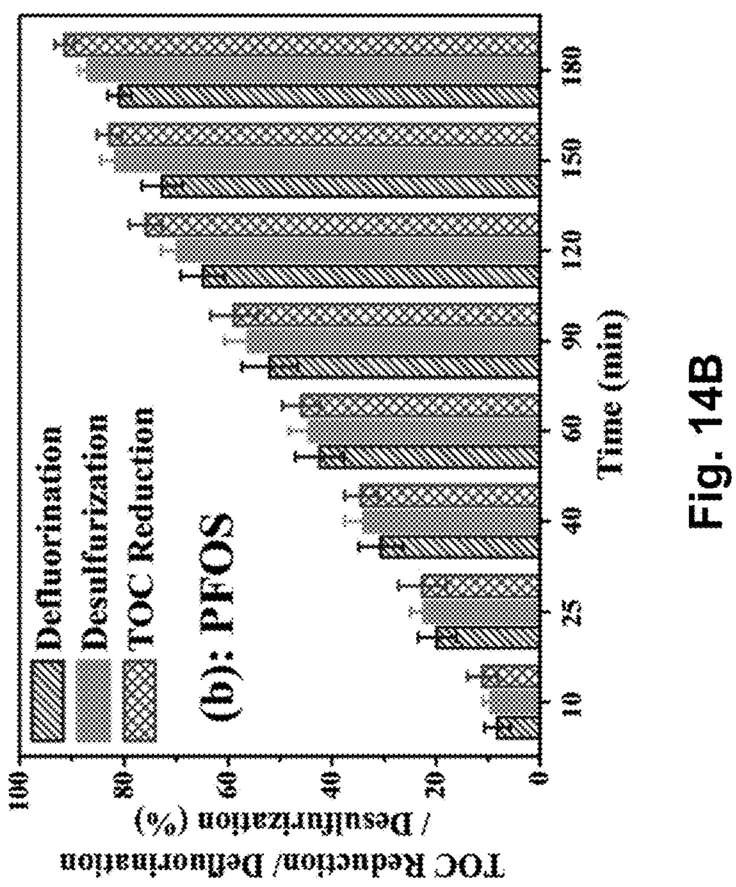
FIGS. 14A-14B are bar graphs illustrating defluorination, desulfurization and TOC removal of PFOA (14A) and PFOS (14B) during electrooxidation process, the conditions are the same as in FIGS. 12A and 12B.
Figure 14A:
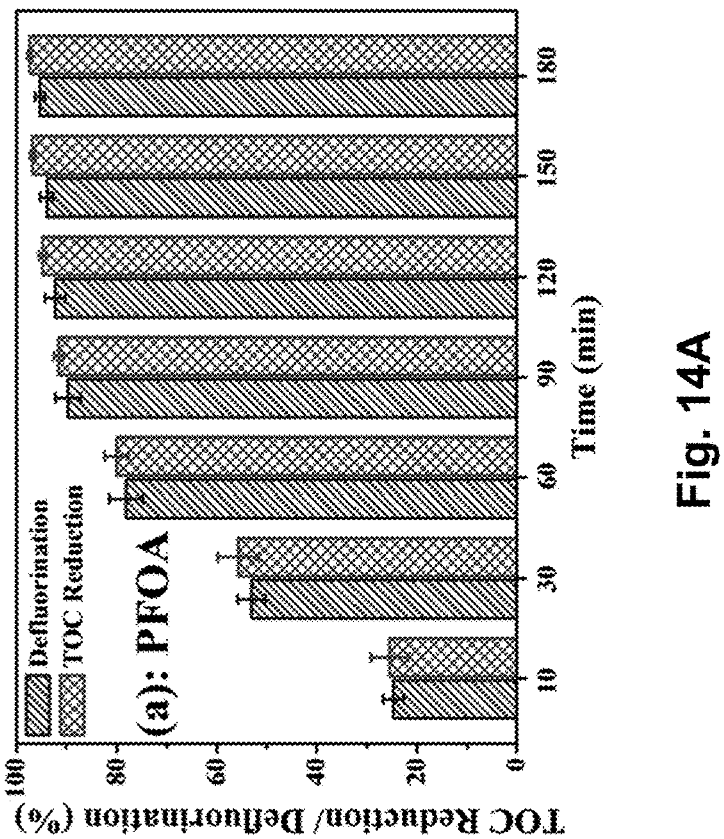

Defluorination, Desulfurization and TOC Removal. FIGS. 14A-14B show the evolution of defluorination ($F^-_{produced}/F_{in\ PFOA/PFOS,\ initial}$), desulfurization ($SO_4^{2-}{}_{produed}/SO_{3\ in\ PFOS,\ initial}$) and TOC reduction of PFOA/PFOS as a function of electrolysis time. As illustrated in FIG. 14A, more than 95% TOC removal was achieved, and the fluorine in PFOA molecules recovered as fluoride ion, i.e., defluorination ratio, was also over 95%. The correspondent F index (i.e., $n^{F-}{}_{produced}/n^{PFOA/PFOS}{}_{degraded}$) was 14.3±0.1 for PFOA after 180 min electrolysis, which means that the fluoride recovery averaged 14.3±0.1 out of the 15 fluorine atoms per PFOA/PFOS molecule degraded. A comparison between FIG. 14A and FIG. 12A revealed that the TOC removal, defluorination, and PFOA removal were closely synchronous with each other. This is consistent with the finding in Nua, L. K., et al., *Bioresource Technol.,* 2016 that PFOA was directly mineralized to $CO_2$ and HF on the anode surface, rather than converted stepwise to shorter chain PFCA intermediates like in the other oxidative degradation processes, such as photochemical and persulfate oxidation.

FIG. 14B displays the defluorination, desulfurization, and TOC removal of PFOS, which, similar to PFOA, were all in synch with PFOS degradation shown in FIG. 12B. After 180 min electrolysis, 93.1±3.4% PFOS was degraded and 87.1±1.6% —$SO_3^-$ group in PFOS was converted to $SO_4^{2-}$. The number of sulfate groups produced per PFOS removal was 0.94 at 180 min. The nearly stoichiometric production of sulfate indicates that the presence of sulfur-containing products other than sulfate ions is limited. Also shown in FIG. 14B, the defluorination of PFOS was 80.9%±0.9 at 180 min, which corresponds to a F index of 14.8±0.4, i.e., 14.8±0.4 out of 17 fluorine atoms in each PFOS molecule was converted to fluoride ions. In comparison, the desulfurization of PFOS was slightly higher than its defluorination, which means that some intermediate organofluorine compounds not containing a sulfur element may have been formed during PFOS electrochemical mineralization. Overall, these results indicate a nearly complete mineralization of PFOS, except for slightly lower defluorination than that of PFOA.

Figure 15:
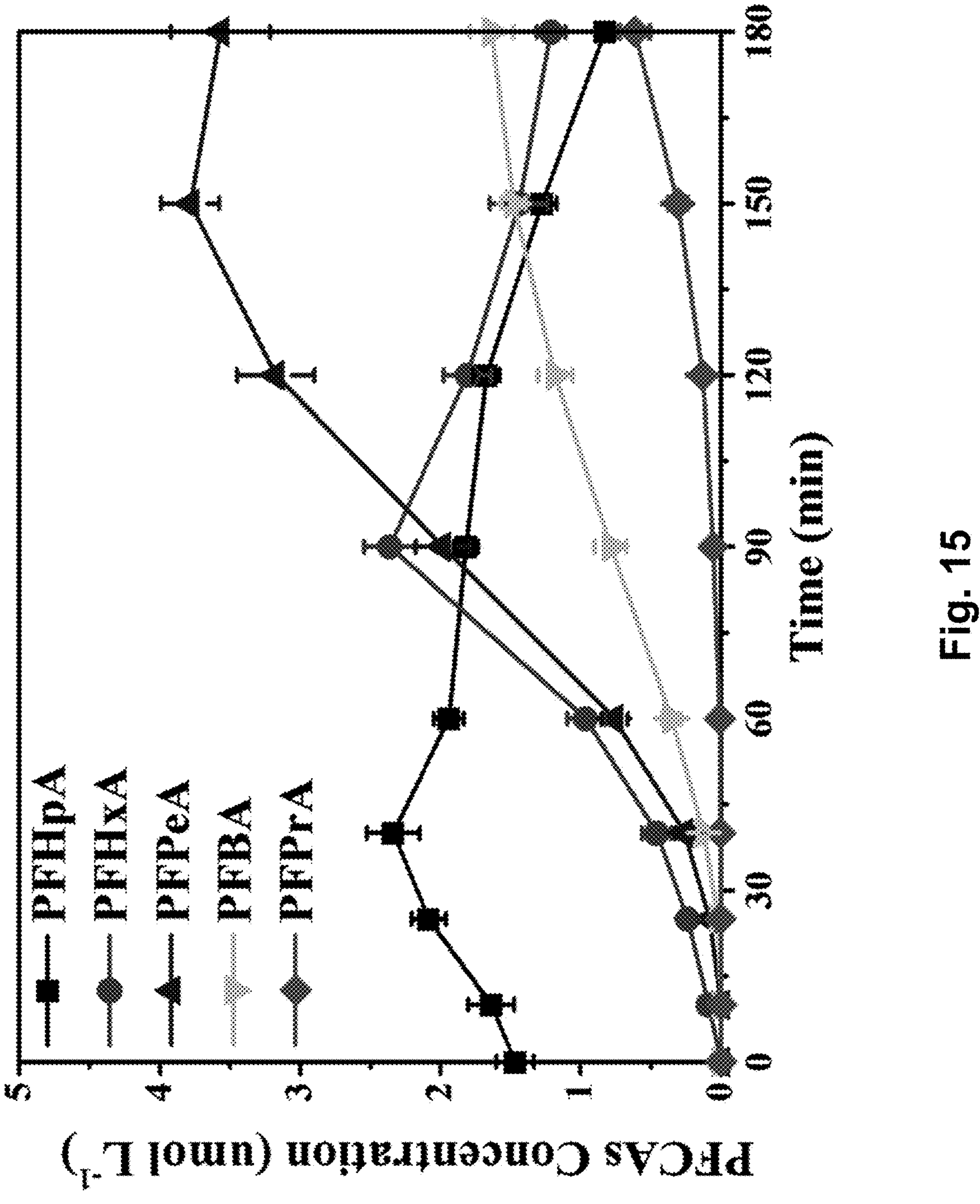
FIG. 15 is a graphic illustration of concentrations of intermediates, that is, PFCAs with shorter chain length than PFOA, as a function of time during electrooxidation process, the conditions are the same in FIG. 12A.
Figure 16:
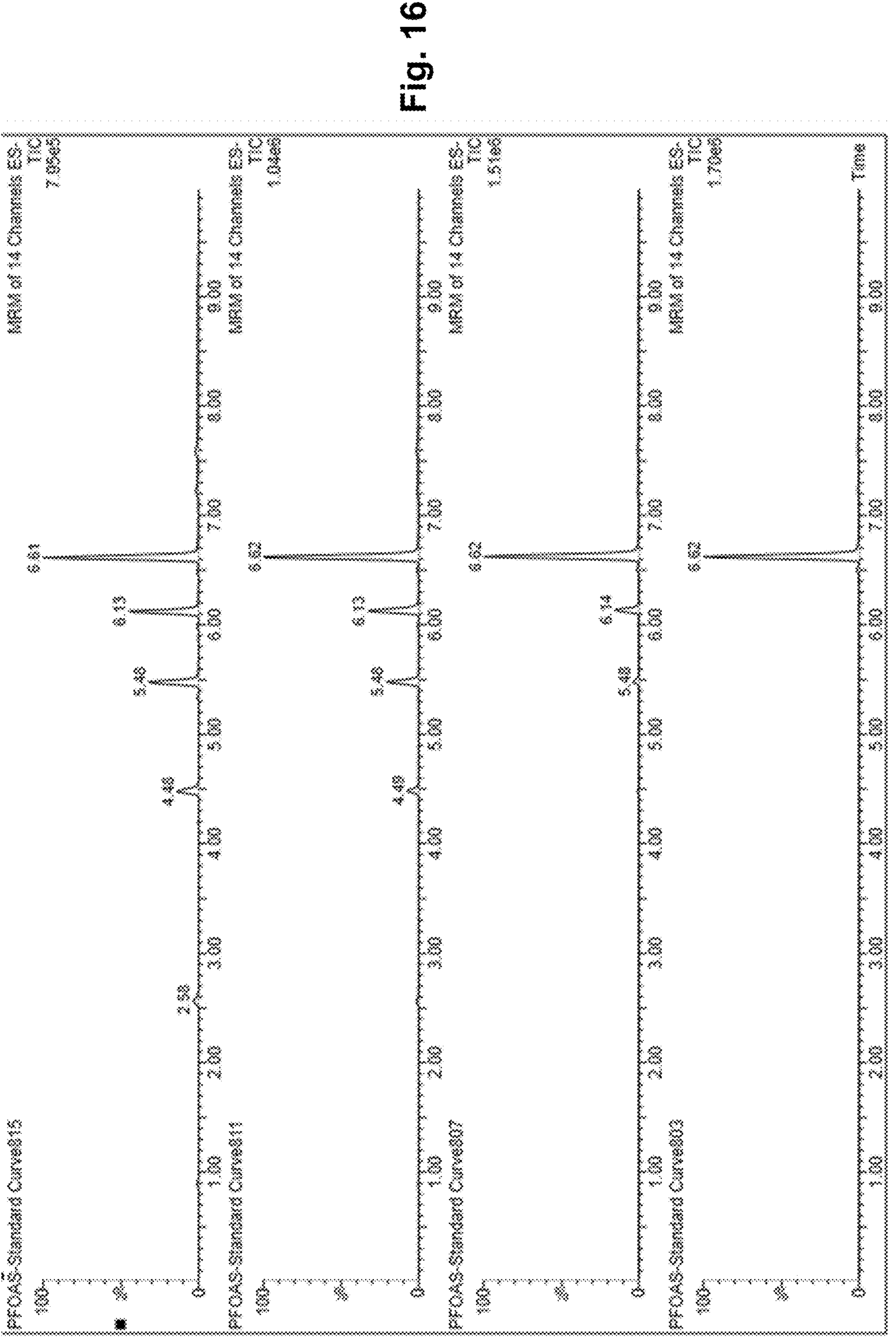
FIG. 16 illustrates a TIC chromatogram of PFOA samples, to which was added 5 mM $^{13}C_2$-PFOA (from up to bottom is the solution after 5 h, 3 h, 1 h, 0 h reaction, respectively). Reaction conditions: 0.25 mM PFOA with 5 mM $K_2S_2O_8$ at 80° C., pH=3.

Identification of Intermediate Byproducts and Possible Mineralization Pathways. To elucidate the possible mechanism of PFOA/PFOS mineralization, intermediate byproducts of PFOA/PFOS were analyzed using high-resolution mass spectrometry (HRMS) with mass accuracy of less than 5 ppm, which enabled accurate determination of element compositions. PFOA degradation byproducts were identified as very small amount of PFCAs with shorter chain, and quantitative analyses of their concentrations were conducted using the UPLC-MS/MS. As shown in FIG. 15, throughout the course of the experiment, the concentrations of these shorter chain PFCAs appeared at trace levels representing less than 1% of the PFOA removed. This is contrary to the few other degradation methods, such as photolysis and persulfate oxidation, by which PFOA tend to degrade stepwise by ripping off a $CF_2$ unit each step. It thus takes eight steps to eventually turn the eight carbons in PFOA into $CO_2$ and HF. As shown in FIG. 16, very high concentrations of short chain PFCA intermediates accumulated during PFOA degradation by a heat-activated $S_2O_8^{2-}$ oxidation process. In this regard, electrooxidation is more effective to mineralize PFCs in terms of energy consumption.

Previous studies indicated that PFCAs degradation rates decrease with decreasing chain length. Predominant direct mineralization of PFOA molecules to $CO_2$ and HF over the anode surface, rather than converted stepwise to shorter chain PFCA intermediates, is consistent with Niu, J. F., et al., *Environ. Sci. Technol.,* 2013. This was made possible because $Ti_4O_7$ electrode allows for both direct electron transfer of PFOA and production of highly active ·OH.

Unlike PFOA, the literature is very limited and somewhat contradictory with respect to the mechanism of PFOS degradation by electrooxidation. Zhuo and co-workers (Zhuo, Q. F., et al., *Elecrochem. Acta.,* 2012) found that PFOS was converted to PFOA via electron transfer over a Si/BDD, and then the PFOA undergoes a $CF_2$ unzipping cycle to form shorter chain PFCAs and eventually $CO_2$ and HF, and a significant fraction of shorter chain PFCAs accumulated. However, in a recent study (Trautmann, A M., et al., *Water Sci. Technol.,* 2015), PFOS (17 mg $L^{-1}$) degradation was reported with no shorter chain PFCAs detected in concentrations beyond 0.1 mg $L^{-1}$, and a 98% PFOS removal and 66% defluorination was achieved over a Ni/BDD electrode. In another report (Carter, K. E., et al, *Environ. Sci. Technol.,* 2008), near absence of any intermediate products was found in solution except for $SO_4^{2-}$ and $F^-$ during PFOS electrooxidation by a Si/BDD electrode.

Figure 17:
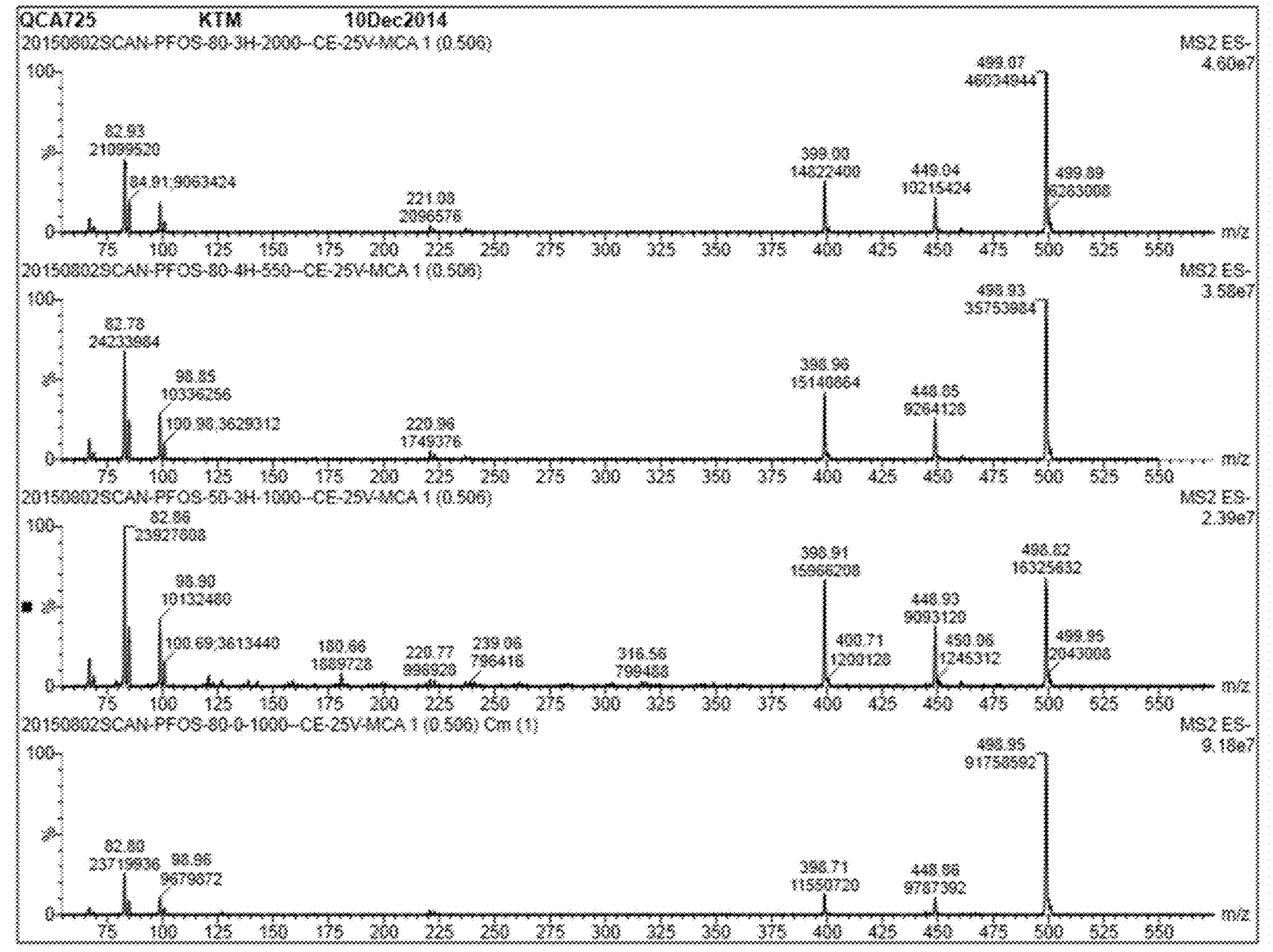
FIG. 17 illustrates an ESI/MS spectra of PFOS samples (from up to bottom is the solution after electrolysis 1 h, 1.5 h, 2.5 h, and 0 h, respectively).
Figure 18:
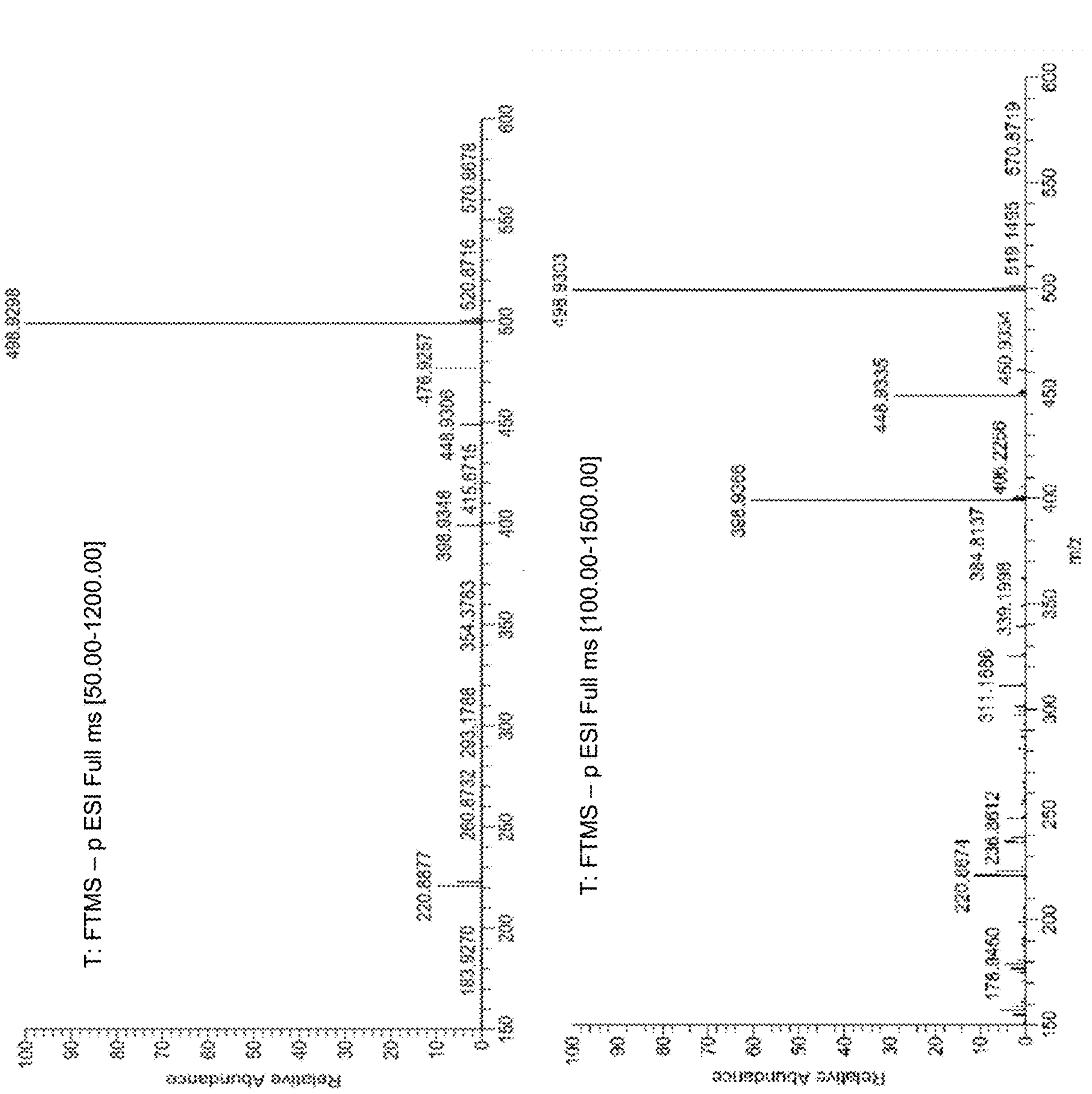
FIG. 18 illustrates a HRMS spectra of PFOS samples (from up to bottom is the solution after electrolysis 0 h, and 1.5 h, respectively).

To investigate the intermediates formed during the electrochemical mineralization of PFOS, the mass spectra of reaction solutions before and after electrolysis were obtained using direct infusion electrospray ionization/mass spectrometry (ES/MS), which are shown in FIG. 17. The original PFOS solution presents the ions peaks at m/z=498.95, 448.86 and 398.71, which are assigned to $C_8F_{17}SO_3^-$, $C_7F_{15}SO_3^-$, and $C_6F_{13}SO_3^-$, respectively. Thus, besides PFOS, there were also small amounts of perfluoroheptane sulfonic acid (PFHpS) and perfluorohexane sulfonic acid (PFHxS) in solution as impurities. Other ion peaks such as m/z=98.96 and 220.96 are assigned to the supporting electrolyte, $NaClO_4$. After electro-oxidation, there appeared a number of other ion peaks at different m/z with weak intensity, which may be the degradation byproducts. In order to confirm the structure of these possible degradation byproducts, HRMS analysis was conducted. As shown in FIG. 18, in addition to the m/z ratios of 498.9298, 448.9306 and 398.9348 representing PFOS, PFHpS and PFHxS, respectively, many other small peaks can be found. However, none of these peaks can be verified as degradation byproducts by further secondary mass spectrometry (MS/MS), and thus the peaks may be from instrument background noise or other impurities in the system. These results are in accordance with the findings of Cater et al. (*Environ. Sci. Technol.* 2008), Trautmann et al. (*Water Sci. Technol.*, 2015) and Schaefer et al. (*J. Hazard. Mater.* 2015) that a lack of organofluorine compounds such as shorter chain PFCAs can be found in aqueous phase as byproducts during PFOS electro-oxidation.

Based on the above findings, a possible mechanism of PFOS degradation over the Magnéli phase $Ti_4O_7$ ceramic electrode was proposed. Similar to PFOA mineralization process, PFOS and its degradation intermediates likely degrades via a combination of direct electron transfer and reaction with ·OH. The reaction was initiated by transferring an electron from the sulfate head group of PFOS to the anode, to form $C_8F_{17}SO_3\cdot$ (eq. 6). The C—S bond will then become extended and cleaved to form $C_8F_{17}\cdot$ and $SO_3$ (eq. 7). Subsequently, $SO_3$ will transform to $SO_4^{2-}$ in aqueous solution, while the produced $C_8F_{17}\cdot$ reacts with ·OH to produce $C_8F_{17}OH$, and then reacts with another ·OH with a hydrogen atom abstracted to generates $C_8F_{17}O\cdot$ (eq. (3)), rather than decompose to $C_8F_{17}OH$ and HF·. $C_8F_{17}O\cdot$ can be easily cleaved to $C_7F_{15}\cdot$ and $CO_2$ (eq. (4)). By repeating this $CF_2$-unzipping cycle ($C_8F_{17}\cdot$ to $C_7F_{15}\cdot$), the activated PFOS ($C_8F_{17}\cdot$) can direct completely mineralize to $CO_2$ and HF over the porous $Ti_4O_7$ anode. All these processes can occur concurrently over the $Ti_4O_7$ anode surface because it is highly effective in both direct electron transfer and generating ·OH.

$$C_8F_{17}SO_3^- \rightarrow C_8F_{17}SO_3^{\cdot} + e^- \quad (1)$$

$$C_8F_{17}SO_3^{\cdot} \rightarrow C_8F_{17} \cdots SO_3^{\cdot} \rightarrow C_8F_{17}^{\cdot} + SO_3 \quad (2)$$

$$C_8F_{17}^{\cdot} + \cdot OH \rightarrow \quad (3)$$

$$C_8F_{17}OH + \cdot OH \rightarrow C_8F_{17}OH \cdots OH \rightarrow C_8F_{17}O\cdot + H_2O$$

$$C_8F_{17}O\cdot \rightarrow C_7F_{15}^{\cdot} + COF_2 \quad (4)$$

$$COF_2 + H_2O \rightarrow CO_2 + 2HF \quad (5)$$

$$SO_3 + H_2O \rightarrow SO_4^{2-} + 2H^+ \quad (8)$$

It should be noted that the intermediates between PFOS and $CO_2$ and HF cannot be found in the solution phase, while trace amounts of shorter chain PFCAs were detected during PFOA mineralization process. This difference may be attributed to that PFOS is more strongly adsorbed on the anode (see FIG. 10) and the stronger acidity of PFOS, thus very few degradation byproducts were released to the bulk solution phase before their mineralization to $F^-$, $SO_4^{2-}$ and $CO_2$. In the case of PFOS decomposition by zerovalent iron reduction under sub-critical water, no intermediates except $F^-$ were observed in bulk solution phase as well.

Energy Cost and Future Research Directions. Energy consumption is an important factor to consider for evaluating application prospects of a treatment technology. It should be noted that many of the degradation byproducts of PFOA/PFOS, such as their shorter chain counterparts, are as recalcitrant as the parent compounds. Therefore, an energy consumption should be estimated based on complete mineralization of PFOA/PFOS, i.e. TOC reduction. Here, the electrical efficiency per log order mineralization (EE/OM) of PFOA/PFOS for the electrochemical oxidation process is calculated to evaluate the economic feasibility of this treatment technology. According to the TOC reduction data in FIG. 14, the EE/OM was 14.2/36.9 Wh $L^{-1}$ for 0.5 mM PFOA/0.1 mM PFOS with the $Ti_4O_7$ ceramic electrode, or about 76.2/820 Wh $g^{-1}$ PFOA/PFOS. Such electrooxidation processes tend to be more cost-effective than the few other redox methods for PFOA/PFOS mineralization, such as $UV/TiO_2$, UV/KI, VUV, and heating- or UV-activated $S_2O_8^{2-}$. For example, heating or $UV/S_2O_8^{2-}$ has been considered one of the most energy efficient processes for PFOA degradation, having demonstrated an energy consumption of about 41, 616 Wh $g^{-1}$ PFOA for 90% degradation of 1.35 mM, and approximately 50 times more energy would be required for complete mineralization of PFOS than for PFOA degradation. The greater energy efficiency of the electro-oxidative mineralization of PFOA/PFOS on the $Ti_4O_7$ ceramic anode is likely attributable to the fact that PFOA/PFOS is directly mineralized to $CO_2$ and HF on the anode surface, while numerous fluorine-containing organic intermediates were generated and accumulated during the other redox processes, thus requiring more energy for complete mineralization.

Figure 19:
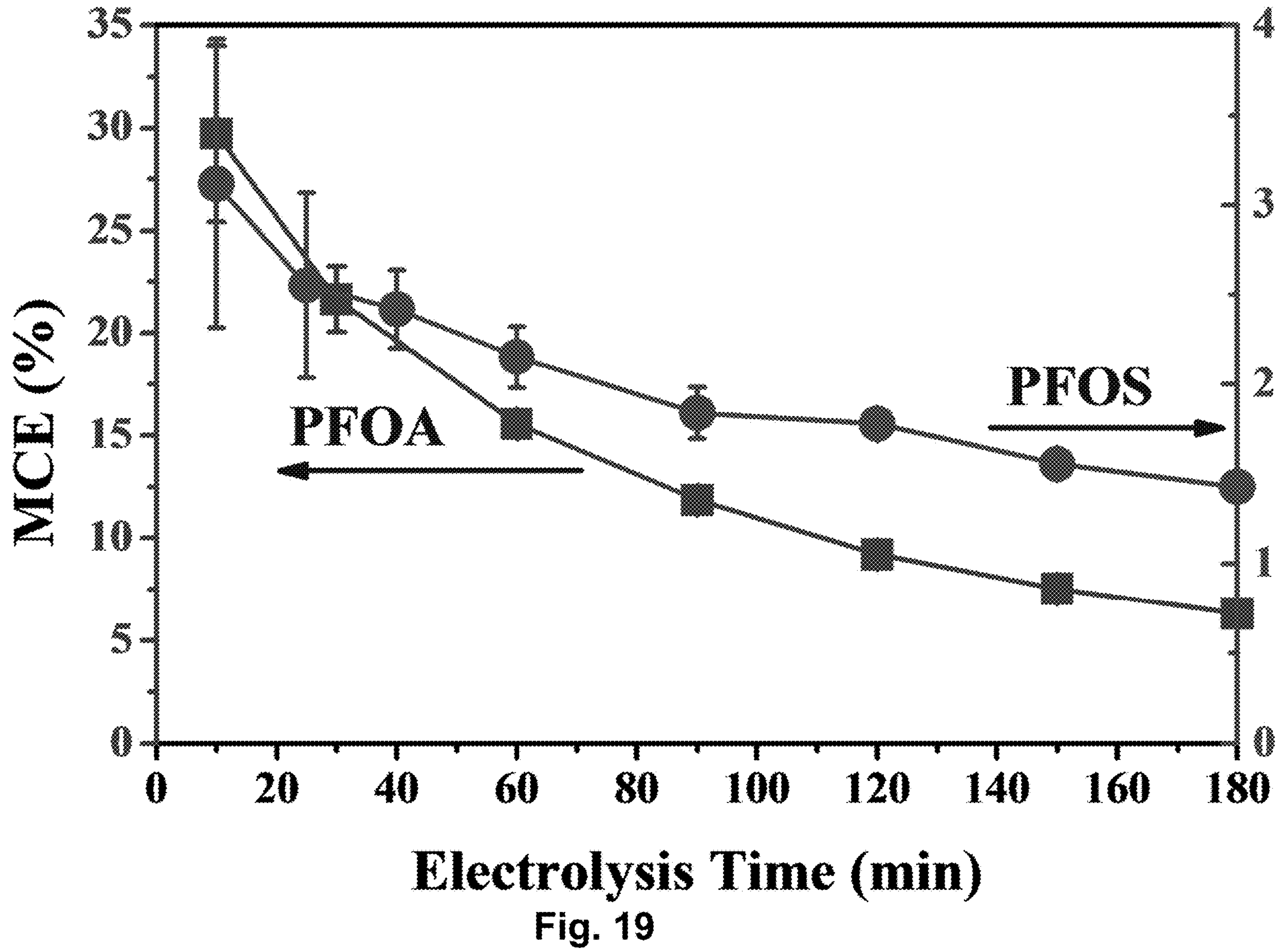
FIG. 19 is a graph illustrating the overall mineralization current efficiency for 0.5 mM PFOA/0.1 mM PFOS mineralization at $Ti_4O_7$ porous ceramic electrode under a current density of 5 mA $cm^{-2}$ (corresponding to FIG. 12).

High energy requirements represents a major limitation that has hindered widespread use of electrochemical technology. An aspect to overcoming this limit is finding ways to improve the interphase mass transfer at electrode. Plate electrodes are often used in electrooxidation, and operated in a flow-by mode. Such a hydrodynamic configuration involves a diffusion boundary layer of ~100 μm or thicker on the electrode surface, leading to low mass transfer rates. However, experimental and modeling studies have suggested that ·OH exists in only a narrow zone adjacent to the electrode surface (<1.0 μm) due to its high reactivity. This, in combination with the low surface areas intrinsic to the plate electrodes and limited interphase mass transfer, significantly restricts the overall electrooxidation efficiency. The overall mineralization current efficiency (MCE) for PFOA/PFOS was calculated by the following equation:

$$MCE(\%) = \frac{n}{96}\frac{\Delta TOC}{I\Delta t}FV \times 100\%$$

where ΔTOC is the concentration of TOC (g $L^{-1}$) reduced during a given electrolysis time (Δt, s), I is the input current (A), F is the Faraday constant (96485 C $mol^{-1}$), V is the treatment solution volume (L), and n is the electron number required per molecule PFOA/PFOS completely mineralized. As shown in FIG. 19, the MCE for PFOA and PFOS were 29.7%±4.3 and 3.1%±0.8, respectively, in the first 10 min of reaction, while the MCE of the entire electrolysis process (3 h) were only 6.3% and 1.4%.

Incorporation of membrane filtration with electrochemical oxidation in which the electrode serves as both an anode and a membrane, such as in a reactive electrochemical membrane (REM) filtration system, is an approach to improve the electrooxidation efficiency. The Magnéli phase $Ti_4O_7$ ceramic material developed in this study has numerous interconnecting macropores with a median pore diameter (based on volume) of 3.4 μm and a surficial porosity of 21.6%, which can be used as a microfiltration membrane (See FIG. 5A-5B). The material also has excellent water permeability, as shown in FIG. 20. Therefore this material can be used as a ceramic filtration membrane and an electrode to enable a reactive electrochemical membrane (REM) operation. Such a REM operation mode can further significantly increase electrooxidation efficiency because i) the porous electrode offers a larger electro-active surface area than the conventional plate electrodes, and ii) the filtration mode supports advection-enhanced mass transfer, significantly faster than that in the conventional flow-by or batch operation mode. Therefore, a reactive electrochemical filter with porous Magnéli phase $Ti_4O_7$ ceramic electrodes of the present disclosure used as membranes involves both membrane filtration and electrooxidation in a synergistic manner, which offers a potentially transformative technology offering a wide range of opportunities in wastewater treatment and recycling.

Figures 21A, 21B:
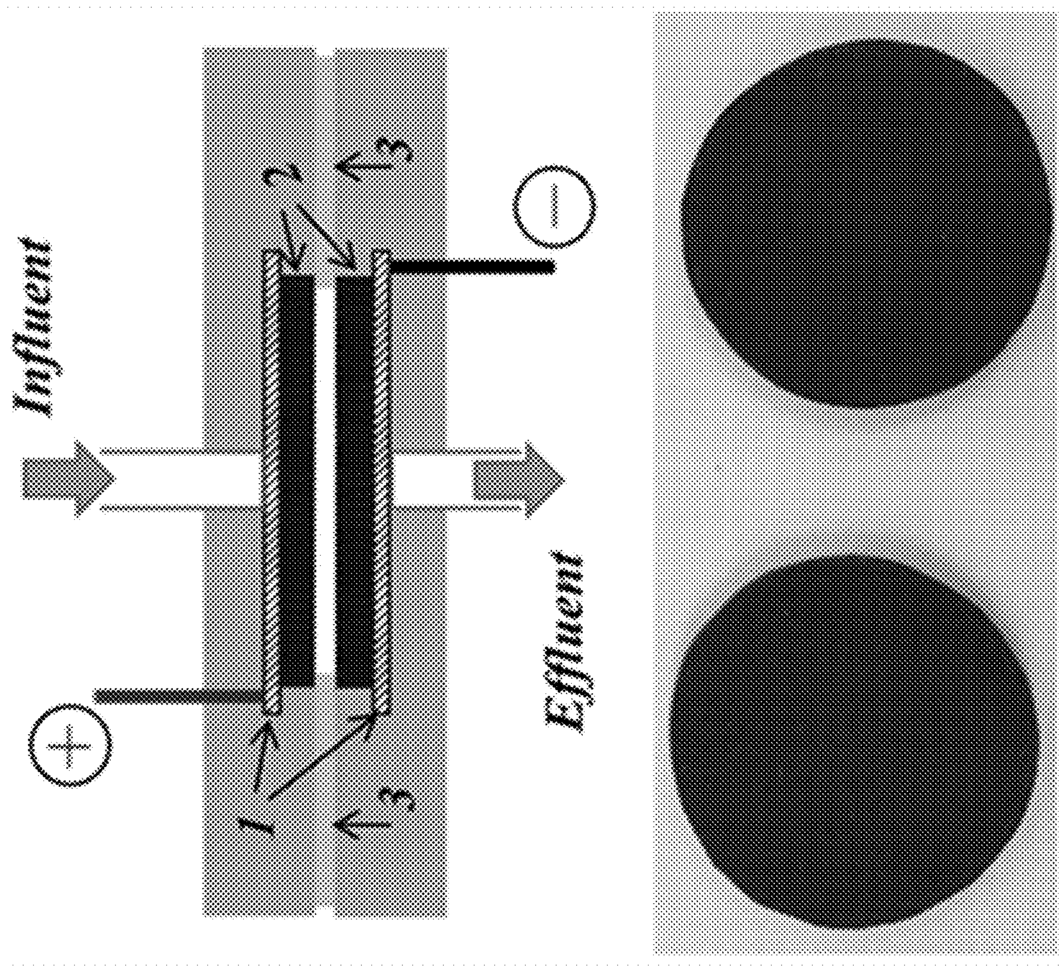
FIG. 21A is a schematic illustration of an embodiment of a reactive electrochemical membrane (REM) filtration unit for an embodiment of a system of the present disclosure including two porous Magnéli phase $Ti_4O_7$ electrode/membranes (FIG. 21B) serving as anode and cathode through which contaminated water was flowed.

An embodiment of a REM unit containing two circular porous TSO plate electrodes (3 cm diameter, 0.3 cm thickness) as anode and cathode respectively, was prepared as shown schematically in FIG. 21A (actual circular disk electrodes shown in FIG. 21B). Referring to FIG. 21A, two titanium caps (1) covered the porous Magnéli phase $Ti_4O_7$ membrane electrodes (2), which served as both anode and cathode. A silicon rubber ring separator 3 sealed the edges and maintained an inter-electrode gap of 0.1 cm (shown as white bar between the two electrode filters (2).

Figure 21C:
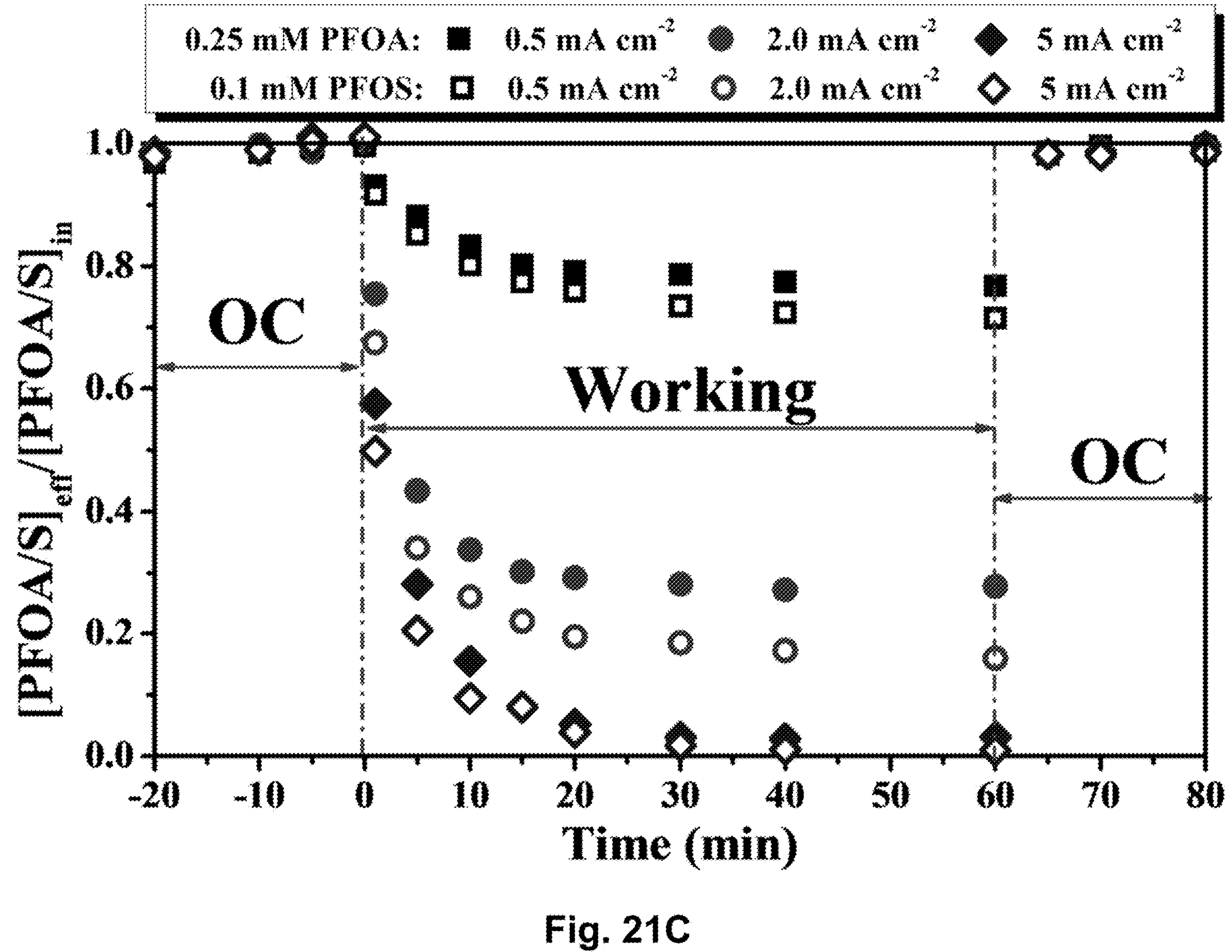
FIG. 21C illustrates the profiles of PFOA/PFOS concentrations during treatment through the REM unit.

A solution containing 0.25 mM PFOA or 0.1 mM PFOS in 10 mM $Na_2SO_4$ supporting electrolyte was pumped through the REM cell at a constant flow rate of 2.8 mL $min^{-1}$ (198 L $m^{-2}$ $h^{-1}$). FIG. 21C shows the profiles of PFOA/PFOS concentrations during the reactive electrochemical membrane (REM) treatment over a range of applied currents (0.5~5 mA $cm^{-2}$). Electricity was not applied during the first 5 min (−5~0 min) of the experiment, during which the PFOA/PFOS concentration in the effluent did not differ from that in the influent, indicating that adsorption of PFOA/PFOS to the TSO electrodes was very limited. The PFOA/PFOS concentration in the effluent decrease rapidly during REM treatment and reached steady state after 5 minutes, and PFOA/PFOS removal increased with increased current density, reaching 82.5%/61.2% at 5 mA $cm^{-2}$. Complete removal of PFOA/PFOS can be achieved by reducing the filtration flux, increasing the applied current density, and/or recirculating the effluent.

On the basis of the experimental results under different operation mode, the energy needed for degrading per mole PFOA (50% degradation at 0.25-mM initial concentration) was estimated as 3.6×10 kJ $mol^{-1}$ and $2.9\times10^4$ kJ $mol^{-1}$, respectively for the batch operation and the dead-end REM filtration with porous TSO plate electrodes. The results indicate that these novel TSO electrodes with three-dimensional porous structure can significantly improve PFOA oxidation efficiency over previous methods by enhancing interphase mass transfer under REM operation

TABLE 1

The flow rate and the gradient condition.

| Time (min) | Flow rate (mL $min^{-1}$) | % A | % B | Curve |
|---|---|---|---|---|
| Initial | 0.3 | 90.0 | 10.0 | Initial |
| 0.5 | 0.3 | 90.0 | 10.0 | 6 |
| 8 | 0.3 | 5.0 | 5.0 | 6 |
| 8.1 | 0.4 | 0.0 | 100.0 | 6 |
| 9 | 0.3 | 90.0 | 10.0 | 6 |
| 10 | 0.3 | 90.0 | 10.0 | 6 |

TABLE 2

Analyte-specific mass spectrometer parameters of PFCs.

| PFCs | MRM | Cone (V) | Collision (eV) | Dwell (s) |
|---|---|---|---|---|
| PFPrA | 163.00 > 119.00 | 15.0 | 12.0 | 0.060 |
| PFBA | 213.00 > 169.00 | 15.0 | 10.0 | 0.060 |
| PFPeA | 263.00 > 219.00 | 15.0 | 9.0 | 0.060 |
| PFHxA | 313.00 > 269.00 | 15.0 | 8.0 | 0.065 |
| PFHpA | 363.00 > 319.00 | 15.0 | 7.0 | 0.035 |
| PFOA | 412.86 > 368.80 | 16.0 | 8.0 | 0.040 |
| $^{13}C_2$-PFOA | 414.86 > 369.80 | 16.0 | 8.0 | 0.040 |
| PFOS | 498.70 > 98.80 | 65.0 | 45.0 | 0.030 |
| $^{13}C_8$-PFOS | 506.70 > 98.80 | 60.0 | 45.0 | 0.030 |

TABLE 3

Calibration conditions for the quantification of PFCs by UPLC-MS/MS.

| PFCS | Retention time (min) | Concentration range (μg $L^{-1}$) | Correlation coefficient ($R^2$) | LOD[a] (μg $L^{-1}$) | LOQ[b] (μg $L^{-1}$) |
|---|---|---|---|---|---|
| PFPrA | 2.39 | 0~500 | 0.9993 | 0.036 | 1.26 |
| PFBA | 4.34 | 0~500 | 0.9995 | 0.021 | 0.53 |
| PFPeA | 4.65 | 0~500 | 0.9997 | 0.041 | 1.47 |
| PFHxA | 5.43 | 0~500 | 0.9996 | 0.026 | 0.85 |
| PFHpA | 6.10 | 0~500 | 0.9998 | 0.013 | 0.43 |
| PFOA | 6.61 | 0~500 | 0.9999 | 0.007 | 0.25 |
| PFOS | 7.02 | 0~500 | 0.9995 | 0.016 | 0.48 |

[a]Limit of detection (LOD) was calculated from the concentration of each perfluoroalkyl acids that yielded a signal-to-noise (S/N) ratio of higher than or equal to 3.
[b]Limit of quantification (LOQ) was calculated from the concentration of each perfluoroalkyl acids that yielded a signal-to-noise (S/N) ratio of higher than or equal to 10.

TABLE 4

Total, outher, inner charge values and electrochemical porosity for the $Ti_4O_7$ porous ceramic material

| $q_T$* (mC $cm^{-2}$) | $q_O$* (mC $cm^{-2}$) | $q_I$* (mC $cm^{-2}$) | $q_I$*/$q_T$* (%) |
|---|---|---|---|
| 64.47 ± 4.01 | 7.23 ± 0.66 | 57.24 | 88.79 |

TABLE 5

| Degradation parameters of pseudo-first-order kinetics model for PFOA and PFOS. | | | | | | | |
|---|---|---|---|---|---|---|---|
| PFCA | Inital Concentraion | Electrode | k ($min^{-1}$) | $k_{SA}$ ($m\ s^{-1}$)[a] | $t_{1/2}$ (min) | $R^2$ | Time Range (min) |
| PFOA | 0.5 mM | Ce—$PbO_2$ | $2.0 \times 10^{-2} \pm 8.9 \times 10^{-4}$ | $0.67 \times 10^{-5} \pm 2.9 \times 10^{-7}$ | 34.7 | 0.9869 | 0~150 |
| | | BDD | $2.7 \times 10^{-2} \pm 6.6 \times 10^{-4}$ | $0.9 \times 10^{-5} \pm 2.2 \times 10^{-7}$ | 25.7 | 0.9968 | 0~150 |
| | | Porous $T_4O_7$ Ceramic | $3.4 \times 10^{-2} \pm 1.1 \times 10^{-3}$ | $1.1 \times 10^{-5} \pm 3.6 \times 10^{-7}$ | 20.3 | 0.9952 | 0~120 |
| PFOS | 0.1 mM | Porous $T_4O_7$ Ceramic | $1.3 \times 10^{-2} \pm 5.5 \times 10^{-4}$ | $0.43 \times 10^{-5} \pm 3.8 \times 10^{-7}$ | 52.6 | 0.9848 | 0~180 |
| PFOA | 2 μM | Porous $T_4O_7$ Ceramic | $6.3 \times 10^{-2} \pm 5.4 \times 10^{-3}$ | $2.1 \times 10^{-5} \pm 1.8 \times 10^{-6}$ | 11.0 | 0.9649 | 0~60 |
| PFOS | 2 μM | Porous $T_4O_7$ Ceramic | $7.1 \times 10^{-2} \pm 2.5 \times 10^{-3}$ | $2.4 \times 10^{-5} \pm 8.3 \times 10^{-7}$ | 9.7 | 0.9938 | 0~60 |

[a]$k_{SA}$ is the surface-area-normalized rate constnat, which is calculated by eqution: $10^{-2}\ V\int dC = k_{SA} A \int C dt$, where C is the concentration of PFOA/PFOS (mM) at t (s) time in bulk solution, A is the anode geometry surface ($cm^2$), and V is the treatment solution volume (mL).

TABLE 6

| The effect of electrolyte and DOM on the degradation rate constant of PFOA. (PFOA: 0.25 mM; anode: $Ti_4O_7$ porous ceramic electrode; Current density: 5 mA $cm^{-2}$; Plate distance: 1.5 cm; Stirring: 800 r $min^{-1}$; electrolysis time: 60 min). | | | | |
|---|---|---|---|---|
| pH value (initial) | Electrolyte concentration (mM) | Cell voltage (V) | Pseduo-first order rate constant ($min^{-1}$) | Decomposition (%) |
| 5 | 20 mM $NaClO_4$ | 6.8 | 0.0364 | 89.0 |
| 5 | 20 mM NaCl | 6.7 | 0.0181 | 59.2 |
| 5 | 20 mM $NaClO_4$ with 20 mg $L^{-1}$ NaCl | 6.6 | 0.0350 | 87.5 |
| 5 | 20 mM $NaClO_4$ with 50 mg $L^{-1}$ $HCO_3$- | 7.0 | 0.0342 | 87.1 |
| 5 | 20 mM $NaClO_4$ with 10 mg $L^{-1}$ HA | 6.7 | 0.0355 | 88.2 |

Example 2

The present example describes a system combining pre-concentration of PFASs (including the PFAAs, PFOA and PFOS) with electrooxidation of PFASs. Since a high energy requirement is one of the factors limiting application of electrooxidation to treating large volumes of water with low concentrations of PFASs, such as contaminated groundwater, a key is developing methods to pre-concentrate the PFASs and improve interphase mass transfer at the anode. This example addresses the "concentration effect" by concentrating PFAAs in a composition prior to electrolysis with the porous Magnéli phase $Ti_4O_7$ or $Ti_4O_7/Ti_5O_9$ ceramic electrodes of the present disclosure described generally above and in Example 1.

Granular activated carbon (GAC) has been used as a sorbent in packed columns to remove PFOA in flow-through water, but its sorption capacity is relatively low, leading to rapid breakthrough. In addition, PFAAs sorbed on activated carbon cannot be easily eluted even by organic solvents. Ion exchange resins have relatively high sorption capacities for PFAAs, but their sorption rates were very slow, leading to easy penetration, and the recovery of sorbed PFAAs is also extremely difficult. It has been demonstrated that filtration by reverse osmosis (RO) membrane can achieve continuous separation of PFAAs from water, but it is not feasible for pre-concentration purposes, because it requires pre-treatment of wastewater to maintain desirable efficiency, and, in addition, concentrated PFAAs can significantly reduce RO membrane permeate flux.

Recent work has demonstrated that PFAAs such as PFOA and PFOS can be quickly sorbed on the surface of zinc hydroxide flocs generated in situ by electrocoagulation (EC), mainly via hydrophobic interaction. The study indicated that the zinc hydroxide flocs had a sorption capacity (qe) up to 5.74/9.69 mmol g−1 (Zn) for PFOA/PFOS at the initial concentration of 0.5 mM with an initial sorption rate of $1.01\times10^3/1.81\times10^3$ mmol g−1 h−1. The sorption of PFOA/PFOS reached equilibrium within <10 min. The EC-generated zinc hydroxide flocs have much higher sorption capacity and faster sorption rate than other sorbents reported in previous studies or preformed zinc hydroxide. These advantages enable EC-generated zinc hydroxide flocs to effectively sorb PFAAs from water within a short hydraulic retention time. Unlike the other sorbents, zinc hydroxide flocs can be easily dissolved in acid or base solution, so that the sorbed PFAAs are released back to solution and thus concentrated, which can be then treated cost-effectively by electrooxidation. Alternatively, the sorbed PFAAs can also be released from zinc hydroxide flocs surface under high temperature treatment, e.g. 95° C., or by elution with organic solvents, e.g. 5% method. EC involves low energy consumption, and has been widely used in water treatment, thus allowing for scaling-up.

Figure 22:
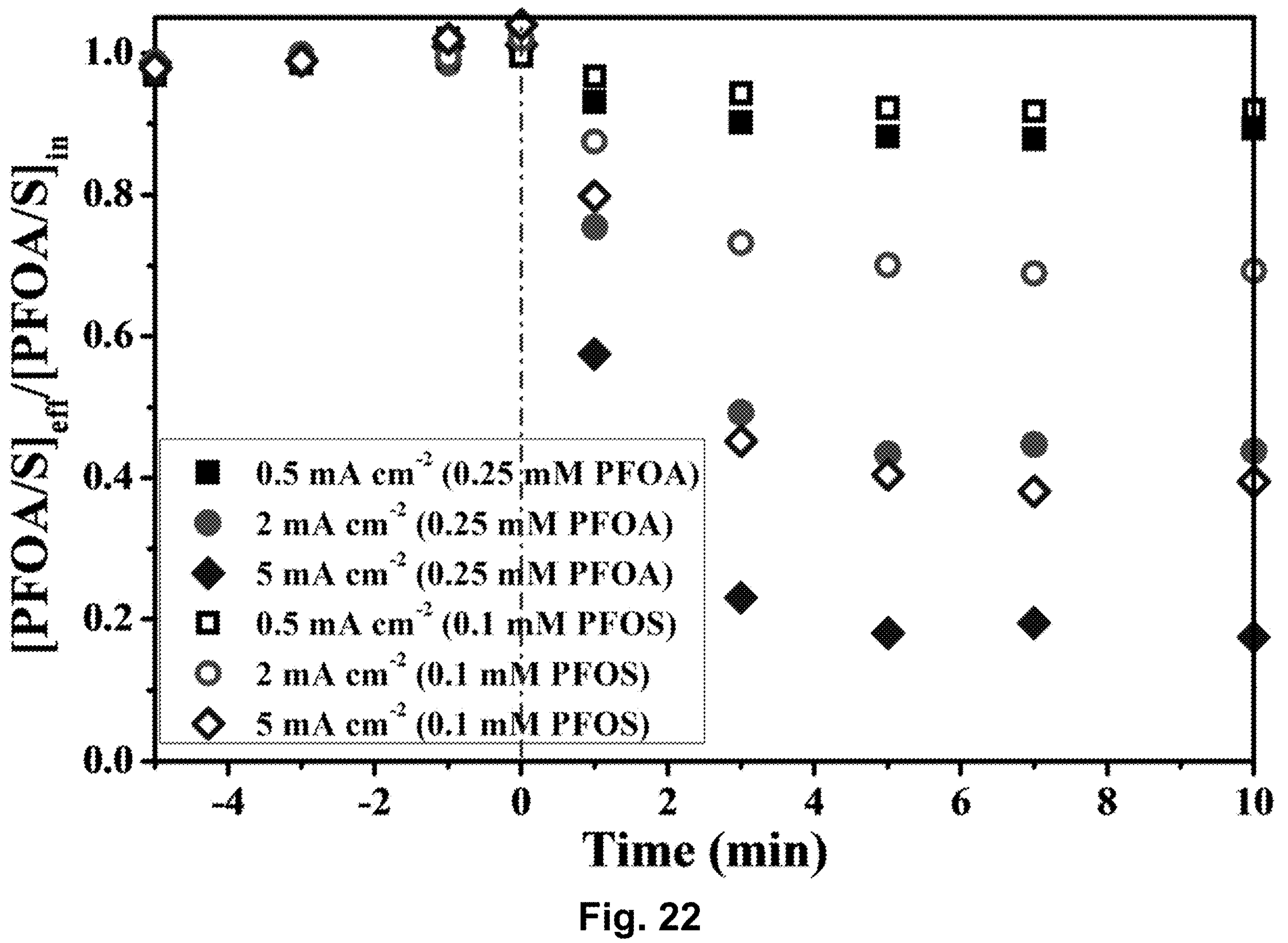
FIG. 22 is a graph illustrating the concentration profiles of PFOA/PFOS as a function of applied current in an embodiment of a dead-end filtration REM unit as illustrated in FIG. 21A.

Example 1 above, demonstrated that porous Magnéli phase $Ti_4O_7$ or $Ti_4O_7/Ti_5O_9$ ceramic electrodes of the present disclosure significantly improve PFOA oxidation efficiency by enhancing interphase mass transfer in REM (reactive electrochemical membrane) operation. For instance, in a dead-end filtration REM unit similar to that shown in FIG. 21A from Example 1, above, a solution containing 0.25 mM PFOA or 0.1 mM PFOS in 10 mM $Na_2SO_4$ supporting electrolyte was pumped through the REM cell at a constant flow rate of 2.8 mL $min^{-1}$ (198 L $m^{-2}$ $h^{-1}$). FIG. 22 shows the profiles of PFOA/PFOS concentrations during the reactive electrochemical membrane (REM) treatment over a range of applied currents (0.5~5 mA $cm^{-1}$). Electricity was not applied during the first 5 min (−5~0 min) of the experiment, during which the PFOA/PFOS concentration in the effluent did not differ from that in the influent, indicating that adsorption of PFOA/PFOS to the TSO electrodes was very limited. The PFOA/PFOS concentration in the effluent decrease rapidly during REM treatment and reached steady state after 5 minutes, and PFOA/PFOS removal increased with increased current density, r The present example describes the coupling of electrocoagulation and electrooxidation for treatment of water containing low concentrations of PFAAs. The electrocoagulation (EC) process produces amorphous hydrophobic zinc hydroxide flocs in situ that effectively sorb PFAAs to purify the contaminated water. The sorbed PFAAs are then released to a concentrated solution via appropriate treatments. The concentrated PFAAs are subsequently degraded via electrooxidation with TSO electrodes operated in REM filtration mode for enhanced efficiency and reduced energy consumption.

For the sorption study, experiments will be conducted in a 500-mL cylindrical reactor, as in our earlier study (see Rajishwar, K, et al., Environmental Electrochemistry: Fundamentals and Application in Pollution Sensors and Abatement. Academic Press: San Diego, CA, 1997, hereby incorporated by reference herein) with a 304 stainless steel rod (3 mm diameter) as cathode and a zinc sheet (8×25 cm) as anode. A solution of 400 mL will be tested in each run, containing model PFAAs at varying initial concentrations in the presence of different background ions and organic matter, with electrolysis conducted at varying current density for different time intervals to generate zinc hydroxide flocs. The six PFAAs included on US EPA's Unregulated Contaminant Monitoring Regulation (UCMR 3) will be tested individually and in mixtures as model contaminants, including PFOS, PFOA, PFNA (perfluorononanoic acid), PFHxS (perfluorohexane sulfonate), PFHpA (perfluoroheptanoic acid), and PFBS (perfluorobutane sulfonate). Common ions in ground water ($Na^+$, $Ca^{2+}$, $Mg^{2+}$, $HCO_{3-}$, $SO_4^{2-}$, $Cl^-$, $Fe^{2+}$, etc.) and Suwannee River fulvic acid will be tested as background substances at different dosages, and NaCl or Na2SO4 added as supporting electrolytes.

The experiments will be conducted using a fractional factorial design to examine the influence of factors, including water conditions (PFAA initial concentrations, background ion and organic compositions, and pH) and EC operation variables (supporting electrolytes, applied current density, electrolysis time and treatment time). At preselected time intervals, triplicate 1-mL samples will be taken from the reactor, cleaned up by solid phase extraction (SPE), and analyzed using a Waters Acuity UPLC-Xevo TQD tandem Mass spectrometer (UPLC-MS/MS) as in our earlier study (US EPA. Significant New Uses: Perfluoroalkyl Sulfonates and Long-Chain Perfluoroalkyl Carboxylate Chemical Substances, hereby incorporated by reference herein). The time course data will be fitted to different rate models (pseudo-first-order, pseudo-second-order, Elovich and intraparticle diffusion) as appropriate to obtain sorption capacity and rate constants. Relationships between the sorption performance (capacity and rates) and the experimental variables (water and operation conditions) will be established to provide bases for process optimization. In addition to PFAA degradation, the zinc hydroxide flocs settling rate will also be measured and optimized during the study.

A dissolution and re-precipitation method and a high temperature treatment method will be evaluated for releasing PFAAs from zinc hydroxide flocs into a concentrated solution. This will be conducted with selected EC operation conditions. At the end of EC treatment, the sludge comprising settled zinc hydroxide flocs with PFAAs enriched will be collected through filtration by a glass fiber filter. In the dissolution and re-precipitation method, 5% $H_2SO_4$ will be used to dissolve the sludge with sorbed PFAAs released to solution. Then, certain ions such as $S^{2-}$, $Al^{3+}$, $SO_4^{2-}$ or $PO_4^{3-}$ will be added to the solution to precipitate $Zn^{2+}$ by forming insoluble compounds having Ksp lower than zinc hydroxide with pH adjusted to neutral or weak alkaline, while these insoluble compounds do not sorb PFAAs, so that they remain in the solution concentrated. The experiments will be designed to explore the following factors for optimum effects: 1) the type and concentrations of the ions introduced to precipitate $Zn^{2+}$ and 2) pH. In the high temperature treatment method, the PFAA enriched sludge will be mixed with water and heated to a temperature ranging from 60 to 95° C. to release PFAAs. The experiments will be designed to explore the following factors: 1) the ratio of sludge and water, and 2) the treatment temperature and time. Samples will be taken after treatment to analyze the concentrations of PFAAs and various ions including $Zn^{2+}$ using UPLC-MS/MS, ICP-AES (inductively coupled plasma atomic emission spectrometer) and ion chromatography as in our earlier study.

In addition, in the present example, the methods described in Example 1 for making the porous Magnéli phase $Ti_4O_7$ or $T_4O_7/Ti_5O_9$ ceramic electrodes/membrane filters of the present disclosure will be adjusted to optimize various parameters, such as porosity and structure. For instance, different sizes of precursor nano powder will be used, different pulping process formulas, varying the moisture content during granulating, and use of different pressures in the forming process. In addition, electrochemical properties of the electrode/membranes will be adjusted via doping, such as described in Vectitis, C. D. et al. (Sonochemical degradation of perfluorooctanesulfonate in aqueous film-forming foams. *Environ. Sci. Technol.* 2010), which is hereby incorporated by reference herein. Additionally, other methods to produce the electrodes will be tested in addition to the high temperature sintering described in Example 1, above. The methods include: (i) high temperature reduction of preformed $TiO_2$ membranes under $H_2$ atmosphere; (ii) using $Ti_4O_7$ to modify the surfaces of commercially available ultrafiltration and microfiltration ceramic membranes; and (iii) using polyurethane foam as a template to produce TSO foam electrodes.

The present example will also set up and test REM systems employing the porous Magnéli phase $Ti_4O_7$ or $Ti_4O_7/Ti_5SO_9$ ceramic electrodes/membrane filters of the present disclosure, such as illustrated in FIG. 22. The system illustrated in FIG. 22 is an REM system with a Magnéli phase titanium sub-oxide (TSO) electrode of the present disclosure as anode. As shown, PFAA-contaminated water is circulated in a cross-flow filtration mode.

The system will also include an electrocoagulation treatment unit with continuous-flow electrolysis cell that will be designed to have a treatment capacity of 25 L hr−1. The electrolysis cell will comprise several zinc plate anodes and stainless steel plate cathodes in alternate, placed at certain gaps along the water flow direction. For a typical run, the test solution will be pumped through the electrocoagulation reactor at a constant flow rate, with the electrodes operated in a galvanostatic mode to produce zinc hydroxide flocs in situ. After treatment, the sludge from the reactor enriched with PFAAs will be treated by a method described above to release sorbed PFAAs to a concentrated solution that will be fed to the REM unit for PFAA degradation.

The REM unit will also include a flow-through reactor with a porous TSO membrane as the anode, and the concentrated PFAA solution will be pumped through the reactor in a manner to allow the solution filtered through the TSO membrane in the cross-flow or dead-end filtration mode. The reactor will be designed such that, for a typical run, the concentrated PFAA solution will be pumped through the reactor at a constant flow rate with 10 mM $Na_2SO_4$ as supporting electrolyte, while the TSO membrane anode is operated galvanostatically, with the potential measured versus an Ag/AgCl reference electrode. The effects of the operation parameters, including applied current density, PFAA concentrations, and flow rate, on PFAA degradation will be systematically investigated, and optimized using a response surface methodology (RSM).

Example 3

The present example combines the REM system described in Examples 1 and 2 above that employs the a Magnéli phase TSO electrode membranes of the present disclosure described in Example 1 with modifications to treat mixed contaminants of concern (COCs) that are commonly present in Department of Defense (DoD) groundwater sites, including PFAAs and trichloroethylene (TCE). A review of 29 Department of Defense (DoD) sites illustrated that 59% of the sites had more than one contaminant in groundwater, and the most frequently detected include chlorinated and non-chlorinated volatile organic compounds (VOCs) such as perchloroethylene (PCE) and TCEe polychlorinated biphenyls (PCBs), 1,4-dioxane, N-nitrosodimethylamine (NDMA), perfluorinated chemicals (PFCs), munitions and propellant constituents like perchlorate ($ClO_4^-$). Mixed contaminants inevitably influence each other's transport and fate in the environment, and, in particular, pose challenges to remediation activities. A certain treatment may degrade a chemical occurring as a single source, but may not be as efficient or even effective at all when other chemicals coexist. Furthermore, multiple contaminants are often subject to multiple types of treatments that may interfere with each other.

The REM system of the present example involves a TSO ceramic electrode membrane or a hybrid membrane made by coating activated carbon fiber (ACF) on at least a portion of the TSO membrane. The REM system of the present disclosure can be operated in different modes and combinations that couple filtration, sorption, and electrochemical reactions in a synergistic manner to achieve efficient and cost-effect removal and degradation of mixed COCs.

In the present example a $Ti_4O_7$ or $Ti_4O_7$/ACF membrane operated in a REM system under appropriate conditions is tested to determine ability to i) reject PFAAs in feed water, and reduce chlorate to Cl— when serving as the cathode, and ii) adsorb and mineralize PFAAs and TCE when serving as the anode. Both ACF and $Ti_4O_7$ are highly porous and conductive materials, and thus $Ti_4O_7$ and ACF-coated $Ti_4O_7$ can be used to make 3-D electrode materials that also have strong sorption and filtration capacities.

In addition to the electrochemical redox reactions described above, an electrochemical system may also be used to remove contaminants by electrostatic interactions as a treatment process or a pre-treatment measure to concentrate contaminants. For example, contaminants with charges may be adsorbed to a porous 3-D electrode that is oppositely polarized, or retained between electrodes as capacitors. The adsorbed contaminants can be further mineralized by anodic oxidation, or be released into a concentrated solution by reversing or canceling the electrode polarization. The electro-assisted adsorption has been found effective for removing PFAAs from water using activated carbon electrodes, as described in Li, X., et al., (2011). An electrochemical system may also be set up with a conductive ceramic membrane serving as an electrode. As contaminated water is filtered through the membrane electrode that has relatively smaller pores (average pore size <0.1 μm), the species with the same charges as the membrane electrode will be rejected due to electrostatic repulsion, and thus concentrated in the retentate. The small pore sizes of the membrane electrode are used for this process, because it will create stronger electrical fields within the membrane pores to repulse oppositely charged ions. Such electrochemical micro- or ultra-filtration processes have been shown effective for PFAAs in water using a $TiO_2/ZrO_2$ ceramic membrane (Tsai, Y. T., et al., 2010), and for $NO_3$— and $ClO_4$— using a $Ti_4O_7$ ceramic membrane (Guo, L., et al., 2016).

Despite its many advantages and comparably high efficiency, electrooxidation is primarily applicable in treatment of contaminated water at relatively high pollutant concentrations in small volumes. The optimum efficiencies of anodic oxidation have been obtained when the organic pollutants in wastewaters are in the range of 100 mg $L^{-1}$ to 20 g $L^{-1}$ (in COD units), and further decreasing the concentrations to the low μg $L^{-1}$ range could be very expensive. Therefore, further improvement in efficiency will help make electrooxidation more feasible in groundwater pump-and-treat applications. The mass transfer of contaminants from the bulk phase to the electrode surface is believed to be the rate-limiting step that restricts the overall electrooxidation efficiency, because direct electron transfer or free radical reactions are highly efficient processes. The relative low concentrations of contaminants in groundwater, such as those of PFAAs, reduce the mass transfer rates, and thus limit the electrooxidation efficiency.

Traditional electrooxidation reactors usually utilize parallel plates as electrodes that are operated in a flow-by or batch mode. Such a hydrodynamic configuration promotes a thick boundary diffusion layer (>100 μm) on the electrode surface that limits mass transfer, while it is estimated by experiments and modeling that substrate oxidation by ·OH occurs within a very narrow range from the electrode surface (<1 μm) because of the extremely high reactivity of ·OH ($10^9$ to $10^{10}$ $M^{-1}$ $s^{-1}$). As a result, electrooxidation is often operated under mass-transfer limited conditions, where reaction rates are governed by the diffusion of contaminants to the electrode surface.

Recent studies on improving electrooxidation efficiency have focused on overcoming the mass transfer limits by using porous 3-D electrodes, such as membranes, operated in a filtration mode. The filtration mode improves mass transfer via convection-enhanced dispersion. It is estimated that the surface area normalized mass transfer rate constant (km) in the system with parallel plate electrodes is in the order of $10^{-6}$ to $10^{-5}$ m $s^{-1}$, while that for a membrane filtration mode is in the order of $10^4$ m $s^{-1}$ or greater, ten to a hundred times higher than the batch mode. In addition, the porous structure in the 3-D electrode provides abundant electrochemically active surfaces for reactions, therefore making reactive electrochemical membrane (REM) systems operated in a flow-through mode much more efficient than the systems operated in a batch mode or flow-by mode.

$Ti_4O_7$ can be used to make 3-D membrane electrodes for REM applications, because of its great electrochemical property, controllable porosity, and easy fabrication. A recent study has shown that the electrooxidation of substituted phenols on a $Ti_4O_7$ ceramic membrane electrode operated in filtration mode was about 10 times greater than that in a none-filtration batch mode under the same electric current density. The examples above evaluated PFOA degradation in a dead-end filtration REM unit with a porous $Ti_4O_7$ ceramic membrane electrode, and the results indicated that the energy needed for degrading per mole PFOA (50% degradation at 0.25-mM initial concentration) was about $3.6\times10^5$ kJ $mol^{-1}$ and $2.9\times10^4$ kJ $mol^{-1}$ for the batch and REM system, respectively, marking an over ten times of decrease in the energy consumption for the REM.

The electrooxidation efficiency of an REM system can be further improved if the 3-D electrode can strongly adsorb the contaminants and thus concentrate them at higher concentrations on the electrode surfaces. Activated carbon fiber (ACF) has been shown to be a desirable material for 3-D electrode, because ACF is a highly conductive material and a superior adsorbent, while its macroporosity enables high water fluxes. One limitation with 3-D ACF electrode is that it is not active for ·OH production, and thus electrooxidation relies primarily on direct electron transfer. The degradation of persistent organic pollutants however often requires ·OH reactions. This can be solved by coating ACF with a thin film of electro-active catalysts to enhance its electrooxidation capability, but the coated film has to be cost-effective. With all the properties described above, $Ti_4O_7$ can be used as a material to coat ACF, because $Ti_4O_7$ is a "non-active" electrode material that can effectively produce physisorbed ·OH via water oxidation, and it is also active for direct electron transfer. A plasma spray process has been employed to coat catalysts on various substrates for making supercapacitor electrode materials, and this process can also be used to coat $Ti_4O_7$ on ACF. Because both $Ti_4O_7$ and ACF are highly porous, the coating of $T_4O_7$ is not expected to impede the sorption capacity of ACF. Therefore, the hybrid material makes a good 3-D electrode/membrane material because it (i) has high sorption capacity, (ii) promotes high mass transfer rates in a filtration mode, and (iii) has strong electrochemical oxidation and/or reduction capability towards target COCs. Such a membrane electrode involves filtration, sorption and electrooxidation synergistically in a REM system, which provides a transformative technology that may address a wide range of challenges in wastewater treatment and recycling.

It should be noted that REM is not only applicable for electrooxidation as described above, but also for electro-reduction in which the membrane serves as a cathode, or for electro-filtration in which the membrane with smaller pores is polarized with the same charge as the target species to reject the COCs by electrostatic repulsion. REM processes involving electro-ultra/microfiltration has been used for concentrating PFAAs in water as described in (Tsai, Y. T., et al., 2010, which is hereby incorporated by reference).

A goal of the present example is to demonstrate the efficacy of the REM systems involving the $Ti_4O_7$ or $Ti_4O_7$/ACF membrane to treat mixed contaminants present on DoD sites, such as, but not limited to, PFAAs and TCE. 3 REM operations will be investigated, including i) electro-ultra/microfiltration to concentrate PFAAs in water, ii) anodic oxidation to mineralize PFAAs and TCE, and iii) cathodic reduction to degrade chlorate. The study will also explore proper ways to couple the three REM unit operations to achieve desirable treatment effects for mixed contaminants.

Figure 23:
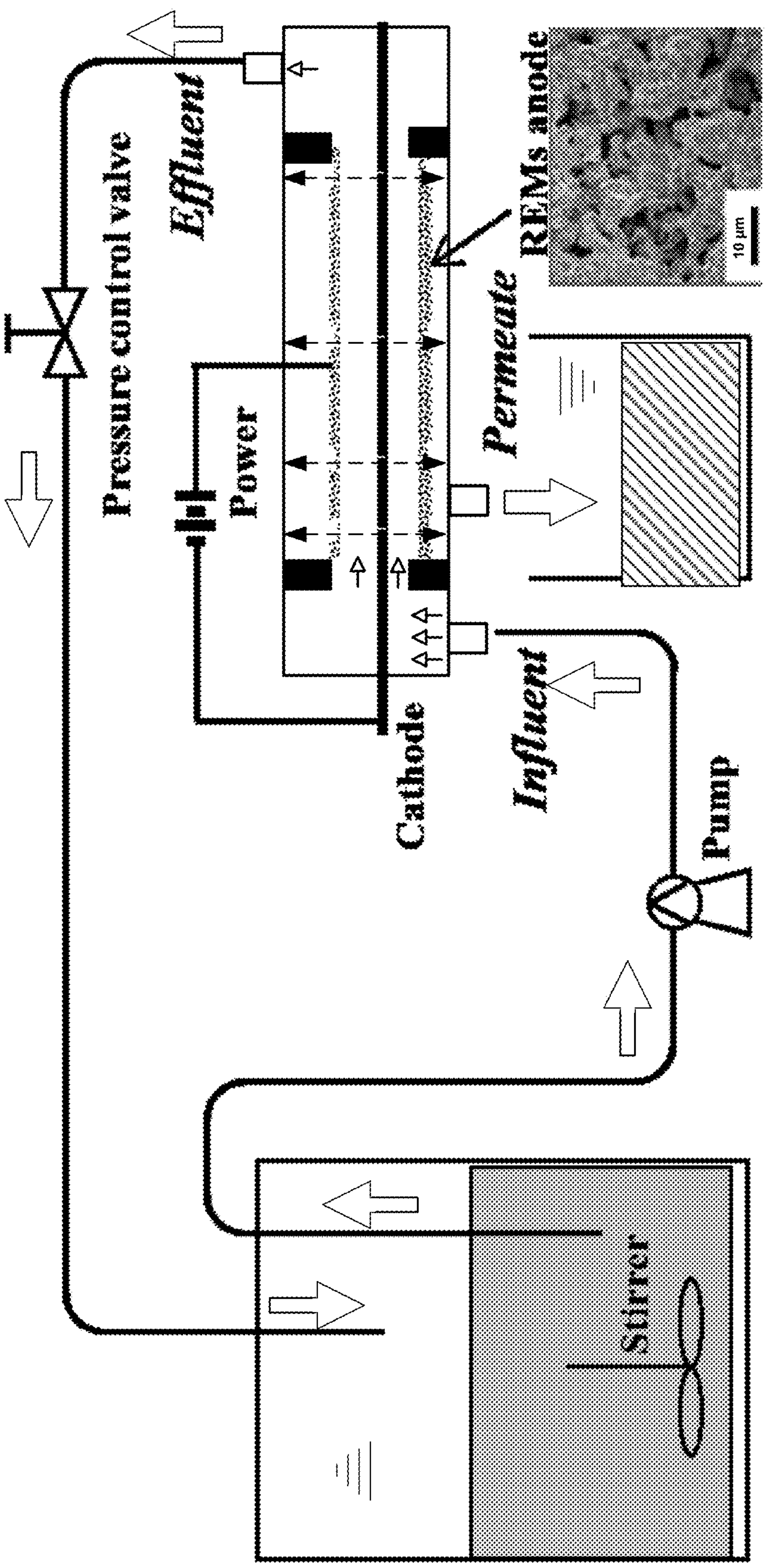
FIG. 23 is a schematic illustration of an embodiment of an REM unit operated in a cross-flow filtration mode.

For each of the three REM unit operations, a tubular/cylindrical $Ti_4O_7$ or $Ti_4O_7$/ACF membrane will be used as the working electrode (such as shown in FIG. 4A, discussed above) with a stainless steel rod as the counter electrode and an Ag/AgCl reference electrode, configured as shown in FIGS. 23 and 24. A tubular electrode is adopted to offer offering optimum hydrodynamic performance. As illustrated in FIG. 24, when the working electrode is polarized as cathode, the anions like PFAAs in feed water may be rejected by electrostatic repulsion and thus concentrated in the retentate, and/or chlorate may be reduced to $Cl^-$ depending on the membrane pore structures and applied voltage. When the working electrode is charged as anode, PFAAs and TCE will be adsorbed to the anode by electrostatic and/or hydrophobic forces and mineralized by anodic oxidation.

REM Unit Operations

Cross-flow REM systems will be assembled by the configuration illustrated in FIG. 24. A tubular $Ti_4O_7$ or $Ti_4O_7$/ACF membrane (2-cm radius, 10-cm length) prepared as described in Example 1, or using other methods tested in Example 2, will be used as the working electrode. Electrodes of different porous structures will be tested. A 1.6-mm diameter 316 stainless steel rod will be used as counter electrode. A leak-free Ag/AgCl reference electrode (Warner Instruments, LF-100) will be placed ~0.85 mm from the inner REM surface. Potentials will be applied and controlled using a 303DM DC power supply (Electro Industries, Chicago, IL). Water samples containing PFAAs and/or TCE at different concentrations (0.1 μM-1 mM) will be driven through the REM system using a peristaltic pump at different flow rates in continuous flow or circulation modes as necessary, with the back pressure maintained constant by a regulator to adjust membrane permeability. $Na_2SO_4$ at different concentrations (10-100 mM) will be used as supporting electrolytes as appropriate. Samples will be taken at the influent, effluent and retentate at different treatment times to analyze the chemical concentrations. The concentrations of TCE and its products will be quantified by gas chromatography, and PFAAs will be quantified using a Waters Acuity UPLC-Xevo TQD tandem Mass spectrometer (UPLC-MS/MS) as described in Luo, Q., et al., Laccase-Catalyzed Degradation of Perfluorooctanoic Acid. *Environmental Science & Technology Letters* 2015 (which is hereby incorporated herein by reference). Experiments will be performed to respectively examine the electro-filtration, cathodic reduction and anodic oxidation unit operation, as described below in brief.

Electro-filtration will be operated with REMs having average pore sizes <0.1 μm as the working electrode and polarized as the cathode within a potential range that will be tested and optimized for anion rejection. PFAAs will be tested separately and in mixture. Negatively charged PFAAs will be rejected by the cathodic membrane because of electrostatic repulsion, and thus concentrated in the retentate. Rejection efficiency will be calculated based on concentrations of COCs in the feed and permeate flows, and the influence of key conditions such as cathodic potential, flow rates and pH will be tested. The membrane zeta potentials will be determined from the electroosmotic flux-versus-electrical current curve described by the Helmholtz-Smoluchowski equation (Tsai, Y. T, et al, 2010, incorporated by reference above), and the relationship between rejection efficiency and membrane zeta potential will be explored.

Cathodic reduction will be operated on water samples containing chlorate, with the REM working electrode having relatively larger pore sizes (average pore size 1~5 μm) and polarized as the cathode at a relatively low range (~-2.0 to -4.0 V vs. SHE). Chlorate will be reduced to $Cl^-$ during cathodic reduction, and because electrostatic repulsion may still be effective to certain extent, a portion of these ions may remain in the retentate. The concentrations of these ions will be monitored in the influent, effluent and retentate to characterize the reductive reaction and rejection efficiencies. Different cathodic potentials, flow rate and chlorate concentrations will be tested, and the cathodic reduction rate will be modeled. Chlorate reduction efficiency will also be examined when the water sample contains mixed COCs. The efficiency of the REM system with $Ti_4O_7$ and $Ti_4O_7$/ACF membrane will be compared under the same operation conditions.

It should be noted that the electric potential range effective for cathodic reduction may partially overlap with that for electro-filtration described above, so that electro-filtration and cathodic reduction will likely occur concurrently in either system, but to significantly different extent because of the different pore sizes used for the two different operations. The smaller pore sizes in the membranes used for electro-filtration will create a much steeper electro-potential gradient within the membrane pores under the same applied voltage, which will prevent the anions from getting into the pores and thus largely limit the reductive reactions; whereas, with larger pores in the membrane, reductive reactions will be favored as they will occur in the membrane pores as well as on the surface, while the rejection effects will become significantly weaker.

Anodic oxidation will be operated on water samples containing PFAAs and TCE individually or in mixture with the REM working electrode charged as the anode (~1.5-3.5 V vs. SHE). The concentrations of PFAAs will be monitored in the influent, effluent and retentate to measure the efficiency of anodic oxidation, and the reaction rate will be modeled. The reaction rates will be compared to mass transfer rates that will be measured using the limiting current density ($I_{lim}$) approach. Floride ions and TOC will also be measured in selected samples, and oxidation efficiency will be evaluated using TOC reduction. Different anodic potentials, flow rate and PFAA concentrations will be examined. The efficiency of the REM system with $Ti_4O_7$ and $Ti_4O_7$/ACF membrane will be compared under the same operation conditions.

Combined REM Operations

REM unit operations will be coupled in sequential treatment trains or in one single system to treat field water samples from DoD sites that contain mixed COCs, including PFAAs and TCE. The intent is to explore the effective means to combine different REM unit operations to achieve efficient treatment of mixed contaminants.

While treatment sequences with different REM unit operations in various orders will be tested and compared, in an embodiment illustrated in FIG. 25, the sequence comprises an electro-filtration as the first unit to concentrate PFAAs in the retentate that will be sent to the second unit for anodic oxidation to remove PFAAs and TCE in the effluent, which will be further subject to cathodic reduction in the third unit for reduction of chlorate that was formed as a product of TCE oxidation. The concentration of PFAAs in step 1 will significantly increase the oxidation and reduction reaction efficiencies in steps 2 and 3.

In addition to coupling different unit operations in a sequence, attempts will also be made to couple different units in one operating system. Such a system will be assembled as illustrated in FIG. 26, with a tubular $Ti_4O_7$/ACF membrane (2-cm radius, 10-cm length) operated as the anode, and a tubular $Ti_4O_7$ ceramic membrane (2.5-cm inner radius, 11-cm length) as the cathode. As the water sample is passed through the inner anodic membrane, PFAAs and TCE will be oxidized, while the outer anodic membrane will either reject or reduce chlorate depending on applied potentials and the membrane pore sizes.

The treatment systems described in this example will be continuously operated for 168 h under optimized conditions. The efficiency of COCs removal and the flow rates of water fluxes will be monitored periodically. In addition, the electrode membranes will be thoroughly characterized before and after operations to indicate the materials stability. The pore structures and electrochemical properties will be measured using mercury porosimetry, and the chemical composition and physical properties will be characterized by SEM, XRD and XPS.

The foregoing examples are put forth so as to provide those of ordinary skill in the art with a complete disclosure and description of how to perform the methods and use the compositions and compounds disclosed and claimed herein. Efforts have been made to ensure accuracy with respect to numbers (e.g., amounts, temperature, etc.), but some errors and deviations should be accounted for. Unless indicated otherwise, parts are parts by weight, temperature is in ° C., and pressure is in atmospheres. Standard temperature and pressure are defined as 25° C. and 1 atmosphere.

It should be noted that ratios, concentrations, amounts, and other numerical data may be expressed herein in a range format. It is to be understood that such a range format is used for convenience and brevity, and thus, should be interpreted in a flexible manner to include not only the numerical values explicitly recited as the limits of the range, but also to include all the individual numerical values or sub-ranges encompassed within that range as if each numerical value and sub-range is explicitly recited. To illustrate, a concentration range of "about 0.1% to about 5%" should be interpreted to include not only the explicitly recited concentration of about 0.1 wt % to about 5 wt %, but also include individual concentrations (e.g., 1%, 2%, 3%, and 4%) and the sub-ranges (e.g., 0.5%, 1.1%, 2.2%, 3.3%, and 4.4%) within the indicated range. In an embodiment, the term "about" can include traditional rounding according to measurement techniques and the numerical value. In addition, the phrase "about x to y" includes "about x to about y".

Many variations and modifications may be made to the embodiments described in the preceding Examples. All such modifications and variations are intended to be included herein within the scope of this disclosure and protected by the following claims.

REFERENCES (1) De Witte, J.; Piessens, G.; Dams, R. Fluorochemical intermediates, surfactants and their use in coatings. *Surf. Coat. Int.* 1995, 78, 58-64.

(2) Prevedouros, K.; Cousins, L. T.; Buck, R. C. Korzeniowski, S. H. Sources, fate and transport of perfluorocarboxylates. *Environ. Sci. Technol.* 2006, 40, 32-44.

(3) Davis, K. L; Aucoin, M. D.; Larsen, B. S.; Kaiser, M. A. Transport of ammonium perfluorooctanoate in environmental media near a fluoropolymer manufacturing facility. *Chemosphere* 2007, 67, 2011-2019.

(4) Fiedler, S.; Pfishter, G.; Schramm, K. Poly- and perfluorinated compounds in household consumer products. *Toxico. Environ. Chem.* 2010, 92, 1801-1811.

(5) Fujii, S.; Tanaka, S.; Lien, N. P. H.; Qiu, Y.; Polprasert, C. New POPs in the water environment: distribution, bioaccumulation and treatment of perfluorinated compounds—a review paper. *J. Water Supply Res. Technol.—AQUA* 2007, 56, 313-326.

(6) SIA and ISMI Use of PFAS/PFOA compounds by US SIA Members in 2008. Semiconductor Industry Association and International SEMATECH Manufacturing Initiative, Inc. US, June 2010. 2008. Available online: www.sematech.org/docubase/document/PFOS_Survey_2009_final.pdf.

(7) Huang Q. G. Remediation of perfluoroalkyl contaminated aquifers using an in situ two-layer barrier laboratory batch and column study. http://serdp-estcp.org/Program-Areas/Environmental-Restoration/Contaminated-Groundwater/Emerging-Issues/ER-2127/ER-2127/(language)/eng-US.

(8) Wang, Z. Y.; Cousins, I. T.; Scheringer, M.; Buck, R. C.; Hungerbühler, K. Global emission inventories for $C_4$-$C_{14}$ perfluorolkyl carboxylic acid (PFCA) homologues from 1951 to 2030, Part I: production and emissions from quantifiable source. *Environ. Inter.* 2014, 70, 62-75.

(9) Vecitis, C. D.; Park, H.; Cheng, J.; Mader, B. T.; Hoffmann, M. R. Treatment of technologies for aqueous perfluorooctane sulfonate (PFOS) and perfluorooctanoate (PFOA). *Front. Environ. Sci. Eng. China* 2009, 3, 129-151.

(10) Tang, H. Q.; Xiang, Q. Q.; Lie, M.; Yan, J. C.; Zhu, L. H.; Zou, J. Efficient degradation of perfluorooctanoic acid by UV-Fenton process. *Chem. Eng. J.* 2010, 184, 156-162.

(11) Cheng, J.; Zhang, P. Y.; Liu, J. Photodegradation of perfluorooctanoic acid by 185 nm vacuum ultraviolet light. *J. Environ. Sci.* 2007, 19, 387-390.

(12) Hori, H.; Hayakawa, E.; Einaga, H.; Kutsuna, S.; Koike, K.; Ibusuki, T.; Kiatagawa, H.; Arakawa, R. Decomposition of environmentally persistent perfluorooctanoic acid in water by photochemical approaches. *Environ. Sci. Technol.* 2004, 38, 6124-6618.

(13) Hori, H.; Yamamoto, E.; Hayakawa, E.; Taniyasu, S.; Yamashita, N.; Kutsuna, S. Efficient decomposition of environmentally persistent perfluorocarboxylic acids by use of persulfate as a photochemical oxidant. *Environ. Sci. Technol.* 2005, 39, 2383-2388.

(14) Morwaki, H.; Takagi, Y.; Tanaka, M.; Tanaka, M.; Tsuruho, K.; Okitsu, K; Maeda, Y. Sonochemical decomposition of perfluorooctane sulfonate and perfiuorooctanoic acid. *Environ. Sci. Technol.* 2005, 39, 3388-3392.

(15) Yasuoka, K.; Sasaki, K.; Hayashi, R. An energy-efficient process for decomposing perfluorooctanoic and perfluorooctane sulfonic acids using dc plasmas generated within gas bubbles. *Plasma Sources Sci. T.* 2011, 20, 034009-034016.

(16) Hor, H.; Nagaoka, Y.; Yamamoto, A.; Sano, T.; Yamashita, N.; Taniyasu, S.; Kutsuna, S. Efficient decomposition of environmentally persistent perfluorooctane sulfonate and related fluorochemicals using zerovalent iron in subcritical water. *Environ. Sci. Technol.* 2006, 40, 1049-1054.

(17) Carter, K. E.; Farrell, J. Oxidative destruction of perfluorooctane sulfonate using boron-doped diamond film electrodes. *Environ. Sci. Technol.* 2008, 42, 6111-6115.

(18) Zhuo, Q. F.; Deng, S. B.; Yang, B.; Huang, J.; Wang, B.; Zhang, T. T.; Yu, G. Degradation of perfluorinated compounds on a boron-doped diamond electrode. *Electrochim. Acta* 2012, 77, 17-22.

(19) Xiao, H. S.; Lv, B. Y.; Zhao, G. H.; Wang, Y. J.; Li, M. F.; Li, D. M. Hydrothermally enhanced electrochemical oxidation of high concentration refractory perfluorooctanoic acid. *J. Phys. Chem. A* 2011, 115, 13836-13841.

(20) Niu, J. F.; Lin, H.; Xu, J. L.; Wu, H.; Li Y. Y. Electrochemical Mineralization of Perfluorocarboxylic Acids (PFCAs) by Ce-doped Modified Porous Nanocrystalline $PbO_2$ Film Electrode. *Environ. Sci. Technol.* 2012, 46, 10191-10198.

(21) Lin, H.; Niu, J. F.; Ding, S. Y.; Zhang, L. L. Electrochemical degradation of perfluorooctanoic acid (PFOA) by $Ti/SnO_2$—Sb, $Ti/SnO_2$—$Sb/PbO_2$ and $Ti/SnO_2$—$Sb/MnO_2$ anodes. *Water Res.* 2012, 46, 2281-2289.

(22) Zhuo, Q. F.; Deng, S. B.; Yang, B.; Huang, J.; Yu, G. Efficient electrochemical oxidation of perfluorooctanoate using a $Ti/SnO_2$—Sb—Bi anode. *Environ. Sci. Technol.* 2011, 45, 2973-2979.

(23) Trautmann, A. M.; Schell, H.; Schmidt, K. R.; Mangold, K. M.; Tiehm, A. Electrochemical degradation of perfluoroalkyl and polyfluoroalkyl substances (PFASs) in groundwater. *Water Sci. Technol.* 2015, 70, 1569-1575.

(24) Schaefer, C. E.; Andaya, C.; Urtiaga, A.; McKenzie, E. R.; Higgins, C. P. Electrochemical treatment of perfluorooctanoic acid (PFOA) and perfluorooctane sulfonic acid (PFOS) in groundwater impacted by aqueous film forming foams (AFFFs). *J. Hazard. Mater.* 2015, 295, 170-175.

(25) Panizza, M.; Cerisola, G. Direct and mediated anodic oxidation of organic pollutants. *Chem. Rev.* 2009, 109, 6541-6569.

(26) Lin, H.; Niu, J. F.; Xu, J. L.; Huang, H. O.; Li D.; Yue, Z. H.; Feng, C. H. Highly efficient and Mild Electrochemical mineralization of long-chain perfluorocarboxylic acids (C9~C10) by $Ti/SnO_2$—Sb—Ce, $Ti/SnO_2$—Sb/Ce—$PbO_2$, and Ti/BDD electrodes. *Environ. Sci. Technol.* 2013, 47, 13030-103046.

(27) Walsh, F. C.; Wills, R. G. A. The continuing development of Magnéli phase titanium sub-oxides and Ebonex® electrodes. *Electrochim. Acta* 2010, 55, 6342-6351.

(28) Bunce, N. J.; Bejan, D. Pollutants in Water-Electrochemical Remediation Using Ebonex Electrodes. In *Encyclopedia of Applied Electrochemistry*; Kreysa, G., Ota, K. i, Savinell, R. F., Eds.; Springer New York, 2014; pp 1629-1633.

(29) Ras, A. H.; van Staden, J. F. Electrodeposition of $PbO_2$ and Bi—$PbO_2$ on Ebonex. *J. Appl. Elecrochem.* 1999, 29, 313-319.

(30) Toyoda, M.; Yano, T.; Tryba, B.; Mozia, S.; Tsumura, T.; Inagaki, M. Preparation of carbon-coated Magnel phases $Ti_nO_{2n-1}$ and their photocatalytic activity under visible light. *Appl. Catal. B: Enivron.* 2010, 88, 160-164.

(31) Kasian, O. I.; Lukyanenko, T. V.; Demchenko, P.; Gladyshevskii, R. E.; Amadelli, R.; Velichenko, A. B. Electrochemical properties of thermally treated platinized Ebonex® with low content of Pt. *Electrochim. Acta* 2013, 109, 630-637.

(32) Yao, C. H.; Li, F., Li, X.; Xia, D. Q. Fiber-like nanostructured $Ti_4O_7$ used as durable fuel cell catalyst support in oxygen reduction catalysis. *J. Mater. Chem.* 2012, 22, 16560-16565.

(33) Geng, P.; Su, J. Y.; Miles, C.; Comninellis, C.; Chen, G. H. Highly-ordered Magnéli $Ti_4O_7$ nanotube arrays as effective anodic material for electro-oxidation. *Electrochim. Acta* 2015, 153, 316-324.

(34) Zaky, A. M.; Chaplin, B. P. Porous substoichiometric $TiO_2$ anodes as reactive electrochemical membranes for water treatment. *Environ. Sci. Technol.* 2013, 47, 6554-6563.

(35) Chen, G.; Bettertion, E. A.; Arnold, R. G. Electrolytic oxidation of trichloroethylene using a ceramic anode. *J. Appl. Electrochem.* 1999, 29, 961-970.

(36) Guo, L.; Jing, Y.; Chaplin, B. P. Development and characterization of ultrafiltration $TiO_2$ Magneli phase reaction electrochemical membranes. *Environ. Sci. Technol.* 2016, 50, 1428-1436.

(37) Santos, M. C.; Elabd, Y. A.; Jing, Y.; Chaplin, B. P.; Fang, L. Highly porous $Ti_4O_7$ reactive electrochemical water filtration membranes fabricated via electrospinning/electrospraying. *AICHE J.* 2016, 62, 508-524.

(38) Zaky, A. M.; Chaplin, B. P. Mechanism of p-substituted phenol oxidation at a $Ti_4O_7$ reactive electrochemical membrane. *Environ. Sci. Technol.* 2014, 48, 5857-5867.

(39) Hua, L. K.; Guo, L.; Thakkar, M.; Wei, D. Q.; Agbakpe, M.; Kuang, L. Y.; Magpile, M.; Chaplin, B. P.; Tao, Y.; Shuai, D. M.; Zhang, X. H.; Mitra, S.; Zhang, W. Effects of anodic oxidation of a substoichiometric titanium dioxide reactive electrochemical membrane on algal cell destabilization and lipid extraction. *Bioresource Technol.* 2016, 203, 112-117.

(40) Kearney, D.; Bejan, D.; Bunce, N. J. The use of Ebonex electrodes for the electrochemical removal of nitrate ion from water. *Can. J. Chem.* 2012, 90, 666-674.

(41) Luo, Q.; Lu, J.; Zhang, H.; Wang, Z.; Feng, M.; Chiang, S. Y. D.; Woodward, D.; Huang, Q. Laccase-Catalyzed Degradation of Perfluorooctanoic Acid. *Environ. Sci. Technol. Lett.* 2015, 2, 198-203.

(42) Lin, H.; Niu, J. F.; Xu, J. L.; Li, Y.; Pan, Y. H. Electrochemical mineralization of sulfamethoxazole by Ti/$SnO_2$—Sb/Ce—$PbO_2$ anode: kinetics, reaction pathways, and energy cost evolution. *Electrochim. Acta* 2013, 97, 167-174.

(43) Chen, G. H. Electrochemical technologies in wastewater. *Sep. Purif. Technol.* 2004, 38, 11-41.

(44) Geng, P.; Chen, G. H. Magneli $Ti_4O_7$ modified ceramic membrane for electrically-assisted filtration with antifouling property. *J. Membrane Sci.* 2016, 498, 302-314.

(45) Ardizzone, S.; Fregonara, G.; Trasatti, F. "Inner" and "outer" active surface of $RuO_2$ electrodes. *Electrochim. Ada* 1990, 35, 263-267.

(46) Asim, S.; Yin, J.; Yue, X.; Shah, M. W.; Zhu, Y. Q.; Li, Y. X.; Wang, C. Y. Controlled fabrication of hierarchically porous Ti/Sb—$SnO_2$ anode from honeycomb to network structure with high electrocatalytic activity. *RSC Adv.* 2015, 5, 28803.

(47) Bockris, J. O.; Otagawa, T. The electroctatalysis of oxygen evolution on perovskites. *J. Electrochem. Soc.* 1984, 131, 290-302.

(48) Moroi, Y.; Yano, H.; Shibata, O.; Yonemitsu, T. Determination of acidity constants of perfluoro alkanoic acids. *Bull. Chem. Soc. Jpn.* 2001, 74, 667-672.

(49) Niu, J. F.; Lin, H.; Gong, C.; Sun, X. M. Theoretical and experimental insights into the electrochemical mineralization mechanism of perfluoroctanoic acid. *Environ. Sci. Technol.* 2013, 47, 14341-14349.

(50) Gatto, S.; Sansotera, M.; Persico, F.; Gola, M.; Pirola, C.; Panzer, W.; Navarrina, W.; Bianchi, C. L. Surface fluorination on $TiO_2$ catalyst induced by photodegradation of perfiuorooctanoic acid. *Catal. Today* 2015, 241, 8-14.

(51) Park, H.; Vecitis, C. D.; Cheng, J.; Choi, W.; Mader, B. T.; Hoffmann, M. R. Reductive defluorination of aqueous perfluorinated alkyl surfactants: Effects of ionic headgroup and chain length. *J. Phys. Chem. A* 2009, 113, 690-696.

(52) Lee, Y.; Lo, S.; Chiueh, P. Chang, D. Efficient decomposition of perfluorocarboxylic acid in aqueous solution using microwave-induced persulfate. *Water Res.* 2009, 43, 2881-2816.

(53) Hor, H.; Yamamoto, A.; Hayakawa, E.; Taniyasu, S.; Yamashita, N.; Kutsuna, S. Efficient decomposition of environmentally persistent perfluorocarboxylic acids by use of persulfate as a photochemical oxidant. *Environ. Sci. Technol.* 2005, 39, 2383-2388.

(54) Chaplin, B. P. Critical review of electrochemical advanced oxidation processes for water treatment applications. *Environ. Sci.: Processes Impacts,* 2014, 16, 1182-1203.

(55) Kapalka, A.; Fóti, G.; Comninellis, C. The importance of electrode material in environmental electrochemistry: Formation and reactivity of free hydroxyl radicals on boron-doped diamond electrodes. *Electrochim. Acta* 2009, 54, 2018-2023.

(56) Donaghue, A.; Chaplin, B. P. Effect of select organic compounds on perchlorate formation at boron-doped diamond film anodes. *Environ. Sci. Technol.* 2013, 47, 12391-12399.

(57) Tsai, Y. T.; Yu-Chen Lin, A.; Weng, Y. H.; Li, K. C., Treatment of Perfluorinated Chemicals by Electro-Microfiltration. *Environmental Science & Technology* 2010, 44, (20), 7914-7920.

(58) Guo, L.; Jing, Y.; Chaplin, B. P., Development and Characterization of Ultrafiltration TiO2 Magnéli Phase Reactive Electrochemical Membranes. *Environmental Science & Technology* 2016, 50, (3), 1428-1436.

(59) Li, X.; Chen, S.; Quan, X.; Zhang, Y., Enhanced Adsorption of PFOA and PFOS on Multiwalled Carbon Nanotubes under Electrochemical Assistance. *Environmental Science & Technology* 2011, 45, (19), 8498-8505.

(60) Porada, S.; Zhao, R.; van der Wal, A.; Presser, V.; Biesheuvel, P. M., Review on the science and technology of water desalination by capacitive deionization. *Progress in Materials Science* 2013, 58, (8), 1388-1442.

(61) Nehe, P.; Sivakumar, G.; Kumar, S., Solution Precursor Plasma Spray (SPPS) technique of catalyst coating for hydrogen production in a single channel with cavities plate type methanol based microreformer. *Chemical Engineering Journal* 2015, 277, 168-175.

(62) Rajishwar, K.; Ibanez, J. G. Environmental Electrochemistry: Fundamentals and Application in Pollution Sensors and Abatement. Academic Press: San Diego, C A, 1997.

(63) US EPA. Significant New Uses: Perfluoroalkyl Sulfonates and Long-Chain Perfluoroalkyl Carboxylate Chemical Substances [DB/CD]. http://www.regulations-.gov/#!documentDetail;D=EPA-HQ-OPPT-2012-0268-0034

(64) Vectitis, C. D; Yang, Y. J.; Cheng, J.; Park, H.; Mader, B. T.; Hoffmann, M. R. Sonochemical degradation of perfluorooctanesulfonate in aqueous film-forming foams. *Environ. Sci. Technol.* 2010, 44 (1), 432-438.

(65) Lutze, H.; Panglisch, S.; Bergmann, A.; Schmidt, T. C. Treatment options for the removal and degradation of polyfluorinated chemicals. *Handbook Environ. Chem.* 2012, 17, 103-125.

(66) Paul, A. G.; Jones, K. C.; Sweetman, A. J. A first global production, emission, and environmental inventory for perfluorooctane sulfonate. *Environ. Sci. Technol.* 2009, 43 (2), 386-392.

(67) Qu, Y.; Zhang, C. J.; Li, F.; Chen, J.; Zhou, Q. Photo-reductive defluorination of perfluorooctanoic acid in water. *Wates Res.* 2010, 44 (9), 2939-2947.

The invention claimed is:

1. A method for electrochemically oxidizing polyfluoroalkyl and perfluoroalkyl substances (PFASs), the method comprising:

contacting an aqueous composition contaminated with one or more types of PFASs with an electrode comprising one or more metal sub-oxides, wherein the one or more metal sub-oxides is configured to be in electrochemical communication with the aqueous solution; and supplying electric current to the electrode in an electrochemical cell, whereby the one or more metal sub-oxides electrochemically oxidizes the PFASs to oxidatively degrade the PFASs into mineral components, inorganic components, or both.

2. The method of claim 1, wherein the one or more metal sub-oxides have the formula $Ti_nO_{2n-1}$, where n is any integer between 3 and 10.

3. The method of claim 1, wherein the aqueous composition contaminated with PFASs comprises wastewater.

4. The method of claim 3, wherein the wastewater is pre-treated to concentrate the PFASs prior to contact with the electrode.

5. The method of claim 4, wherein the wastewater is pre-treated via electrocoagulation to concentrate the PFSAs.

6. The method of claim 1, wherein the electrode is porous.

7. The method of claim 6, wherein the electrode comprises a plurality of micropores having a diameter from about 10 nm to 10 μm.

8. The method of claim 6, wherein the micropores have an average pore diameter of about 0.1 μm to 5 μm.

9. The method of claim 6, wherein the electrode has a porosity of about 5-75%.

10. The method of claim 1, wherein the PFASs are selected from the group consisting of perfluorooctanoate (PFOA), perfluorooctanesulfonate (PFOS), perfluoroalkyl acids (PFAAs), and combinations thereof.

11. The method of claim 1, wherein the one or more metal sub-oxides are selected from the group consisting of $Ti_4O_7$, $Ti_5O_9$, or a combination thereof.

12. A system for electrochemical oxidation of polyfluoroalkyl and perfluoroalkyl substances (PFASs), the system comprising:

a reservoir for containing an aqueous solution contaminated with PFASs; and a first electrode comprising one or more metal sub-oxides, wherein the one or more metal sub-oxides is configured to be in electrochemical communication with the aqueous solution in the reservoir, wherein the first electrode oxidatively degrades the PFASs to mineral components, inorganic components, or both.

13. The system of claim 12, further comprising a pump for moving the aqueous composition through the system.

14. The system of claim 12, wherein the first electrode is the working electrode in an electrochemical cell, wherein the system further comprises a counter electrode.

15. The system of claim 12, further comprising a second ceramic electrode comprising one or more metal sub-oxides, wherein one of the first or second electrodes is the anode and the other is the cathode.

16. The system of claim 12, wherein the first electrode comprises a plurality of micropores, providing a porous Magnéli phase titanium oxide ceramic electrode.

17. The system of claim 16, wherein the first electrode is both a working electrode and a filter through which the aqueous solution passes, and wherein the system further comprises a pump for moving the aqueous solution from the reservoir through the first electrode filter, wherein the electrode filter oxidatively degrades the PFASs to mineral components, inorganic components, or both as the solution passes through the filter.

18. The system of claim 17, further comprising a cathode, wherein the cathode is also a an electrode comprising one or more metal sub-oxides configured to be in to be in electrochemical communication with the aqueous solution in the reservoir, wherein the cathode comprises a plurality of micropores, and wherein the cathode also is a filter through which the aqueous solution passes.

19. The system of claim 12, wherein the aqueous composition contaminated with PFASs comprises wastewater and the PFASs are selected from the group consisting of perfluorooctanoate (PFOA), perfluorooctanesulfonate (PFOS), other perfluoroalkyl acids (PFAAs), and combinations thereof.

20. The system of claim 12, wherein the one or more metal sub oxides are selected from the group consisting of $Ti_4O_7$, $Ti_5O_9$, or a titanium sub oxide having the formula $Ti_nO_{2n-1}$, where n is any integer between 3 and 10, and combinations thereof.

21. The method of claim 1, wherein the metal sub-oxide comprises a Magnéli phase titanium metal sub-oxide.

22. The system of claim 1, wherein the metal sub-oxide comprises a Magnéli phase titanium metal sub-oxide.

* * * * *